(12) United States Patent
Doucet et al.

(10) Patent No.: US 9,512,629 B2
(45) Date of Patent: Dec. 6, 2016

(54) MOBILE STAGE FRAMEWORK AND METHOD OF HANDLING

(71) Applicant: STAGELINE SCENE MOBILE INC., L'Assomption (CA)

(72) Inventors: Jonathan Doucet, L'Assomption (CA); Andre Barrette, Oka (CA); Marius Chouinard, L'Assomption (CA); Yvan Miron, Montreal (CA)

(73) Assignee: STAGELINE SCENE MOBILE INC., L'Assomption, Quebec (CA)

(*) Notice: Subject to any disclaimer, the term of this patent is extended or adjusted under 35 U.S.C. 154(b) by 0 days.

(21) Appl. No.: 14/771,147

(22) PCT Filed: Mar. 3, 2014

(86) PCT No.: PCT/CA2014/050158
§ 371 (c)(1),
(2) Date: Aug. 27, 2015

(87) PCT Pub. No.: WO2014/131135
PCT Pub. Date: Sep. 4, 2014

(65) Prior Publication Data
US 2016/0009213 A1 Jan. 14, 2016

Related U.S. Application Data

(60) Provisional application No. 61/771,675, filed on Mar. 1, 2013.

(51) Int. Cl.
*E04H 3/28* (2006.01)
*B60P 3/025* (2006.01)

(52) U.S. Cl.
CPC ............... *E04H 3/28* (2013.01); *B60P 3/025* (2013.01); *B60P 3/0252* (2013.01)

(58) Field of Classification Search
CPC ............... E04H 3/28; E04H 3/24; E04H 3/26; E04H 3/12; B60P 3/025; B60P 3/0252; A47C 1/12
(Continued)

(56) References Cited

U.S. PATENT DOCUMENTS

| 1,238,228 A | 8/1917 | Weil |
| 1,521,803 A | 1/1925 | Dossenbach |

(Continued)

FOREIGN PATENT DOCUMENTS

| CA | WO 2011150488 A1 * | 12/2011 | ............... A63J 1/00 |
| CN | 2429415 Y | 5/2001 | |

(Continued)

OTHER PUBLICATIONS

IPRP under Chapter I of PCT/CA2014/050158.
(Continued)

*Primary Examiner* — Joshua J Michener
*Assistant Examiner* — Keith Minter
(74) *Attorney, Agent, or Firm* — IPAXIO S.E.N.C.

(57) ABSTRACT

The mobile stage framework includes a plurality of spaced-apart column structures and a first and a second self-contained unit. Both units are separated from one another when the mobile stage framework is fully disassembled for transportation. The first unit includes an articulated floor structure and the second unit includes an articulated roof structure. Both structures are in an unfolded working position when the mobile stage framework is fully assembled and are in their folded transport position when the mobile stage framework is fully disassembled for transportation. A method of handling a mobile stage framework is also disclosed.

20 Claims, 56 Drawing Sheets

(58) Field of Classification Search
USPC .......................................... 52/6, 7, 8, 9, 10
See application file for complete search history.

(56) References Cited

U.S. PATENT DOCUMENTS

| | | | |
|---|---|---|---|
| 2,560,878 A * | 7/1951 | Kyle | B60P 3/0252 296/26.02 |
| 2,668,331 A | 2/1954 | Horn | |
| 2,770,297 A | 11/1956 | Mercier et al. | |
| 2,791,095 A | 5/1957 | Mercier et al. | |
| 2,841,831 A | 7/1958 | Mackintosh | |
| 2,946,304 A | 7/1960 | Greer et al. | |
| 2,954,260 A | 9/1960 | Wright | |
| 2,955,652 A | 10/1960 | Senior | |
| 2,965,063 A | 12/1960 | Kummerman | |
| 2,978,754 A | 4/1961 | Wilson | |
| 3,007,431 A | 11/1961 | Dahlin | |
| 3,043,257 A | 7/1962 | Appleton et al. | |
| 3,086,256 A | 4/1963 | Schieber, Jr. | |
| 3,090,429 A | 5/1963 | Kummerman | |
| 3,091,816 A | 6/1963 | Wetzel | |
| 3,164,403 A | 1/1965 | Jerome et al. | |
| 3,181,203 A | 5/1965 | Wenger | |
| 3,196,932 A | 7/1965 | Rosendahl | |
| 3,217,366 A | 11/1965 | Wenger | |
| 3,258,884 A * | 7/1966 | Wenger | E04H 3/22 52/182 |
| 3,272,255 A | 9/1966 | Stransky | |
| 3,324,817 A | 6/1967 | Olsson | |
| 3,335,783 A | 8/1967 | Ligh | |
| 3,351,029 A | 11/1967 | Bue | |
| 3,417,518 A * | 12/1968 | Jaffe | E04B 1/3444 296/173 |
| 3,421,471 A | 1/1969 | Richter | |
| 3,422,877 A | 1/1969 | Detweiler | |
| 3,435,909 A | 4/1969 | Wenger et al. | |
| 3,483,588 A | 12/1969 | Hover | |
| 3,620,564 A | 11/1971 | Wenger et al. | |
| 3,626,548 A | 12/1971 | Grunert | |
| 3,961,426 A | 6/1976 | Wallace | |
| 3,999,491 A | 12/1976 | Wilson | |
| 4,026,076 A * | 5/1977 | Analetto | E04H 3/28 296/26.14 |
| 4,026,221 A | 5/1977 | Wilson et al. | |
| 4,054,096 A | 10/1977 | Wilson et al. | |
| 4,232,488 A * | 11/1980 | Hanley | E04H 3/28 108/166 |
| 4,327,650 A | 5/1982 | Bue | |
| 4,484,421 A | 11/1984 | Williams et al. | |
| 4,512,117 A | 4/1985 | Lange | |
| 4,720,945 A * | 1/1988 | Berranger | B60P 3/0252 52/143 |
| 4,779,542 A | 10/1988 | Staten et al. | |
| 4,872,295 A | 10/1989 | Fujita | |
| 4,912,887 A | 4/1990 | Sullivan | |
| 4,917,217 A | 4/1990 | Rogers et al. | |
| 4,949,649 A | 8/1990 | Terres et al. | |
| 5,016,403 A | 5/1991 | Fujita | |
| 5,050,353 A | 9/1991 | Rogers et al. | |
| 5,078,442 A | 1/1992 | Rau et al. | |
| 5,103,600 A * | 4/1992 | Geiger | E04H 3/26 52/126.5 |
| 5,152,109 A * | 10/1992 | Boers | E04H 3/24 296/26.02 |
| 5,301,626 A | 4/1994 | Penny | |
| 5,325,640 A | 7/1994 | Luedke et al. | |
| 5,327,698 A | 7/1994 | Uhl | |
| 5,375,899 A * | 12/1994 | Wright | B60P 3/025 296/21 |
| 5,546,709 A | 8/1996 | Decker et al. | |
| 5,642,589 A | 7/1997 | Miron et al. | |
| 5,660,000 A | 8/1997 | MacIntyre | |
| 5,716,090 A | 2/1998 | Chang et al. | |
| 5,848,501 A | 12/1998 | Taipale et al. | |
| 5,935,675 A | 8/1999 | Hayden et al. | |
| 5,947,502 A * | 9/1999 | Kammerzell | B60P 3/0252 108/143 |
| 5,979,125 A | 11/1999 | Guillet | |
| 6,006,680 A | 12/1999 | Quam et al. | |
| 6,024,026 A | 2/2000 | Botts et al. | |
| 6,061,970 A | 5/2000 | Fujita | |
| 6,070,367 A | 6/2000 | Wagner et al. | |
| 6,106,186 A | 8/2000 | Taipale et al. | |
| 6,176,495 B1 * | 1/2001 | Decker | B60S 9/12 280/6.153 |
| 6,195,943 B1 | 3/2001 | Woods et al. | |
| 6,393,769 B1 * | 5/2002 | Mertik | E04H 3/28 296/162 |
| 6,997,495 B1 | 2/2006 | Groezinger | |
| 7,707,780 B2 | 5/2010 | Ouellet et al. | |
| 7,815,011 B2 | 10/2010 | Holzman et al. | |
| 8,296,999 B2 * | 10/2012 | Uhl | E04H 3/126 52/66 |
| 8,978,311 B1 * | 3/2015 | Uhl | B60P 3/0252 52/36.1 |
| 2002/0062605 A1 | 5/2002 | Matthews | |
| 2004/0123529 A1 * | 7/2004 | Wiese | E04H 3/28 52/6 |
| 2007/0204520 A1 * | 9/2007 | Calleja | E04H 3/26 52/7 |
| 2009/0301359 A1 | 12/2009 | Tait et al. | |
| 2010/0235206 A1 * | 9/2010 | Miller | G06Q 10/063 705/7.11 |
| 2010/0269446 A1 | 10/2010 | Merrifield | |
| 2012/0096775 A1 * | 4/2012 | Allison | B60P 3/0252 52/7 |
| 2012/0272584 A1 * | 11/2012 | Bilsen | E04H 3/28 52/7 |
| 2012/0272585 A1 * | 11/2012 | Bilsen | E04H 3/28 52/7 |
| 2016/0010350 A1 * | 1/2016 | Doucet | E04H 3/28 52/7 |

FOREIGN PATENT DOCUMENTS

| | | |
|---|---|---|
| CN | 2442880 Y | 8/2001 |
| CN | 1094440 C | 11/2002 |
| CN | 2567082 Y | 8/2003 |
| CN | 2568473 Y | 8/2003 |
| CN | 2830157 Y | 10/2006 |
| CN | 2830158 Y | 10/2006 |
| CN | 2895150 Y | 5/2007 |
| CN | 201400119 Y | 2/2010 |
| CN | 102452452 A | 5/2012 |
| DE | 1080892 B | 4/1960 |
| DE | 1177967 B | 9/1964 |
| DE | 1189885 B | 3/1965 |
| DE | 9110660 U1 | 1/1993 |
| DE | 4002937 C2 | 2/1994 |
| DE | 4017372 C2 | 2/1995 |
| DE | 3932736 C2 | 7/1998 |
| DE | 10316859 A1 | 10/2003 |
| DE | 20220627 U1 | 1/2004 |
| DE | 20319261 U1 | 4/2004 |
| DE | 102004006863 B4 | 3/2006 |
| DE | 102004056135 A1 | 5/2006 |
| DE | 202007002922 U1 | 5/2007 |
| EP | 0130634 B1 | 12/1986 |
| EP | 0269518 B1 | 1/1991 |
| EP | 0645279 A1 | 3/1995 |
| EP | 0742119 A1 | 11/1996 |
| EP | 0737599 B1 | 8/1998 |
| EP | 0899155 A1 | 3/1999 |
| EP | 0880444 B1 | 7/2000 |
| EP | 1754845 A1 | 2/2007 |
| EP | 1803873 B1 | 10/2008 |
| EP | 2277739 A1 | 1/2011 |
| ES | 2046915 B1 | 11/1994 |
| FR | 1164208 A | 10/1958 |
| FR | 2615461 B2 | 11/1989 |
| FR | 2659373 A1 | 9/1991 |
| FR | 2810356 B1 | 1/2003 |
| GB | 833906 A | 5/1960 |

(56) References Cited

FOREIGN PATENT DOCUMENTS

| | | |
|---|---|---|
| GB | 1001810 A | 8/1965 |
| GB | 2223417 A | 4/1990 |
| GB | 2256373 A | 12/1992 |
| JP | 5938145 A | 3/1984 |
| JP | 01197139 A | 8/1989 |
| JP | 11190139 A | 7/1999 |
| KR | 100993874 B1 | 11/2010 |
| KR | 101056282 B1 | 8/2011 |
| WO | 9818667 A2 | 5/1998 |
| WO | 03046315 A1 | 6/2003 |
| WO | 2006070094 A1 | 7/2006 |
| WO | 2007139474 A1 | 12/2007 |
| WO | 2011023849 A1 | 3/2011 |
| WO | 2011150488 A1 | 12/2011 |
| WO | 2014131135 A1 | 9/2014 |
| WO | 2014131136 A1 | 9/2014 |

OTHER PUBLICATIONS

IPRP under Chapter II of PCT/CA2014/050159.
Machine translation in English of CN1094440.
Machine translation in English of CN2429415.
Machine translation in English of CN2442880.
Machine translation in English of CN2567082.
Machine translation in English of CN2568473.
Machine translation in English of CN2830157.
Machine translation in English of CN2830158.
Machine translation in English of CN2895150.
Machine translation in English of CN102452452.
Machine translation in English of CN201400119.
Machine translation in English of DE3932736.
Machine translation in English of DE4002937.
Machine translation in English of DE4017372.
Machine translation in English of DE9110660.
Machine translation in English of DE10316859.
Machine translation in English of DE20220627.
Machine translation in English of DE20319261.
Machine translation in English of DE102004006863.
Machine translation in English of DE102004056135.
Machine translation in English of DE202007002922.
Machine translation in English of EP-130634.
Machine translation in English of EP-269518.
Machine translation in English of EP-645279.
Machine translation in English of EP-737599.
Machine translation in English of EP-742119.
Machine translation in English of EP-880444.
Machine translation in English of EP-899155.
Machine translation in English of EP1803873.
Machine translation in English of ES2046915.
Machine translation in English of FR1164208.
Machine translation in English of FR2615461.
Machine translation in English of FR2659373.
Machine translation in English of FR2810356.
Machine translation in English of JP01197139.
Machine translation in English of JP11190139.
Machine translation in English of JP59038145.
Machine translation in English of KR100993874.
Machine translation in English of KR101056282.
Machine translation in English of WO200670094.

* cited by examiner

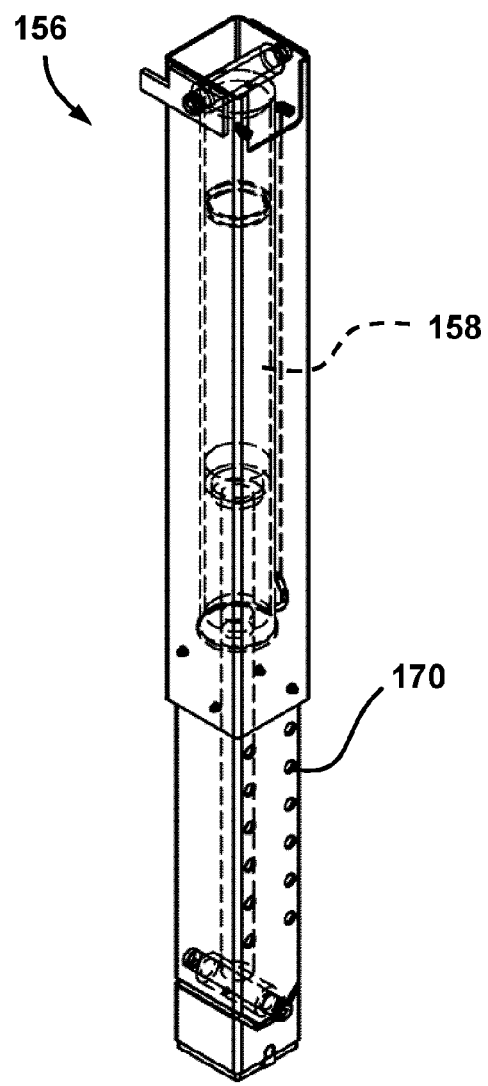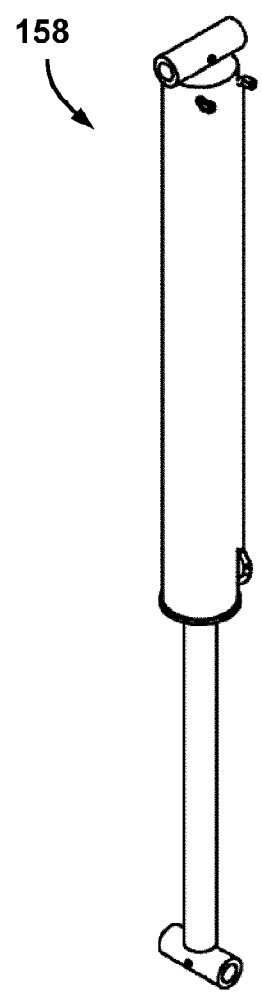
FIG. 17   FIG. 18

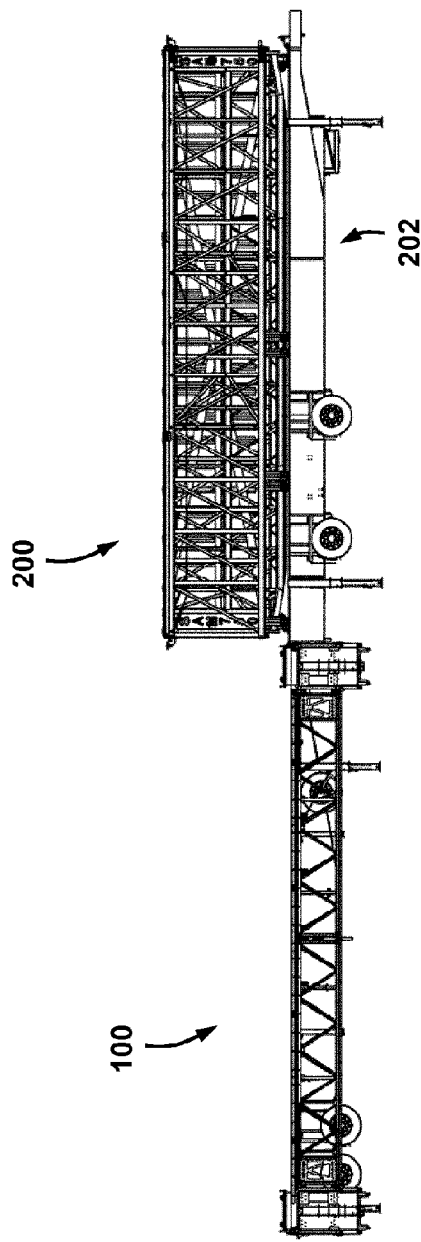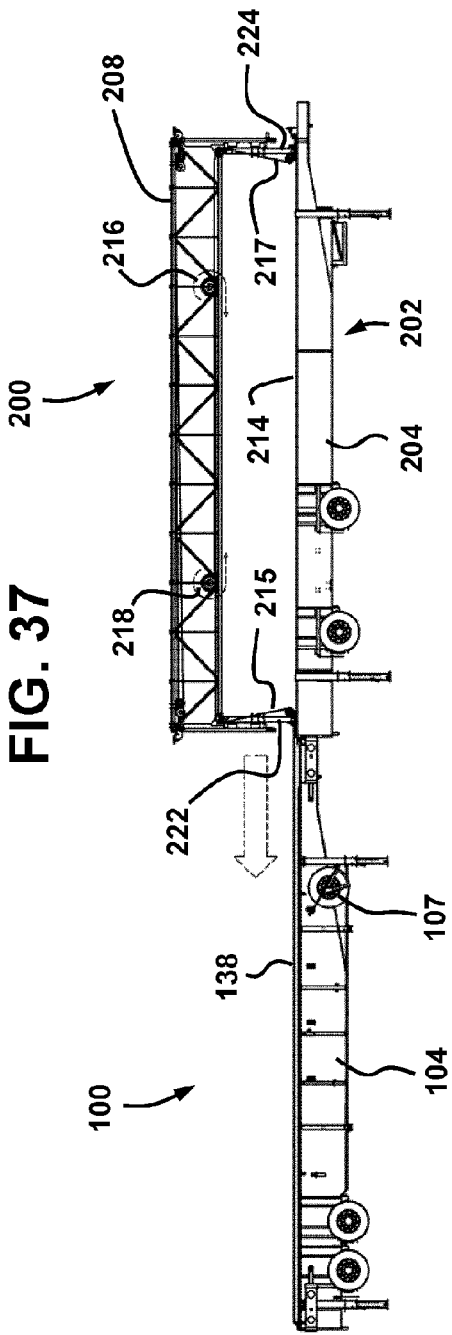
FIG. 37
FIG. 38

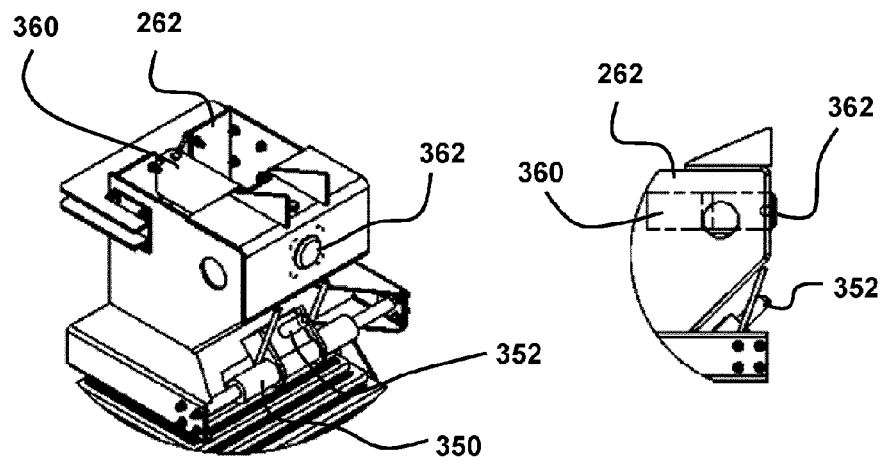
FIG. 65
FIG. 66
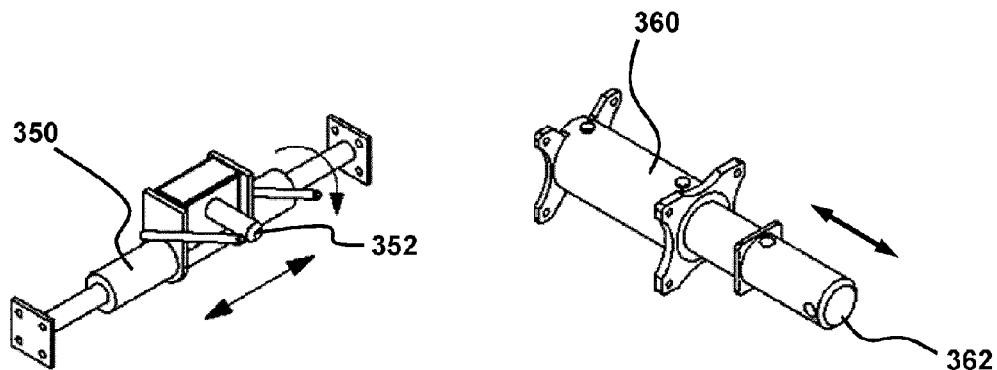
FIG. 67
FIG. 68

MOBILE STAGE FRAMEWORK AND METHOD OF HANDLING

CROSS REFERENCE TO PRIOR APPLICATIONS

This application is a national stage filing under Section 371 of International Patent Application No. PCT/CA2014/050158 filed on 3 Mar. 2014 and published in English as WO 2014/131135 A1 on 4 Sep. 2014. PCT/CA2014/050158 claims priority to U.S. patent application No. 61/771,675 filed on 1 Mar. 2013. The entire contents of PCT/CA2014/050158 and of U.S. patent application No. 61/771,675 are incorporated herein by reference in their entirety.

TECHNICAL FIELD

The technical field relates generally to mobile stage frameworks and to methods of handling mobile stage frameworks.

BACKGROUND

A mobile stage can be generally defined as a transportable construction to be assembled and disassembled at designated locations, generally outdoors, so as to provide a place where people such as musicians, actors, entertainers, politicians and spokespersons, to name just a few, can appear in front of a live audience. A mobile stage has a framework that generally includes an overhead roof structure supported by column structures and an elevated floor structure. The roof structure can provide a support for scenic equipment such as lights, wide screens, speakers and others, depending on the nature of the event and the venue.

Different arrangements have been suggested over the years in an attempt to simplify the handling of mobile stages as well as to minimize time and labor costs associated with assembling and disassembling them, especially when the mobile stages are only required for a relatively brief period of time at the same location and must be continuously relocated from one site to another. This resulted in a number of arrangements involving foldable frameworks integrated on a chassis that can be hauled by a truck tractor or by another vehicle. Many of these mobile stages are designed to reduce time and labor costs compared to arrangements that require a very large number of small individual parts to be transported and assembled on-site. Examples of mobile stages include U.S. Pat. No. 4,026,076 (Analetto) published on 31 May 1977, U.S. Pat. No. 5,947,502 (Kammerzell et al.) published on 7 Sep. 1999, EP-1754845 A1 (Sada Casabon) published on 21 Feb. 2007, and EP-2277739 A1 (Laorden Gomez et al.) published on 26 Jan. 2011, to name just a few.

One of the challenges in the design of a mobile stage is the ability of transporting it easily in a folded configuration, particularly on roads. A mobile stage constructed on a semitrailer chassis to be hauled by a truck tractor must comply with various requirements associated with transporting a load on roads, such as the overall dimensions, the maximum weight per axle, etc. Oversized and/or overweight semitrailers can still be permitted on some roads under certain conditions. However, having a mobile stage on an oversized and/or overweight semitrailer is generally undesirable since this complicates the transportation process and can significantly increase the transportation costs, especially if the mobile stage must be frequently relocated from one site to another. Very large mobile stages are often used, for instance, by popular rock bands for worldwide concert tours. Having an oversized and/or overweight load in such context can create undesirable complications. Thus, transport-related factors can create many challenges in the design and the handling of some mobile stages when using existing approaches, particularly for mobile stages having a framework that is relatively large in size.

Accordingly, there is still room for many improvements in this area of technology.

SUMMARY

The proposed concept provides a new approach in the design and the handling of a mobile stage framework. This approach involves the use of multiple independently transportable and self-contained units, one including an articulated floor structure and another one including an articulated roof structure.

In one aspect, there is provided a mobile stage framework having a lengthwise direction and a widthwise direction, the mobile stage framework including: a plurality of spaced-apart column structures; and a first and a second self-contained unit, both units being separated from one another when the mobile stage framework is fully disassembled for transportation, the first unit including an articulated floor structure having a folded transport configuration and a deployed working configuration, the second unit including an articulated roof structure having a folded transport configuration and a deployed working configuration, the floor structure and the roof structure each being in their deployed working configuration when the mobile stage framework is fully assembled and being in their folded transport configuration when the mobile stage framework is fully disassembled for transportation, the floor structure being removably secured to the column structures at first locations and the roof structure being removably secured to the column structures at second locations as well as being positioned directly above the floor structure when the mobile stage framework is fully assembled, the second locations being vertically above the first locations and being vertically movable with reference to the first locations when the mobile stage framework is being assembled and disassembled, the whole second unit being also laterally movable into and out of position above the first unit when the roof structure is unattached to the column structures and the mobile stage framework is being assembled and disassembled, respectively.

In another aspect, there is provided a method of handling a mobile stage framework during assembly, the method including: positioning a first transportable unit at a location, the first unit including an articulated floor structure that is in a folded transport configuration when the first unit is positioned at the location; securing the floor structure of the first unit to a plurality of spaced-apart column structures; positioning a second transportable unit over the first unit, the second unit including a roof structure and being physically separated from the first unit before the positioning of the second unit; securing the second unit to the plurality of column structures when the roof structure is in a deployed working configuration and at a low-level vertical position above the floor structure of the first unit, the floor structure being already secured to the column structures; and moving the roof structure to a high-level vertical position above the floor structure.

In another aspect, there is provided a mobile stage framework having a lengthwise direction and a widthwise direction, the mobile stage framework including: a plurality of spaced-apart column structures; and a first and a second separately transportable unit, each unit having a folded transport position and an unfolded working position, the first unit including a floor structure to be removably connected to the column structures when the first unit is in its unfolded working position, the second unit being slidable in and out of position over the first unit when the first unit is in its unfolded working position and the second unit is in its folded transport position, the second unit including a roof structure to be removably connected to the column structures when the second unit is in its unfolded working position.

In another aspect, there is provided a method of handling a mobile stage framework, the method including: positioning a first transportable unit at a location while the first unit is in a folded transport position, the first unit including a floor structure; setting the first unit in an unfolded working position; positioning a second transportable unit over the unfolded first unit while the second unit is in a folded transport position, the second unit including a roof structure and being physically separated from the first unit before the positioning of the second unit; and setting the second unit in an unfolded working position where the roof structure is located above the floor structure of the first unit.

The proposed concept also includes many other aspects and inventive features. Details on the various aspects and features of the proposed concept will be apparent and understood from the following detailed description and the appended figures.

BRIEF DESCRIPTION OF THE FIGURES

FIG. 17 is an enlarged isometric view of one of the telescopic supports of the column base of FIG. 16;

FIG. 18 is an isometric view of the actuator inside the telescopic support of FIG. 17;

FIG. 37 is a longitudinal side view of the first and second units shown in FIG. 36;

FIG. 38 is a longitudinal cross-sectional side view of the first and second units shown in FIG. 37;

FIGS. 65 to 75 show an example of how the column structures can be secured at opposite ends of one of the first longitudinal trusses of the roof structure;

DETAILED DESCRIPTION

The approach of the proposed concept is to provide most of the structural components of a mobile stage framework on multiple independently transportable and self-contained units, one including an articulated floor structure and another one including an articulated roof structure. The majority of the components of the mobile stage framework are then transported on site in these two complementary units, each being designed to be hauled by a corresponding truck tractor or be otherwise moved on or by another kind of vehicle. The other components of the mobile stage can be transported in one or more other semitrailers or the like. This includes handrails, stairs, back and side covers, etc.

Figure 1:
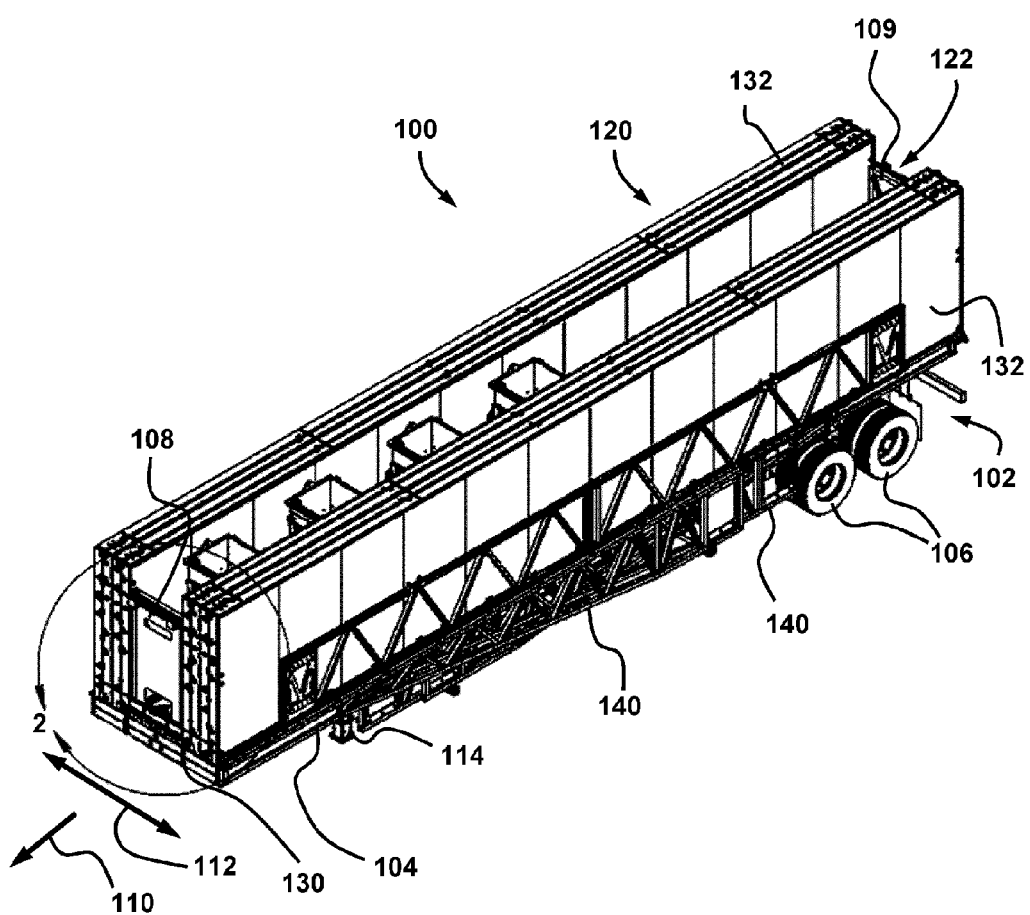
FIG. 1 is an isometric view illustrating an example of a first self-contained unit that is part of the framework of a mobile stage incorporating the proposed concept.
Figure 81:
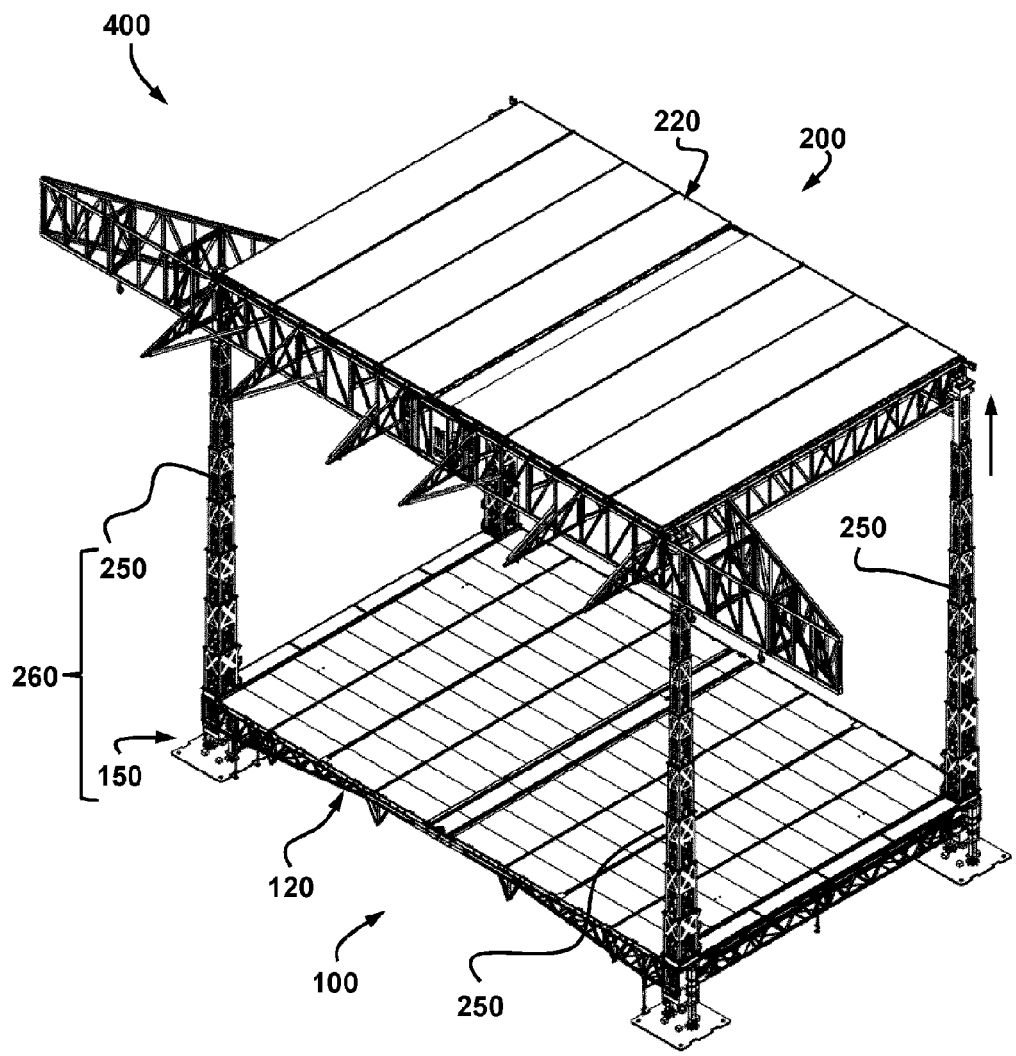
FIG. 81 is an isometric view showing the mobile stage framework once the floor structure and the roof structures are in their deployed working configuration and the columns of the column structures were extended to lift the roof structure.

FIGS. 1 to 81 illustrate the details of an example of an implementation incorporating the proposed concept. This mobile stage framework is constructed using two complementary units 100, 200 mounted on a corresponding semitrailer chassis for road transportation. Its other components are transported on two additional semitrailers. Thus, four truck tractors are required for moving all the parts of this mobile stage. Variants are possible as well.

FIG. 1 is an isometric view of the first unit 100. It is shown in a folded transport configuration. In this example, the first unit 100 is integrated on a first semitrailer 102 configured for road transportation.

The first semitrailer 102 includes a first chassis 104 (FIG. 4) and a corresponding set of rear wheels 106. It also includes other parts commonly found on semitrailers, such as lights, brakes, etc.

It should be noted that the center of gravity of the first semitrailer 102 will be relative high because of the presence of the first unit 100 thereon. The suspension of the rear wheels 106 is thus configured accordingly. The suspension can be for instance similar to the one often used on concrete trucks or on other vehicles having a relatively high center of gravity. Variants are possible as well.

The front end of the first semitrailer 102 is at the left in FIG. 1. In the illustrated example, the front end of the first semitrailer 102 corresponds to what will be the front center of the mobile stage (i.e. the side facing the audience). The longitudinal axis of the first semitrailer 102, which extends horizontally at its center, defines what is referred to as the lengthwise direction of the mobile stage framework. The lengthwise direction is shown in FIG. 1 using arrow 110. Arrow 112 represents the widthwise direction of the mobile stage framework, which widthwise direction 112 is orthogonal to the lengthwise direction 110. The widthwise direction 112 can be from the center of the first semitrailer 102 towards the left, or from the center of the first semitrailer 102 towards the right, depending on the context.

FIG. 1 shows the first unit 100 after it was parked at the location where the mobile stage is needed. The truck tractor (not shown) was detached from the first semitrailer 102 and moved away from it.

The front end of the first semitrailer 102 will be supported by a pair of front vertically-extending supporting legs 114. The front supporting legs 114 are telescopic and are adjustable in length. The bottom end of the front supporting legs 114 can rest on one or more supporting blocks 118 (FIG. 3) to prevent the front supporting legs 114 from sinking into a soft or soften ground and/or from damaging the ground surface. These blocks 118 can be made for instance of wood or other materials. Variants are possible as well.

As aforesaid, the first unit 100 includes an articulated floor structure 120 that is in a folded transport configuration in FIG. 1. The floor structure 120 of the illustrated example is integrated onto an elongated base platform 130, which base platform 130 extends in the lengthwise direction 110. The base platform 130 is located at the center of the floor structure 120. The floor structure 120 includes two sets of floor panels 132. One set is on the left side of the base platform 130 and one set is on the right side thereof. The deployment of these floor panels 132 will create the major portion of the upper stage floor surface.

Initially, when the floor structure 120 is in its folded transport configuration, all floor panels 132 of each set are in a vertical transport position and are compactly folded against one another. The adjacent floor panels 132 are then juxtaposed side-to-side. The two innermost floor panels 132 (i.e. the first ones of each set) are spaced apart from one another. The space between them can be used as a storage bay for other components, for instance like the storage bay 122 that extends substantially along an entire length of the base platform 130 in the illustrated example. In FIG. 1, the front end and the rear end of the storage bay 122 are closed by corresponding front and rear end panels 108, 109 removably secured to the base platform 130. These end panels 108, 109 are for transportation purposes but they are also used in the illustrated example to prevent the two sets of floor panels 132 from pivoting inwards around the hinges that connect the two innermost ones of the floor panels 132 to the base platform 130. Thus, the end panels 108, 109 will be kept in place at least until the floor panels 132 are moved away from their vertical transport position.

When the floor structure 120 is in its deployed working configuration, all floor panels 132 will be in a horizontal working position and their top surfaces will be coplanar. The floor panels 132 of each set are juxtaposed end-to-end.

In the illustrated example, each floor panel 132 is made of a plurality of smaller floor panel sub-sections connected at mating side edges to form each elongated floor panel 132. These floor panels 132 have a lengthwise dimension that is substantially similar to that of the base platform 130. Thus, the floor panels 132 of the illustrated example extend over the full length of the first unit 100. Each floor panel 132 also has an underlying frame, for instance made of metallic beams or the like. The upper surface of each floor panel 132 can be made of plywood boards or the like that are attached to the frame. Variants are possible as well.

Figure 2:
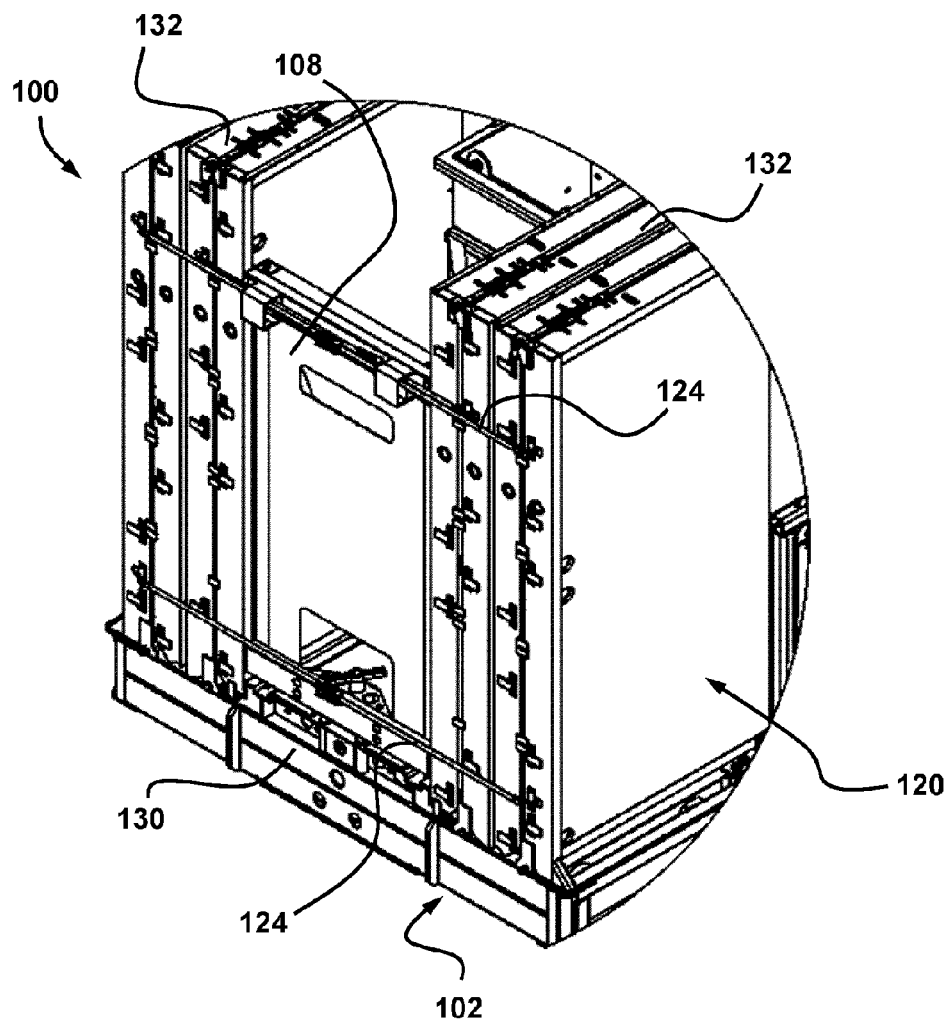
FIG. 2 is an enlarged isometric view of the first unit shown in FIG. 1.

FIG. 2 is an enlarged isometric view of the front end of the first unit 100. It shows that transversal straps 124 are used in this example to secure the floor panels 132 in their vertical transport position. Variants are possible as well.

Figure 3:
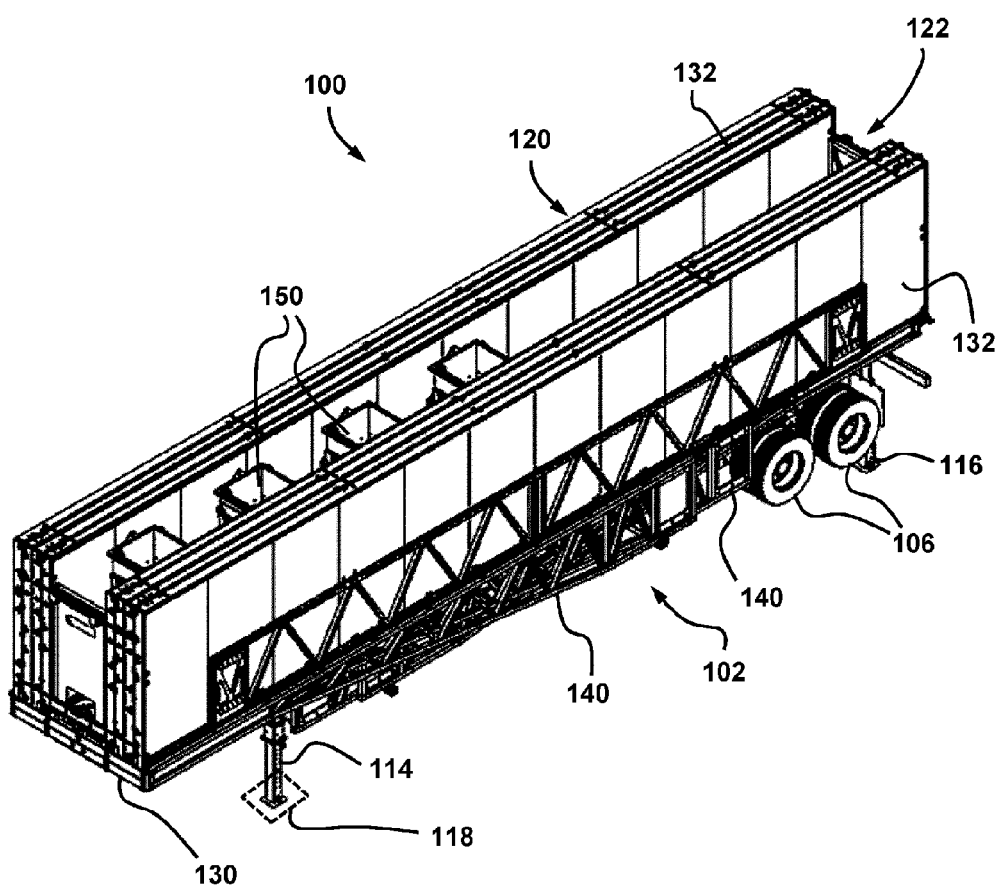
FIG. 3 is a view similar to FIG. 1 but with the rear supporting legs being lowered to raise the rear wheels above the ground.

FIG. 3 is a view similar to FIG. 1 but shows the rear end of the first semitrailer 102 being supported by a pair of rear vertical supporting legs 116. The rear vertical supporting legs 116 in the illustrated example are lowered to raise the rear wheels 106 off the ground. Supporting blocks (not shown) can be provided between the bottom end of the rear supporting legs 116 and the ground. The base platform 130 is then leveled by adjusting the height of the front and rear vertical supporting legs 114, 116.

As can be seen in FIGS. 1 and 3, the floor structure 120 includes a plurality of joists that are transported on each side of the first unit 100 in the illustrated example. Other parts are also present as well on the sides of the first unit 100.

Two sets of joists 140, 142 are provided in the illustrated floor structure 120 to support the floor panels 132 when they are in their horizontal working position. One set of joists 140, 142 is on the left side of the base platform 130 and one set of joists 140, 142 is on the right side thereof. Each set of the illustrated example includes a plurality of first joists 140 and one second joist 142. The second joist 142 is located at the center. One of the second joists 142 can be seen in a folded stowed position in FIG. 4. A total of eight joists 140 and two joists 142 are provided in the illustrated example. Variants are possible as well. For instance, the number, the shape and/or the spacing of the joists can be different in other implementations.

Initially, when the floor structure 120 is in its folded transport configuration, as shown for instance in FIG. 1, the joists 140, 142 extend longitudinally against the sides of the base platform 130 for transportation. The joists 140, 142 are thus parallel to the lengthwise direction and are very compact in this position.

Figure 4:
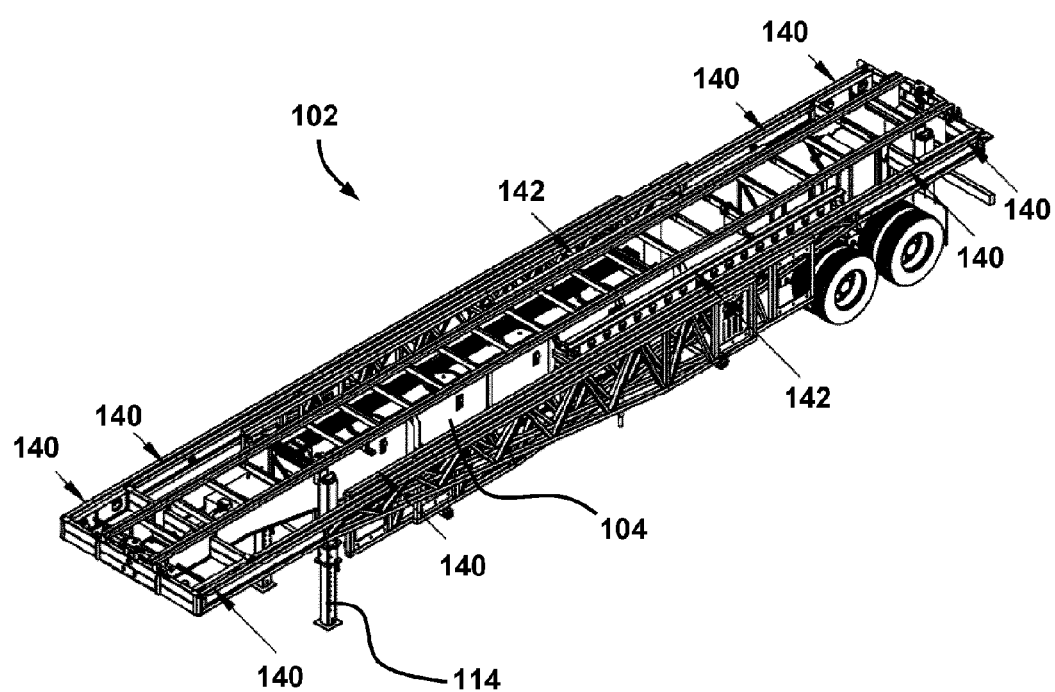
FIG. 4 is an isometric view of the first unit of FIG. 1 but without the parts above the base platform for the sake of illustration.

FIG. 4 is an isometric view of the first unit 100 but without the parts above the base platform 130 for the sake of illustration. FIG. 4 shows the chassis 104 of the first semitrailer 102. The chassis 104 includes two spaced-apart main frame rails. The main frame rails extend longitudinally in the first semitrailer 102 and they are interconnected by a plurality of crossbeams.

Figure 5:
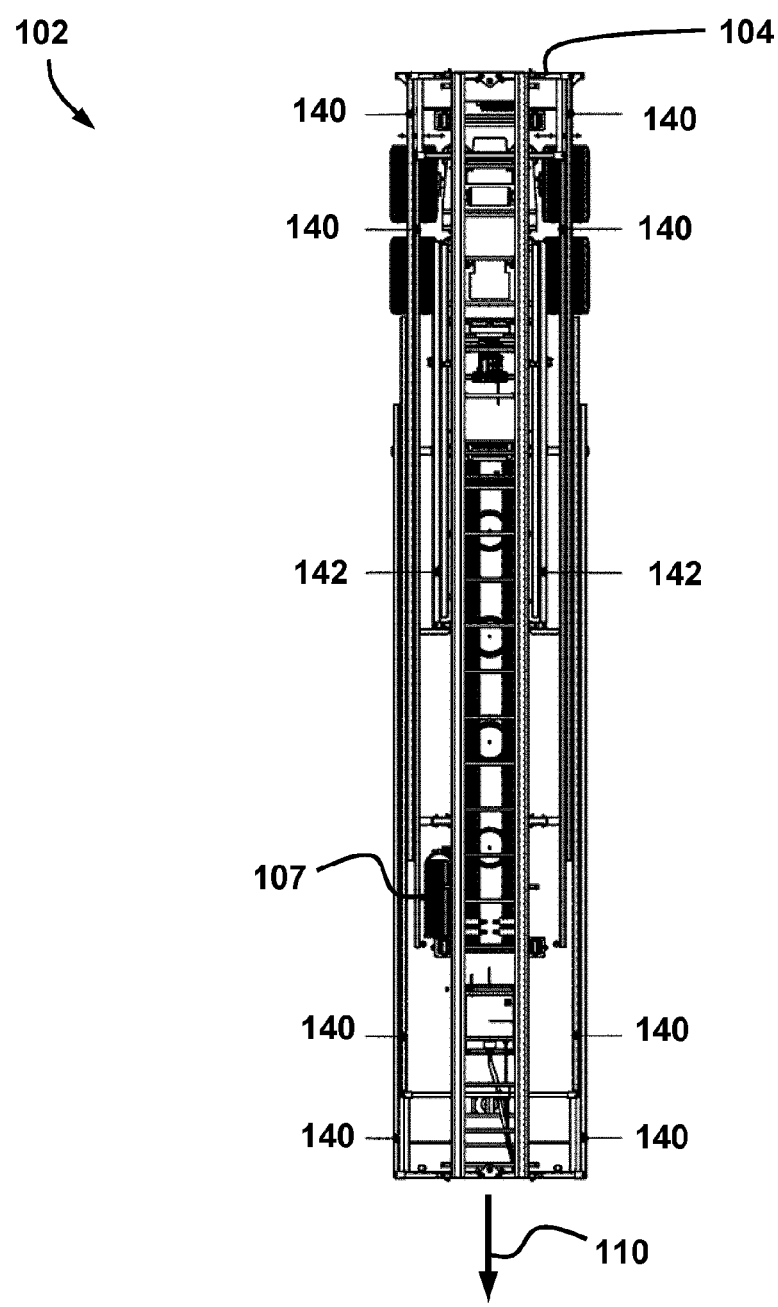
FIG. 5 is a top view of the first unit as shown in FIG. 4.

FIG. 5 is a top view of the first unit as shown in FIG. 4.

The first unit 100 is designed to be as autonomous as possible. In the illustrated example, equipment such as a diesel power generator, batteries and a hydraulic system having pumps, reservoirs, valves and other features commonly found in hydraulic systems, to name just a few, are provided in-between the two main frame rails of the chassis 104. The various circuits and valves can be controlled using, for instance, a wireless remote console. Variants are possible as well. The hydraulic reservoirs are designed in independent sections in the event of a leak. The hydraulic system of the first unit 100 will also provide the pressurized hydraulic fluid for the second unit 200 later in the assembly. All hydraulic actuators of the first and second units 100, 200 are connected to the hydraulic system of the first unit 100. The front and rear vertical supporting legs 114, 116 of the first semitrailer 102 are also powered by this hydraulic system. However, the second semitrailer in the illustrated example uses another hydraulic system for his supporting legs. Variants are possible as well.

Figure 6:
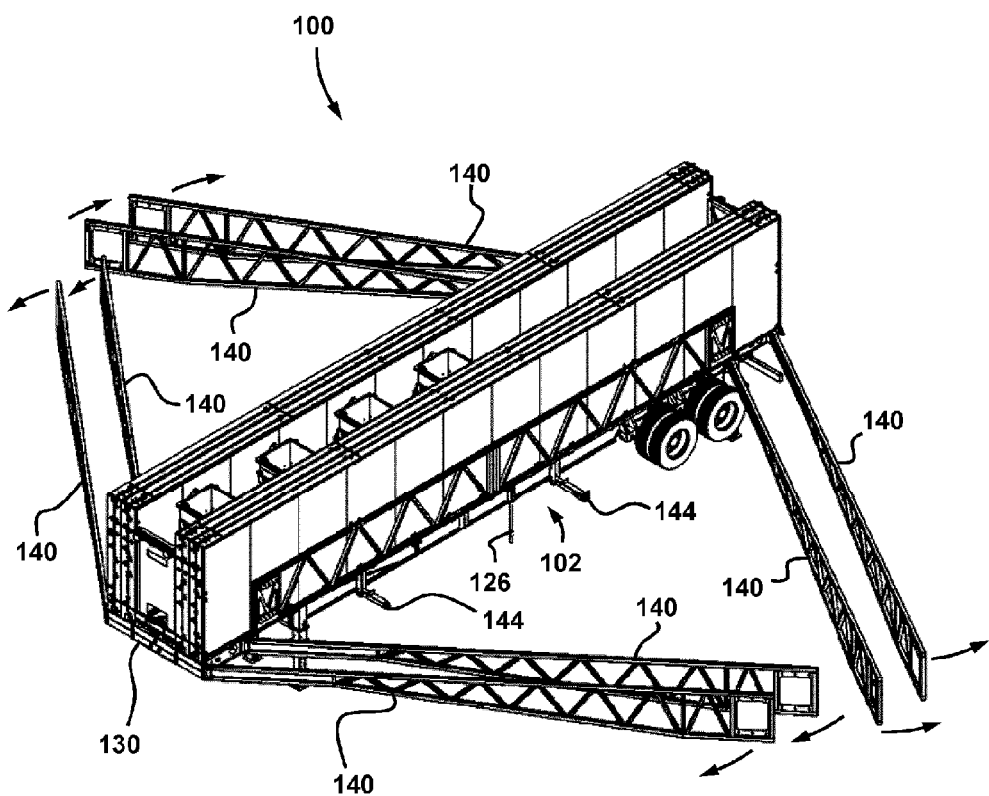
FIG. 6 is an isometric view showing some of the joists being opened and supported.

FIG. 6 is an isometric view showing the joists 140 being opened. The proximal end of the first joists 140 are pivotally connected to the base platform 130. FIG. 6 also shows the brackets 144 that are provided on each side of the base platform 130 to support the first joists 140 when the floor structure 120 is in its folded transport configuration. In the illustrated example, the lower half of these brackets 144 is slidable from a horizontal position to a position towards the vertical where it can get under the first joists 140 using a hydraulic actuator. Although the hinges at the proximal ends of the first joists 140 are very strong, the weight of each first joist 140 can be very important, particularly in large implementations. The distal end of the first joists 140 will thus tend to be slightly lower than the proximal end thereof. The hydraulic actuator of the brackets 144 will lift them during transportation but will release them for unfolding the first unit 100. The handling of the first unit 100 is thus greatly facilitated.

FIG. 6 further shows one of the vertical retractable stands 126 provided under the first semitrailer 102. Each of these stands 126 can be manually operated using a corresponding actuator to lower or lift it with reference to the ground. Only one of these stands 126 is shown. However, the first unit 100 can include numerous stands 126. Supporting blocks (not shown) can be provided between the bottom end of the stands 126 and the ground. The stands 126 will assist in supporting the weight of the mobile stage framework.

In the illustrated example, each set also includes four first joists 140, two near the front end of the base platform 130 and two near the rear end thereof. Second joists 142 are also provided, one on the left side and one on the right side. The second joists 142 are pivotally connected to a corresponding side of the base platform 130 at approximately the center of its length. They are made of two sections pivotally connected end-to-end. Variants are also possible.

Figure 7:
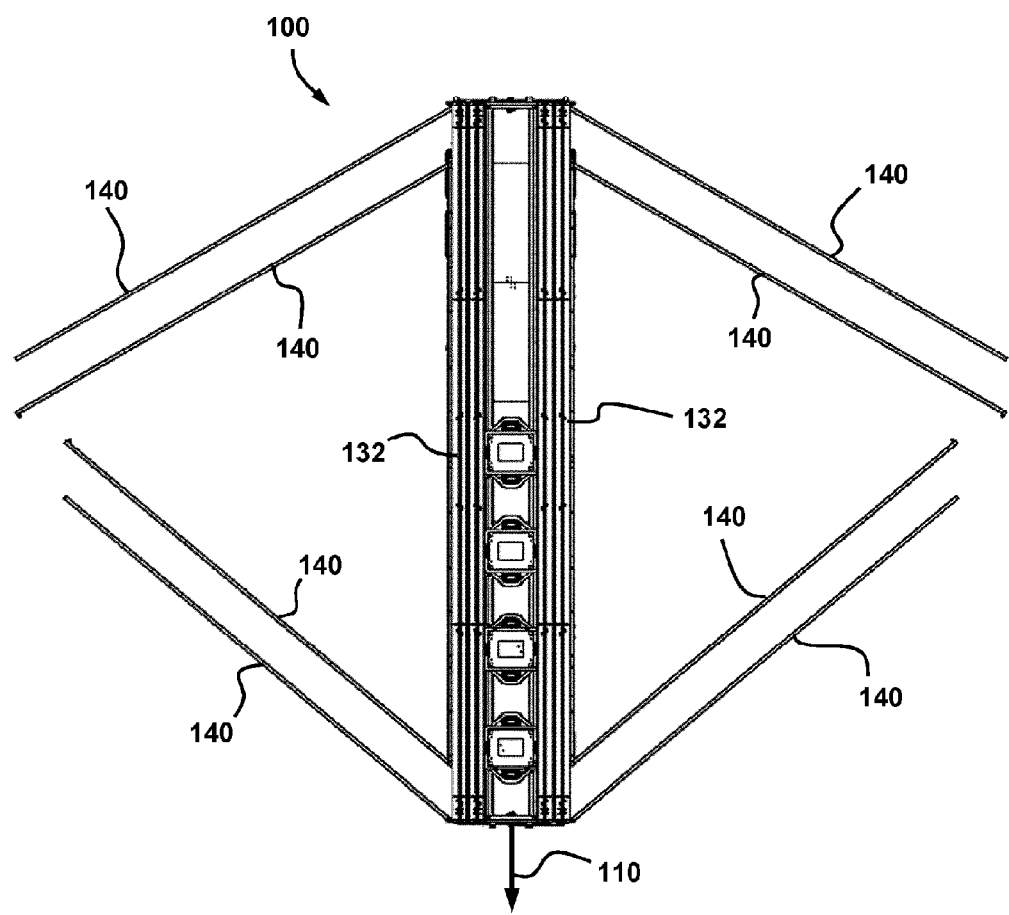
FIG. 7 is a top view of the first unit as shown in FIG. 6.

FIG. 7 is a top view of the first unit 100 as shown in FIG. 4. The front end of the first unit 100 is at the bottom of this figure.

Figure 8:
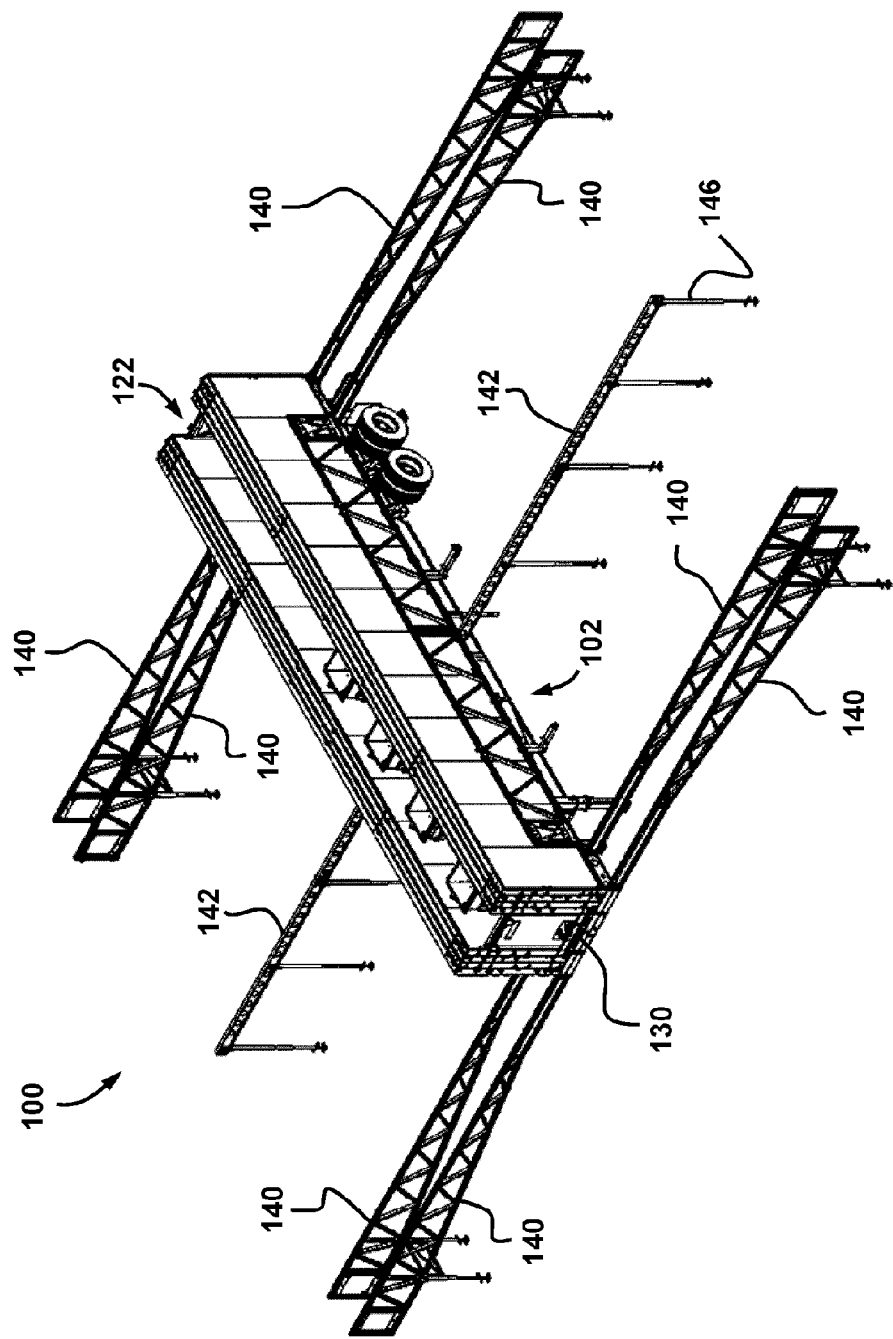
FIG. 8 is an isometric view showing the joists being fully opened.

FIG. 8 is an isometric view showing the joists 140, 142 being fully opened and supported. The joists 140, 142 remain horizontal using a plurality of vertical stands 146. These stands are installed at various locations along their length immediately after pivoting the joists 140, 142 to their transversal position. A manually-movable lifting arrangement, for instance one including a winch, can be used to lift the joists 140, 142 when installing the stands 146. Variants are possible as well.

Figure 9:
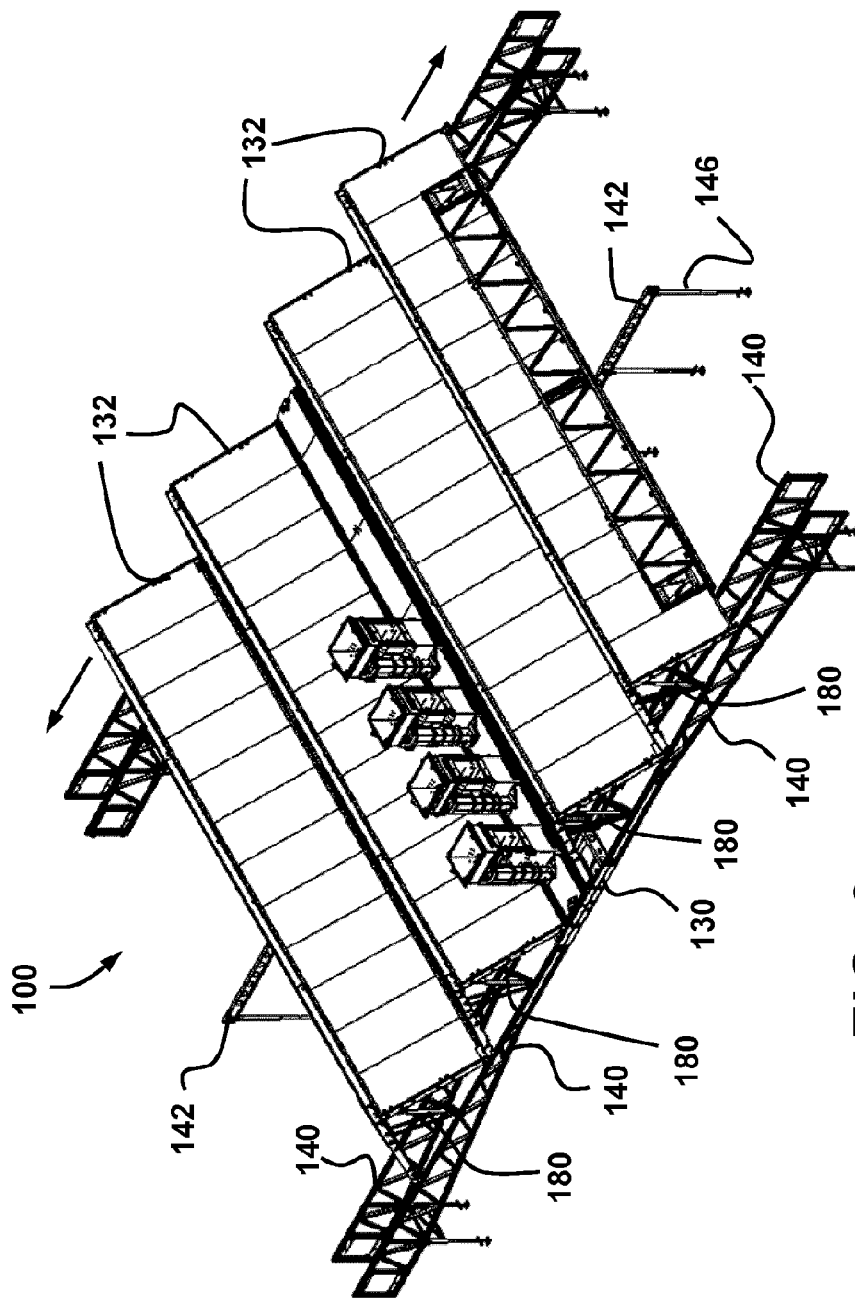
FIG. 9 is an isometric view showing the floor panels being moved towards their horizontal working position.

FIG. 9 is an isometric view showing the floor panels 132 being moved towards their horizontal working position. In this example, both sides are moved at the same time. Their deployment is made using an arrangement including a plurality of vertically-disposed floor panel hydraulic actuators 180 and linking arms. Variants are also possible.

Figure 10:
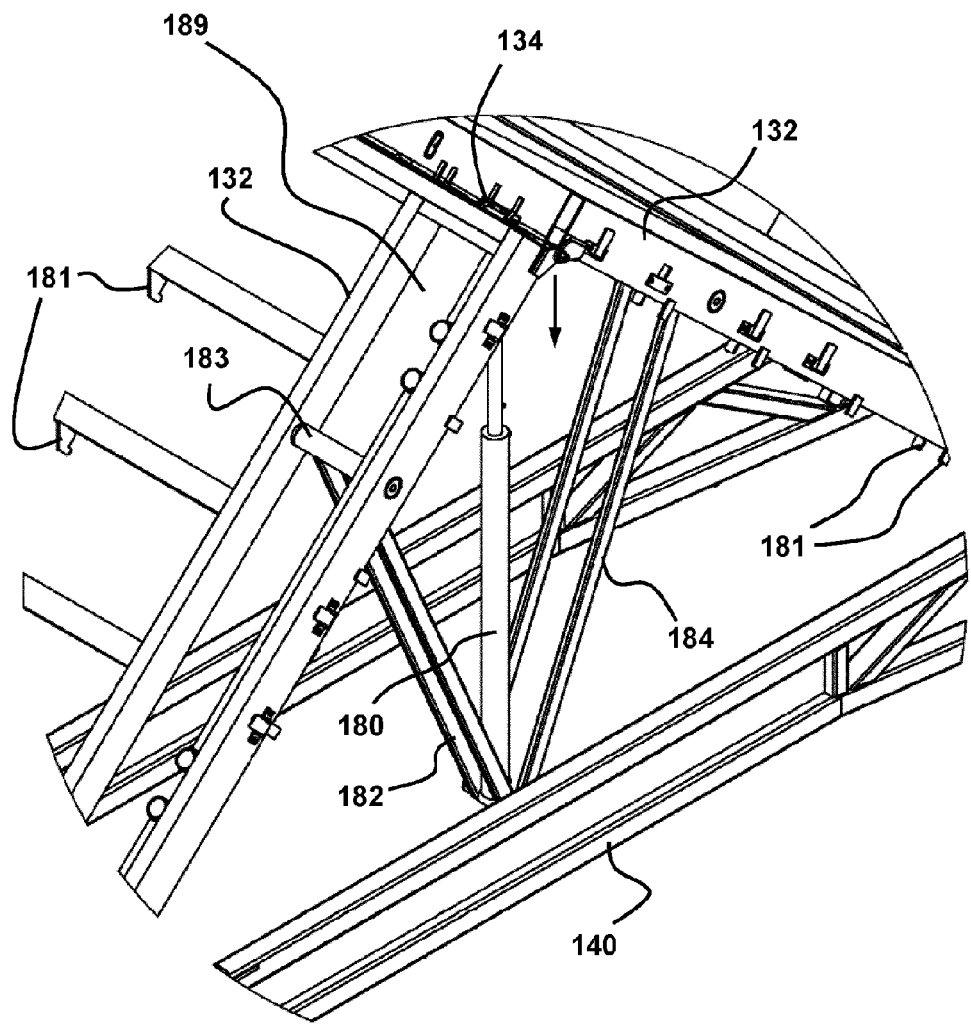
FIG. 10 is an enlarged isometric view showing one of the actuators of FIG. 9 and other adjacent components.

FIG. 10 is an enlarged isometric view showing one of the actuators 180 of FIG. 9 and other adjacent components. It should be noted that in FIG. 10, the floor panels 132 are illustrated without their top surface, for instance without the plywood boards. Only their supporting frame is visible but this is simply for the purpose of illustration. FIG. 10 also shows some of the side tabs 181 that are provided under the floor panels 132 of the illustrated example to keep the joists 140, 142 in alignment with the floor panels 132.

Figure 11:
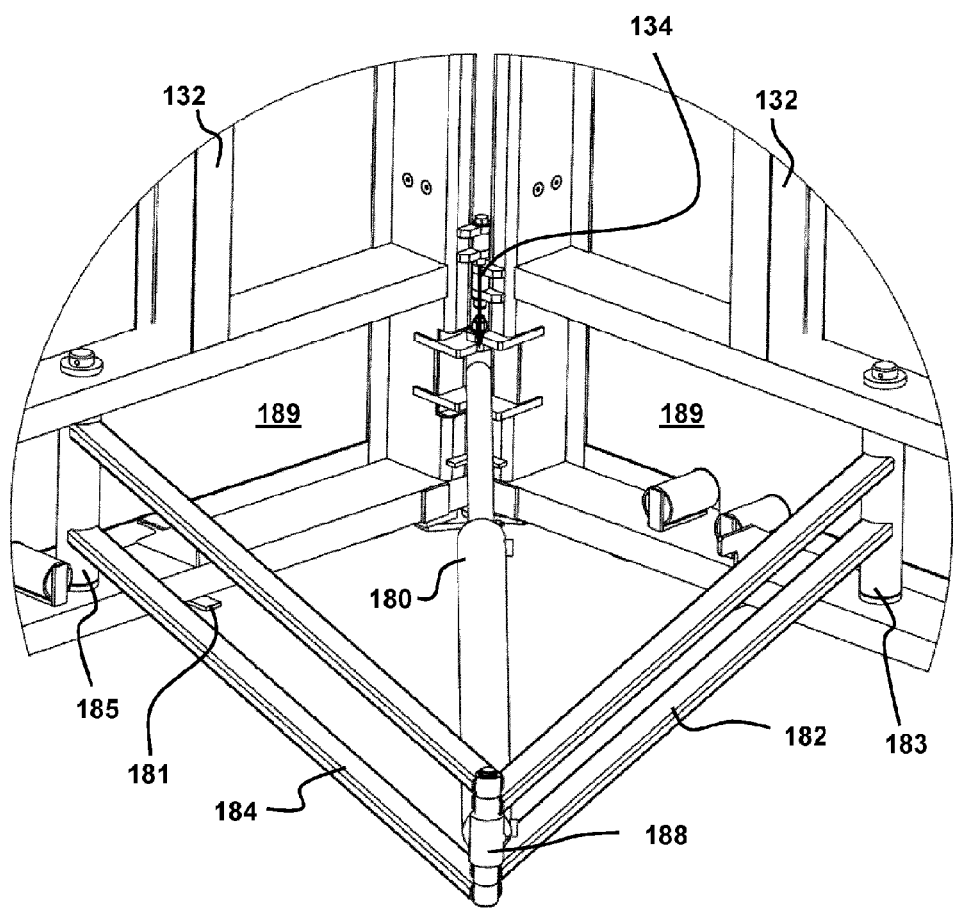
FIG. 11 is a bottom view of what is shown in FIG. 10.

FIG. 11 is a bottom view of what is shown in FIG. 10.

During their deployment, the weight of the floor panels 132 is supported in most part by the first joists 140 and the second joists 142. The actuators 180 and the linking arms 182, 184 also hold the floor panels 132 and prevent them from dropping due to gravity.

IN the illustrated example, each actuator 180 has an upper end pivotally connected to a corresponding upper panel hinge 134 provided between the two adjacent floor panels 132. The actuator 180 also has a bottom end pivotally connected to a bottom pivot 188 interconnecting the bottom end of the two corresponding linking arms 182, 184. Each linking arm 182, 184 has an upper end pivotally connected to a respective one of the adjacent floor panels 132 using corresponding pivots 183, 185.

When the floor panels 132 are in their vertical transport position, the actuators 180 are fully extended. The linking arms 182, 184 of each subassembly are then almost parallel to one another and are inside corresponding spaces 189 in the underlying frame of the floor panels 132. The floor panels 132 are deployed by contracting the actuators 180 substantially at the same time and/or by small increments. This will move the floor panels 132 outwards and the floor panels 132 will always be supported throughout this deployment. Thus, the use of external machinery, such as cranes, cables or the like, can be omitted for opening the floor panels 132, unlike existing mobile stages having more than two adjacent floor panels 132 on each side.

Figure 12:
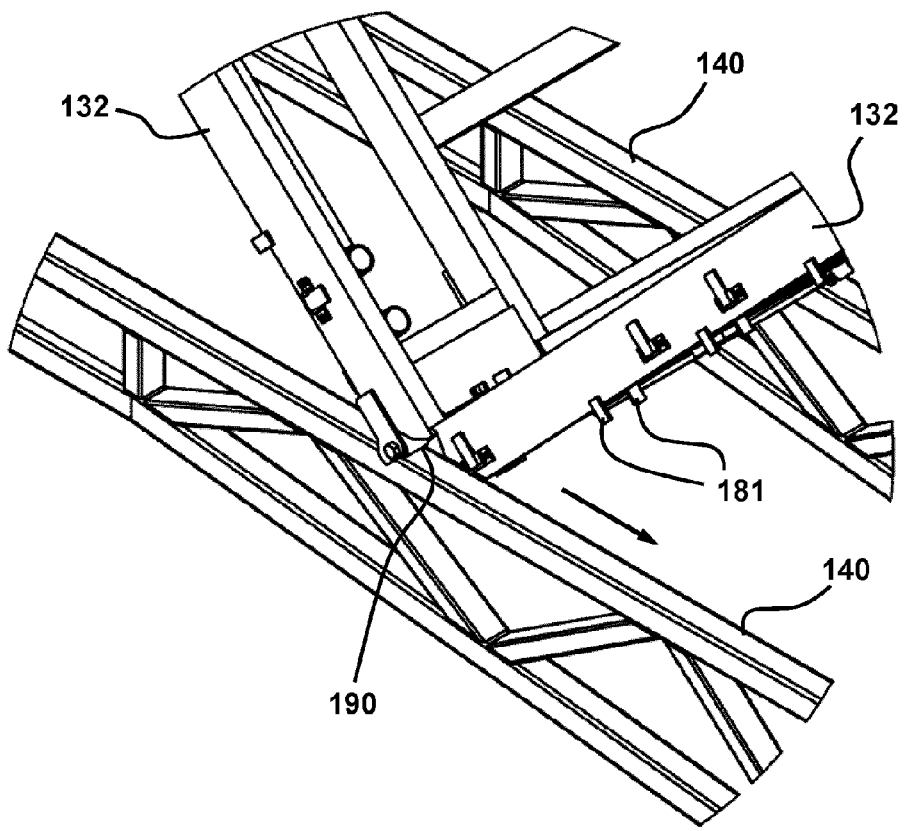
FIG. 12 is an enlarged isometric view showing an example of the bottom junction between two of the adjacent floor panels of FIG. 9.

FIG. 12 is an enlarged isometric view showing an example of the bottom junction between two of the adjacent floor panels 132 of FIG. 9. As can be seen, a follower 190 is provided near the bottom junction between the two adjacent floor panels 132. In the illustrated example, the follower 190 is a roller and the roller is in engagement with the top edge surface of the corresponding first joist 140. It rolls thereon during the movement of the floor panels 132. Similar rollers are provided for engaging the top edge surface of the second joists 142. Rollers are not the only kind of followers that can be used and in some implementations, one can use or also use sliding cushions or the like.

Figure 13:
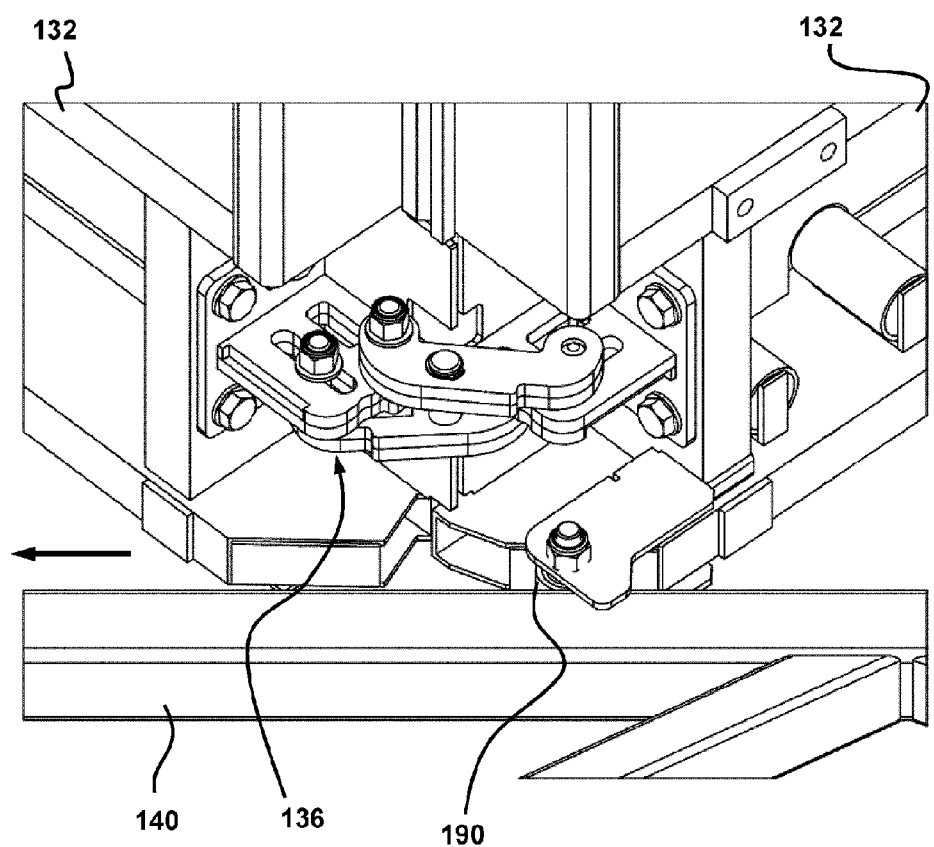
FIG. 13 is an isometric view illustrating an example of a bottom panel hinge between two of the adjacent floor panels of FIG. 9.

FIG. 13 is an enlarged bottom isometric view illustrating an example of a bottom panel hinge 136 between two of the adjacent floor panels 132 of FIG. 9.

Figure 14:
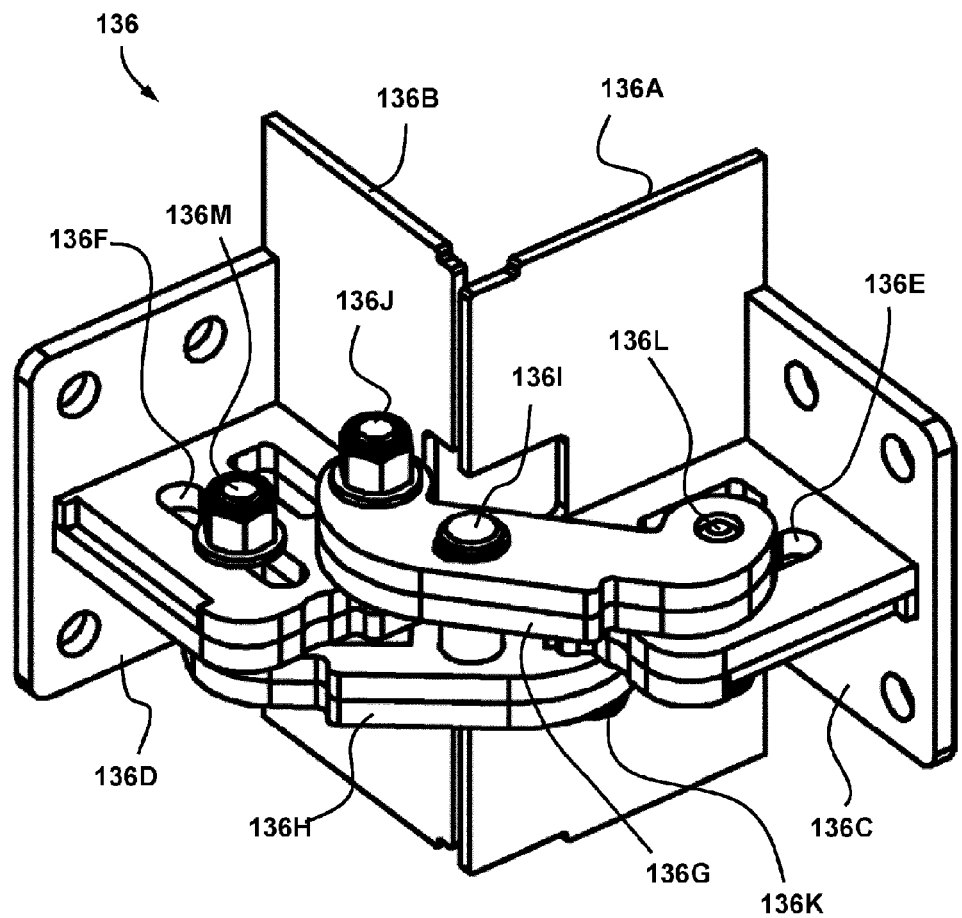
FIG. 14 is an enlarged isometric view of the bottom panel hinge shown in FIG. 13.

FIG. 14 is an enlarged isometric view of the bottom panel hinge 136 shown in FIG. 13. This bottom panel hinge 136 is designed to hold the floor panels 132 together is any of their possible positions but without having a portion of the hinge protruding above the upper stage floor surface and that could create undesirable obstacles. Thus, the bottom panel hinges 136 are designed to be fully concealed when the floor structure 120 is in its deployed working configuration. They are also very compact when the floor structure 120 is its folded transport configuration.

As shown in FIG. 14, the bottom panel hinge 136 includes an inboard flat portion 136A and an outboard flat portion 136B. Both portions have a similar construction in the illustrated example. Their top surfaces will extend flush with the upper stage floor surface when the floor panels 132 are in their horizontal working position. A T-shaped bracket 136C, 136D is provided under each flat portion 136A, 136B to connect it to the corresponding floor panel 132, for instance using bolts or the like. Each bracket 136C, 136D also includes a transversally-disposed inner flange having a rectilinear slot 136E, 136F. The slots 136E, 136F receive a slide pin provided at the free end of a corresponding lever arm 136G, 136H that is pivotally connected to the opposite bracket 136D, 136C, respectively. The lever arms 136G, 136H are in an inverted position with reference to one other. Both lever arms 136G, 136H are pivotally connected together using a medial axle pivot 136I. The medial axle 136I extends horizontally and parallel to the pivot axis of the floor panels 132. Changing the relative angle between the floor panels 132 will pivot the pivot axes 136J, 136K. The various components of the bottom panel hinge 136 are configured and disposed so as not to interfere with the relative movements of the floor panels 132. Variants are possible as well.

Figure 15:
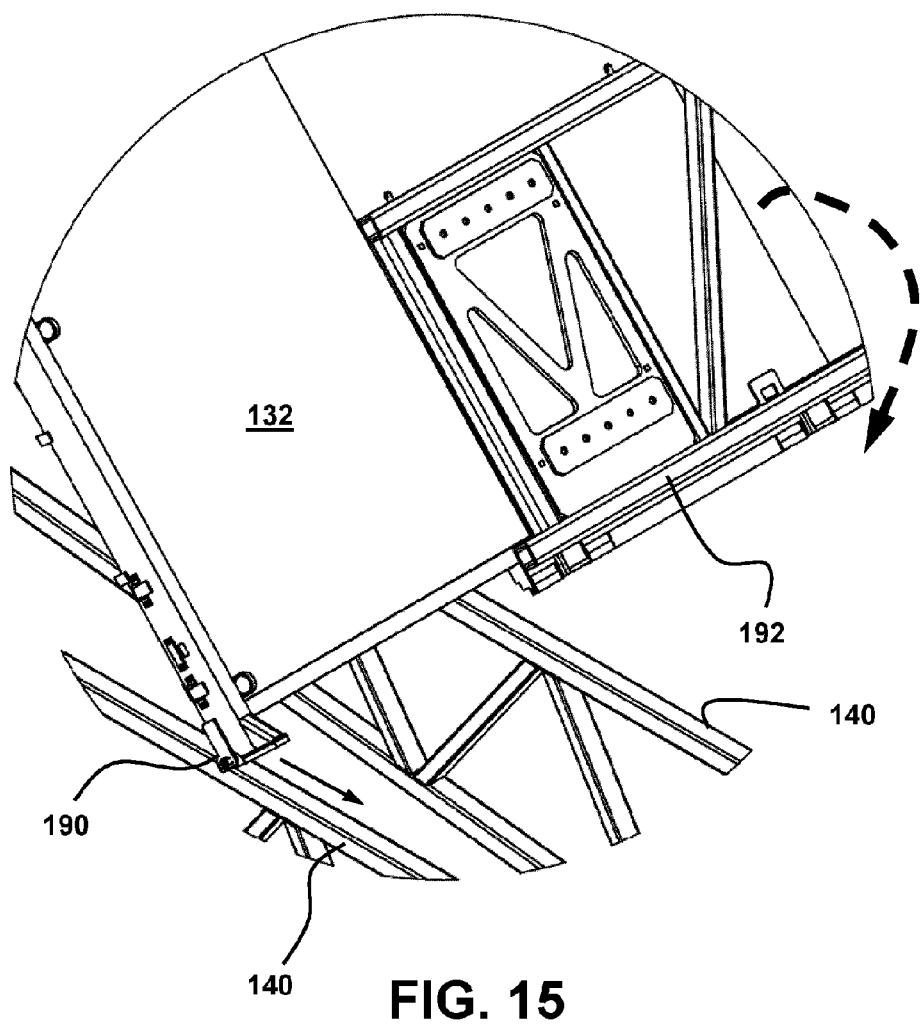
FIG. 15 is an enlarged isometric view showing the last one of the floor panels of one of the sets of floor panels in FIG. 9.

FIG. 15 is an enlarged isometric view showing the last one of the floor panels 132 of one of the sets of floor panels in FIG. 9. It also shows that followers 190 also engage the top edge surface of the joists 140, 142 at the bottom of the outermost floor panels 132.

Figure 22:
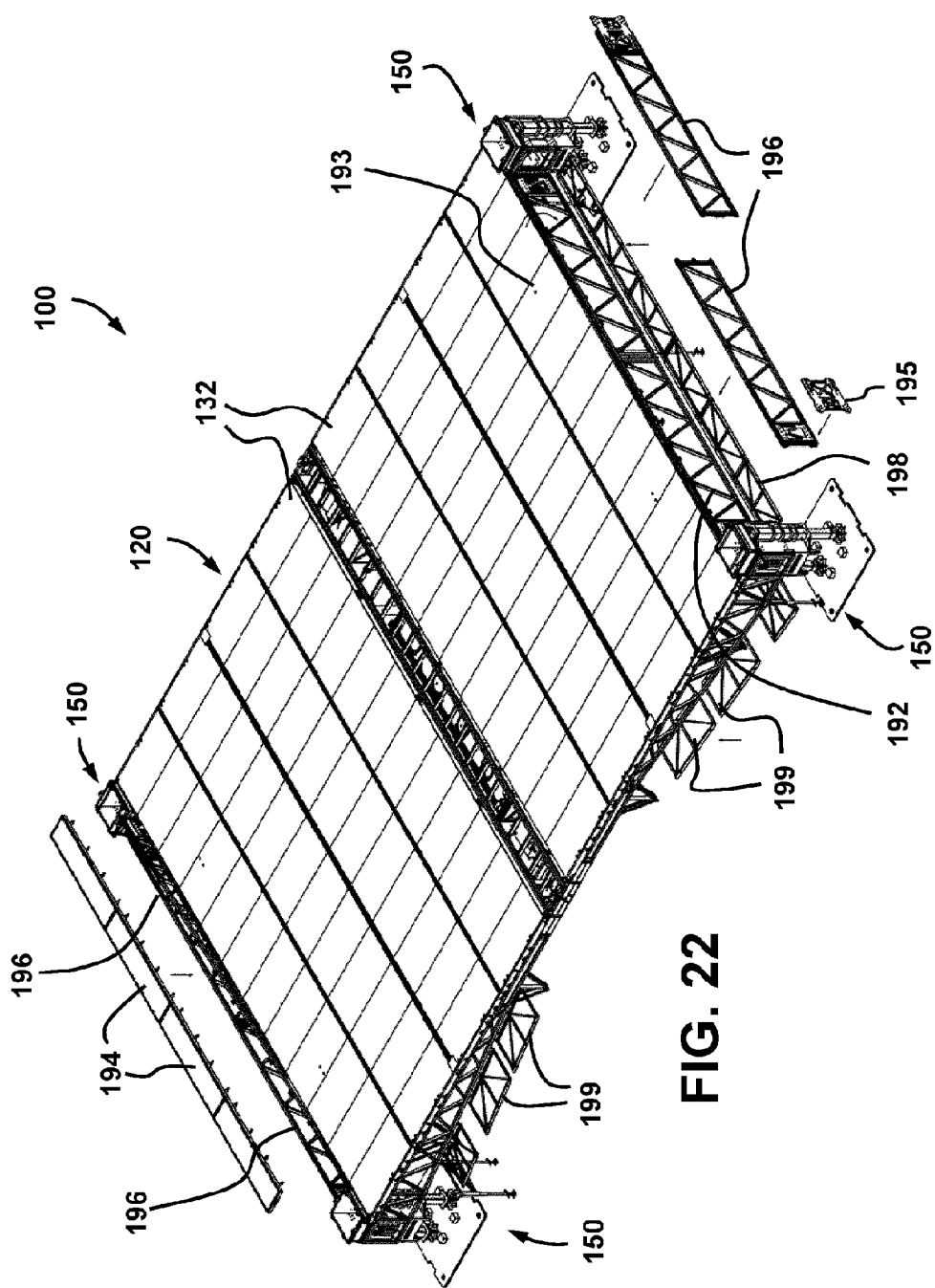
FIG. 22 is an isometric view showing the floor panels being in their horizontal working position and showing other elements being added to the floor structure.

FIG. 15 further also additional joists 192 can be provided. These additional joists 192 can be attached on the left and right sides of the floor structure 120 for reinforcement. They will extend in the lengthwise direction between two of the column bases 150 and they are pivoted 270 degrees from a transport position to a working position in the illustrated example, as schematically depicted in FIG. 22. Beforehand, the joists 192 were bolted to the last one of the floor panels 132 of each set, as shown. It should be noted that the threaded holes 193 for these bolts are visible in FIG. 22 and also in subsequent figures. The joists 192 can be connected between the column bases 150, on each side, for instance using plates 195 that are shown in FIG. 22. Variants are also possible.

Figure 16:
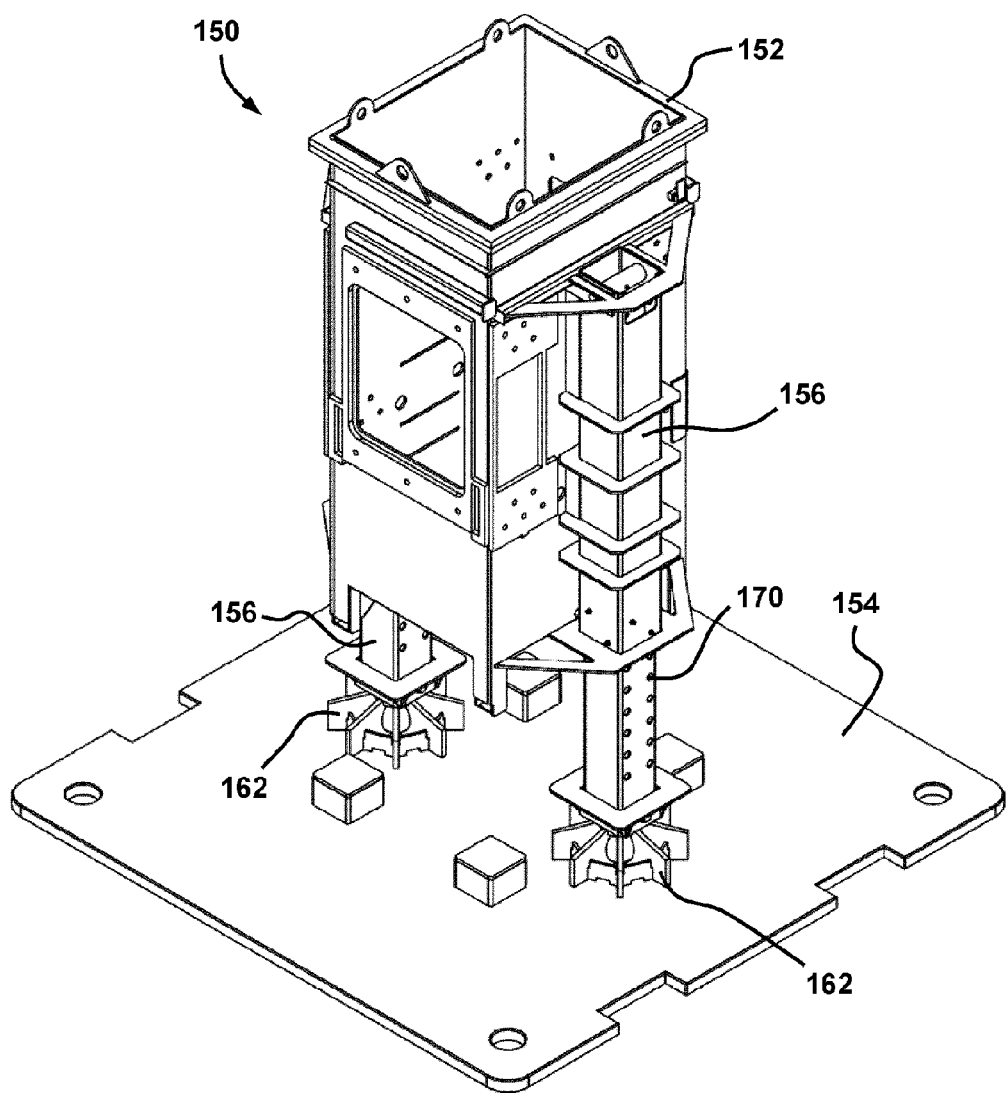
FIG. 16 is an isometric view illustrating an example of a column base for use with the first unit of FIG. 1.

FIG. 16 is an isometric view illustrating an example of a column base 150 for use with the first unit 100. The distal end of each first joist 140 will be connected to a corresponding one of the column bases 150. The column bases 150 are part of column structures, as described later in the text. Four column bases 150 are provided in the illustrated example, one for each corner of the mobile stage framework. Variants are possible. For instance, more or less column structures can be required, depending on the implementations. Many other variants are possible as well.

The column bases 150 are transported inside the storage bay 122 in the illustrated first unit 100. This can be seen for instance in FIGS. 1 to 3 and 6 to 9. Equipment such as a lift, a crane or the like can be used to move the column bases 150 in or out of the storage bay 122. Variants are possible and accordingly, the column bases 150 can be transported elsewhere in some implementations.

As can be seen, the illustrated column base 150 includes a vertically-extending frame 152 having a square-shaped cross section and a ground-engaging plate 154. The ground-engaging plate 154 has a relatively large surface area to distribute the weight on the ground. The connection between the frame 152 and the corresponding plate 154 is made using a pair of vertically-extending telescopic supports 156, one on each side of the frame 152. The telescopic supports 156 are positioned opposite one another in the widthwise direction 112. Variants are possible as well.

FIG. 17 is an enlarged isometric view of one of the telescopic supports 156 of the column base 150 of FIG. 16. The telescopic support 156 includes two beams having a square cross-section, one being inserted into the other. A hydraulic actuator 158 is provided inside each telescopic support 156. The top of the actuator 158 is connected to the top beam and the bottom of the actuator 158 is connected to the bottom beam. The bottom beam also includes a plurality of holes 170 for receiving pins (not shown). The pins will hold the weight on the column base 150 at the desired height when the hydraulic pressure will be removed from the actuator 158. The pins will thus prevent the top beam from sliding downwards too far on the bottom beam.

FIG. 18 is an isometric view of the actuator 158 inside the base support of FIG. 17. The two actuators 158 of the column base 150 are independently adjustable and fine adjustments can be made when needed to level the column base 150. Again, variants are possible as well.

The bottom end of each telescopic support 156 rests on the plate 154 through a corresponding socket 162, as shown in FIG. 16. Each socket 162 of the illustrated example includes a plurality of radially-disposed vertical flanges creating a central open space that can receive a weight-supporting ball 164.

Figure 19:
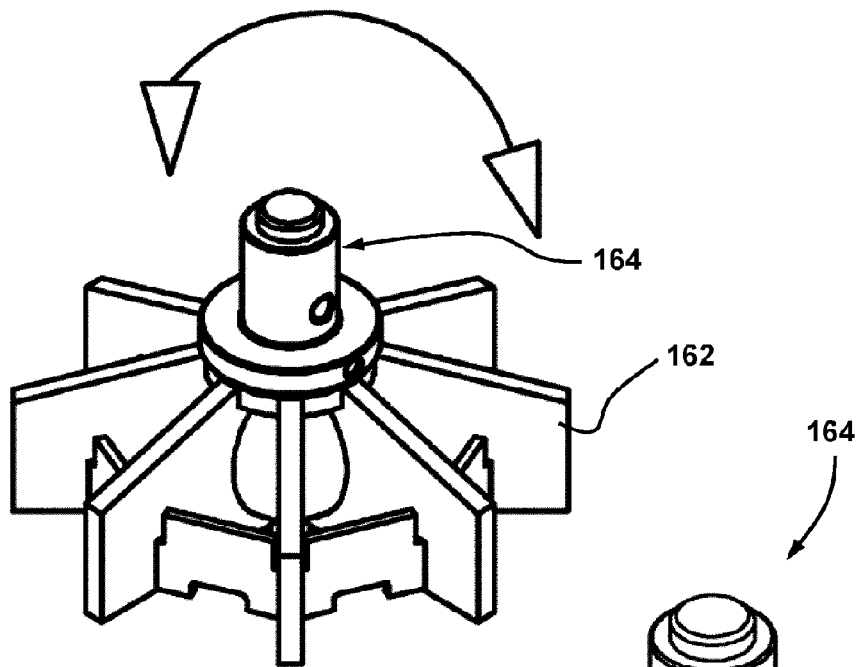
FIG. 19 is an isometric view of one of the sockets of FIG. 16 with its corresponding weight-supporting ball.

FIG. 19 is an isometric view of one of the sockets 162 of FIG. 16 with its corresponding weight-supporting ball 164.

Figure 20:
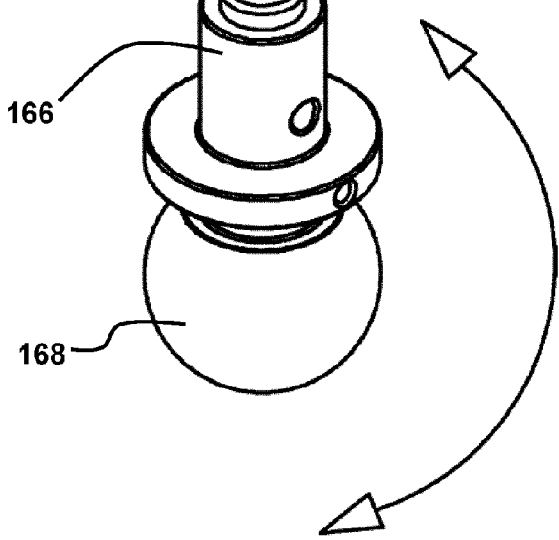
FIG. 20 is an isometric view of the weight-supporting ball of FIG. 19.

FIG. 20 is an isometric view of the weight-supporting ball 164 of FIG. 19. The ball 164 includes a top cylindrical connector 166, to which the bottom end of the telescopic support 156 is attached, and a bottom ball-shaped portion 168 engaging the inner edges of the flanges of the corresponding socket 162. This arrangement provides some freedom of movement to compensate for the usual irregularities on the ground. The plate 154 is thus often not necessarily perfectly horizontal on the ground and the orientation of the frame 152 of the column base 150 may need to be adjusted.

Figure 21:
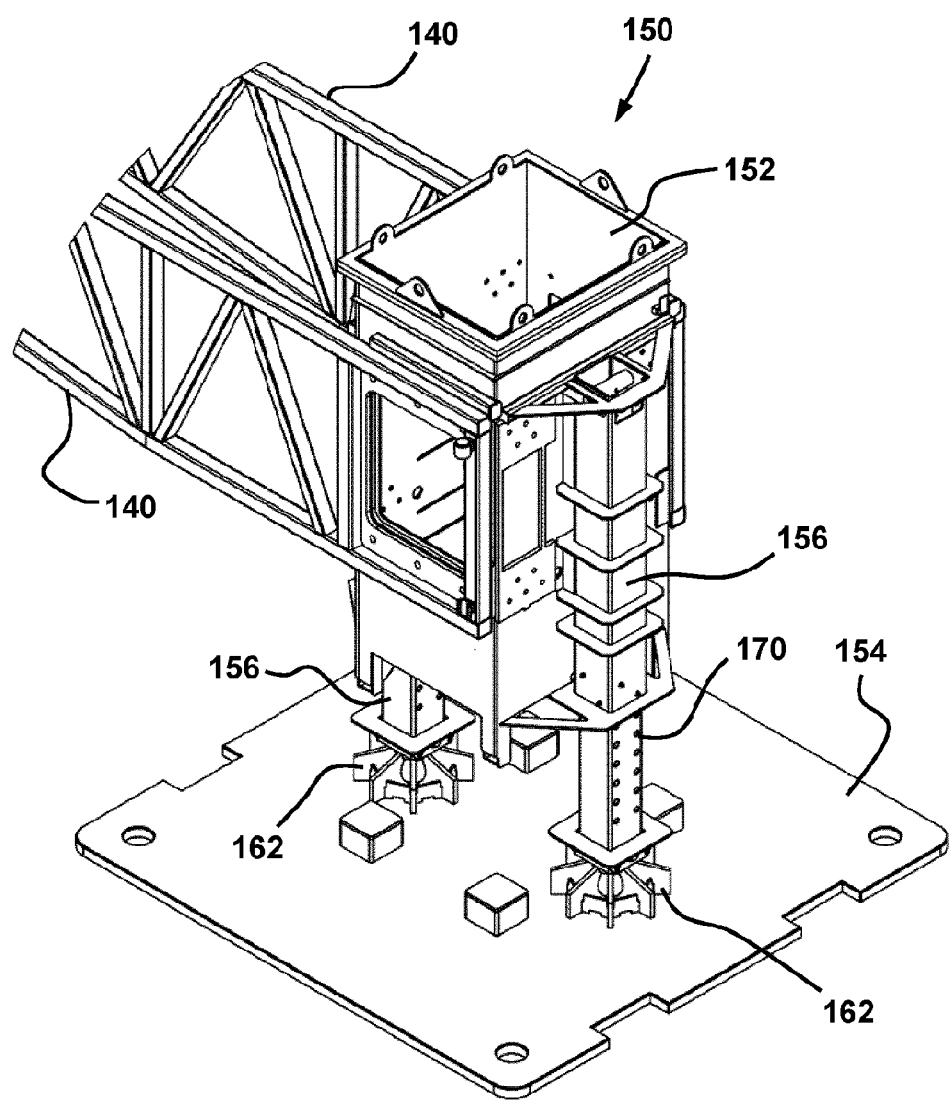
FIG. 21 is an isometric view showing some of the first joists of FIG. 8 being removably secured to the column base of FIG. 16.

FIG. 21 is an isometric view showing some of the first joists 140 being removably secured to the corresponding column base 150. Bolts (not shown) can be used to removably secure the distal ends of these first joists 140 to opposite sides of the frame 152 of the column base 150. It should be noted the different assembly methods are possible. For instance, the frame 152 of each column base 150 can be bolted to the corresponding joists 140 while the frame 152 is held above the ground using a lift, a crane or the like. Variants are also possible.

FIG. 22 is an isometric view showing the floor panels 132 being in their horizontal working position and showing other elements being added to the floor structure 120.

The remaining left and right lateral openings between the column bases 150 of the illustrated example are closed using removable side floor sections 194. Other joists 196, 198, 199 are also installed at various locations underneath the floor structure 120 for reinforcement. Variants are possible as well.

Figure 23:
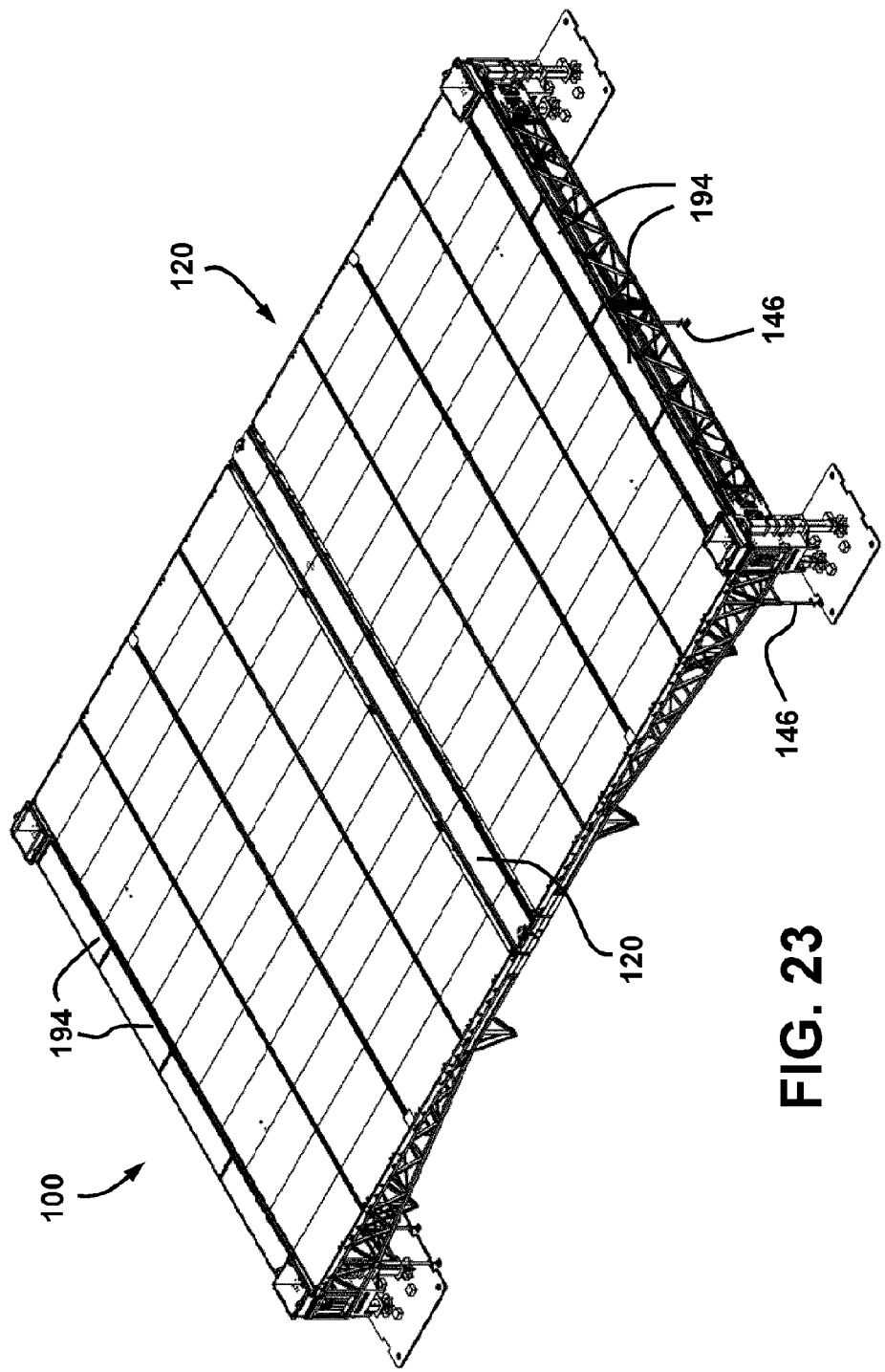
FIG. 23 illustrates the first unit of FIG. 1 with the floor structure in its deployed working configuration.

FIG. 23 illustrates the floor structure 120 in its deployed working configuration.

Figure 24:
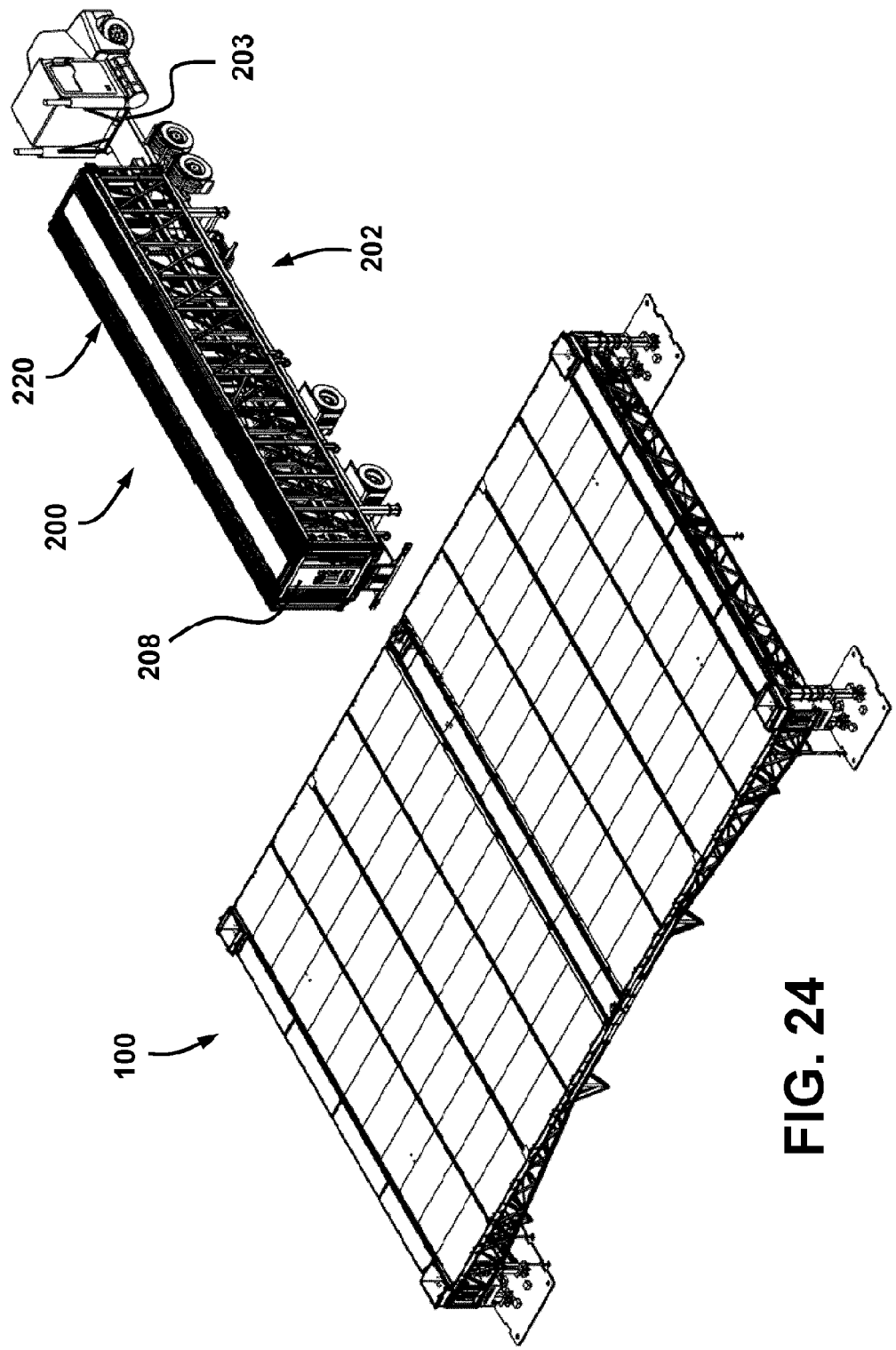
FIG. 24 illustrates an example of a second self-contained unit that is part of the framework of the mobile stage, the second unit being shown approaching the rear side of the first unit of FIG. 23.

FIG. 24 illustrates an example of a second self-contained unit 200 that is part of the framework of the mobile stage. The second unit 200 includes an articulated roof structure 220 for the mobile stage framework. The second unit 200 includes a central roof base frame 208 extending in the lengthwise direction and to which the various mobile components of the second unit 200 are already attached. The illustrated second unit 200 is carried over a second semitrailer 202 that is hauled by a truck tractor 203. Unlike the first unit 100 of the illustrated example, this second unit 200 will be completely detached from its second semitrailer 202 during the positioning thereof.

In FIG. 24, the second unit 200 is shown approaching the first unit 100 from the rear side. The second unit 200 is back-up using the truck tractor 203 so as to be oriented in the lengthwise direction and in alignment with the center of the first unit 100. The front end of the second unit 200 corresponds to the rear end of the second semitrailer 202 in the illustrated example. It should be noted that the second unit 200 could also be loaded from the front side of the first unit 100. Other variants are possible as well.

Figure 25:
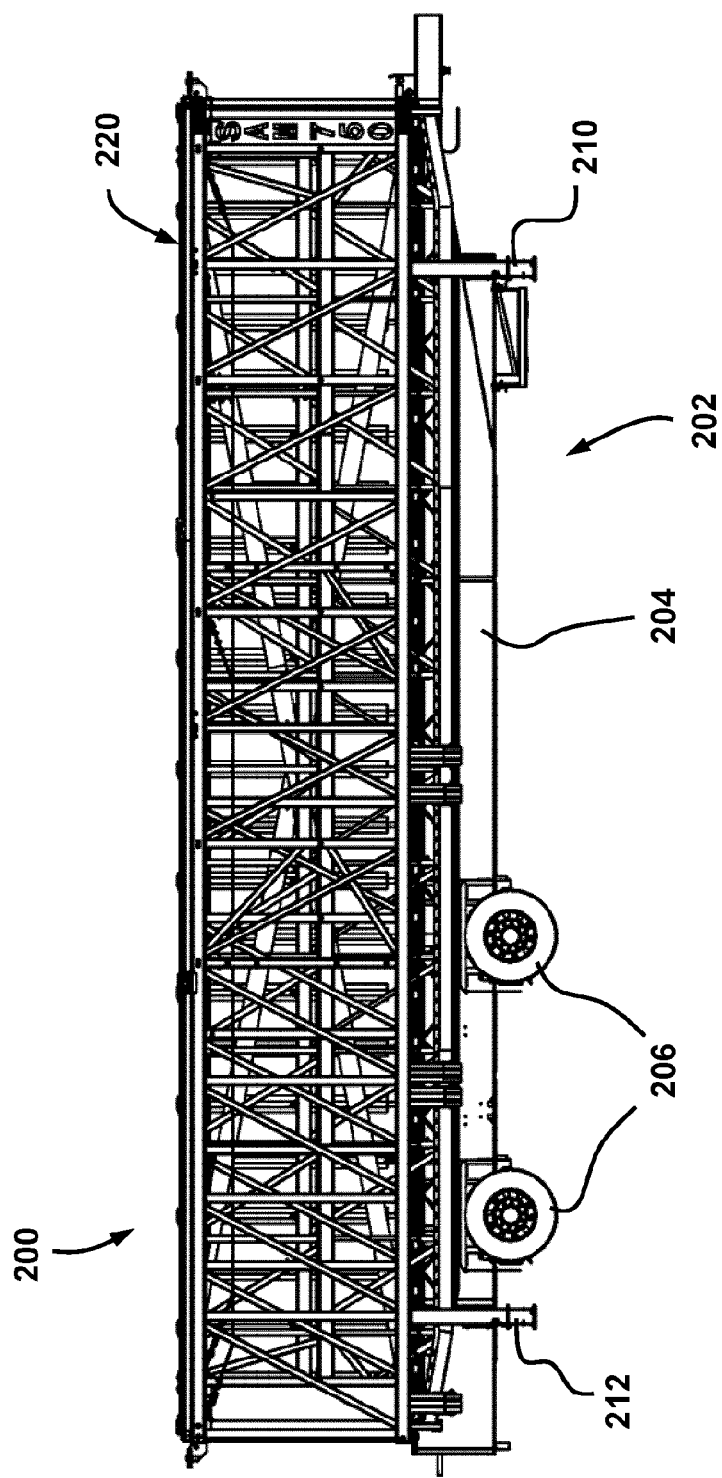
FIG. 25 is a side view of the second unit shown in FIG. 24.

FIG. 25 is a side view of the second unit 200 shown in FIG. 24. As can be seen, this second semitrailer 202 includes a second chassis 204 having a set of second wheels 206 and other components commonly found on semitrailers for road transportation. The second semitrailer 202 includes a pair of front vertically-extending front supporting legs 210 and a pair of vertically-extending rear supporting legs 212. Variants are possible as well.

Figure 26:
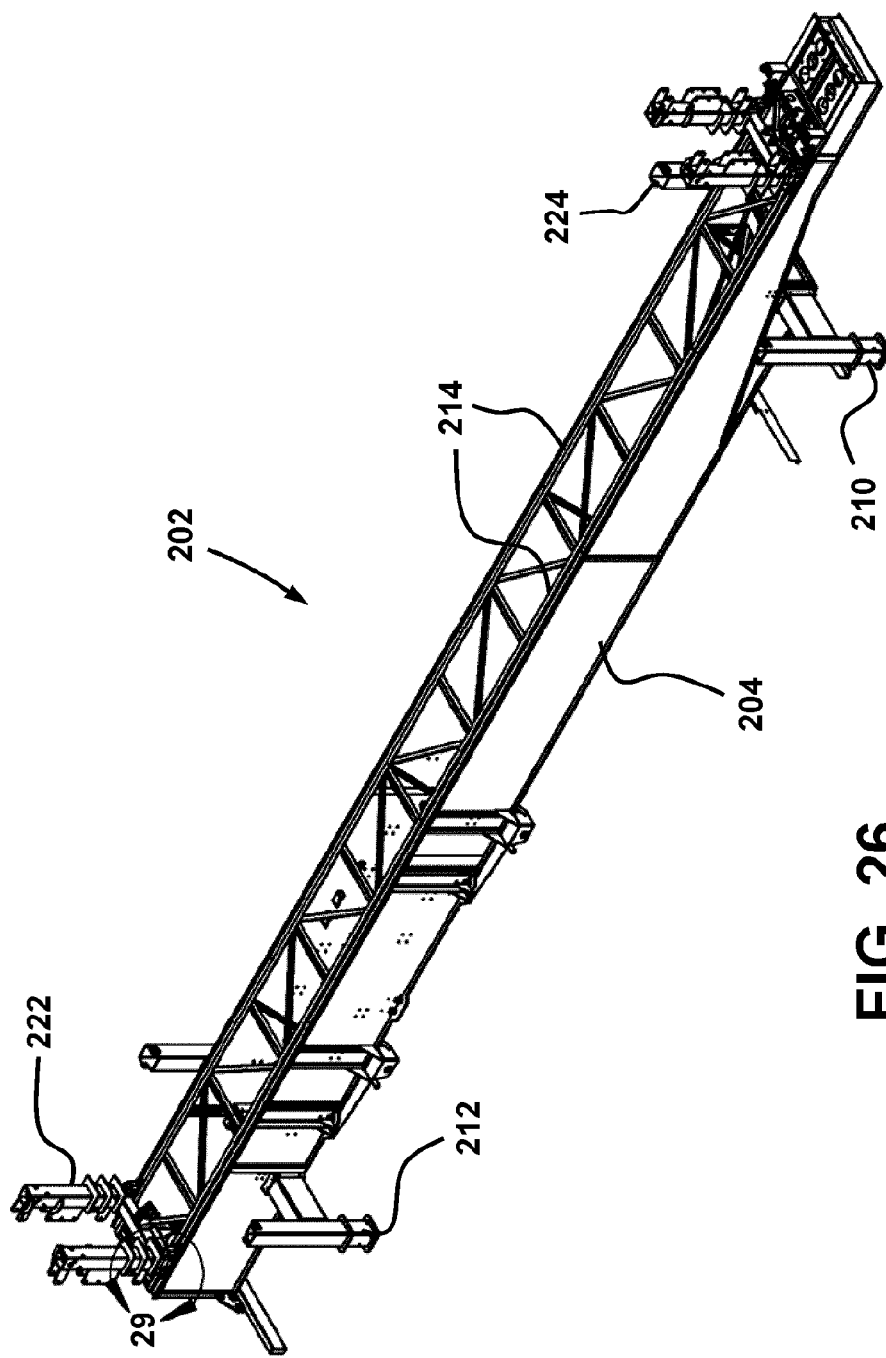
FIG. 26 is an isometric view of some of the parts of the second semitrailer on which the second unit is transported in FIG. 24 and also illustrates the two carriage assemblies of the second unit.

FIG. 26 is an isometric view of some of the parts of the second semitrailer 202 on which the second unit 200 is transported in FIG. 24 and also illustrates the two movable carriage assemblies 222, 224 of the second unit 200. One is provided at the front of the second unit 200 and the other is provided at the rear thereof, thus opposite the other. They each include two opposite sets of rollers at the bottom. Each set of rollers engage a corresponding one of the longitudinal tracks 214 provided on the second chassis 204. The weight of the entire second unit 200 rests on the four sets of rollers during the positioning of the second unit 200 over the first unit 100.

Figure 27:
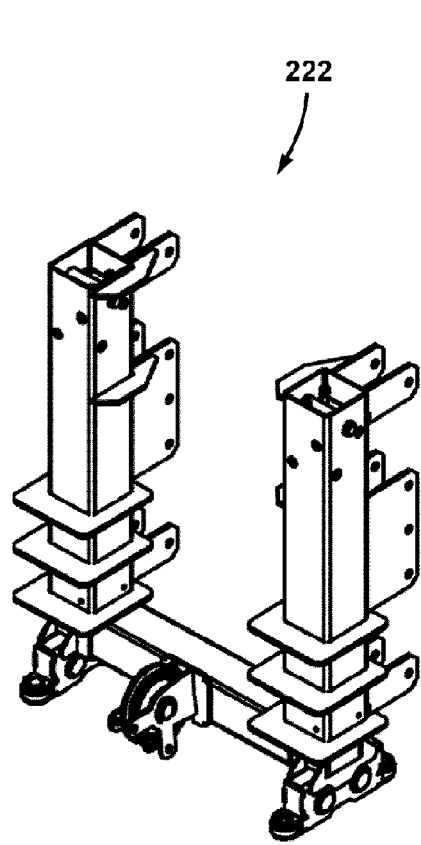
FIG. 27 is an isometric view of the front carriage assembly of FIG. 26, the front carriage assembly being shown in a low-level vertical position.

FIG. 27 is an isometric view of the front carriage assembly of FIG. 26 where it is shown in a low-level vertical position. The front carriage assembly 222, like the rear carriage assembly 224, includes two pairs of telescopic support beams and corresponding hydraulic actuators located therein, one for each telescopic support beam. The actuators are extended to raise the second unit 200, away from the second chassis 204, to a height that is sufficient to clear the top edge of the upper stage floor surface during the positioning. The two telescopic support beams are attached together by a crossbeam.

Figure 28:
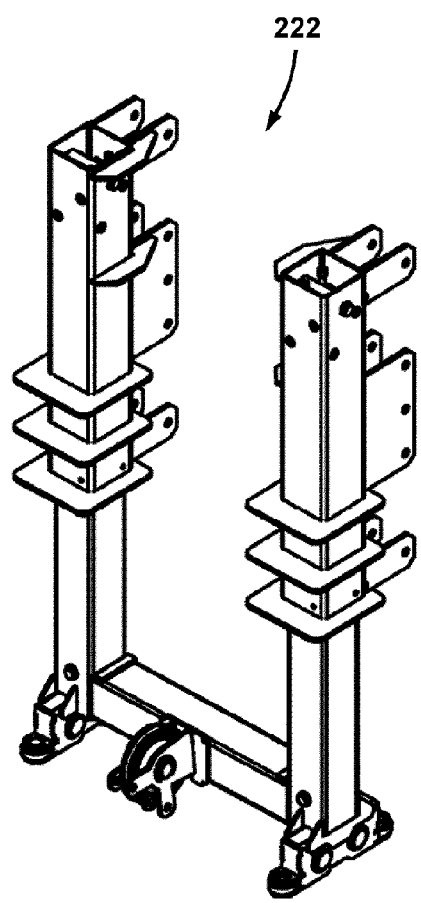
FIG. 28 is a view similar to FIG. 27, showing the front carriage assembly in a higher vertical position.

FIG. 28 is a view similar to FIG. 27, showing the front carriage assembly 222 in a raised position.

Figure 29:
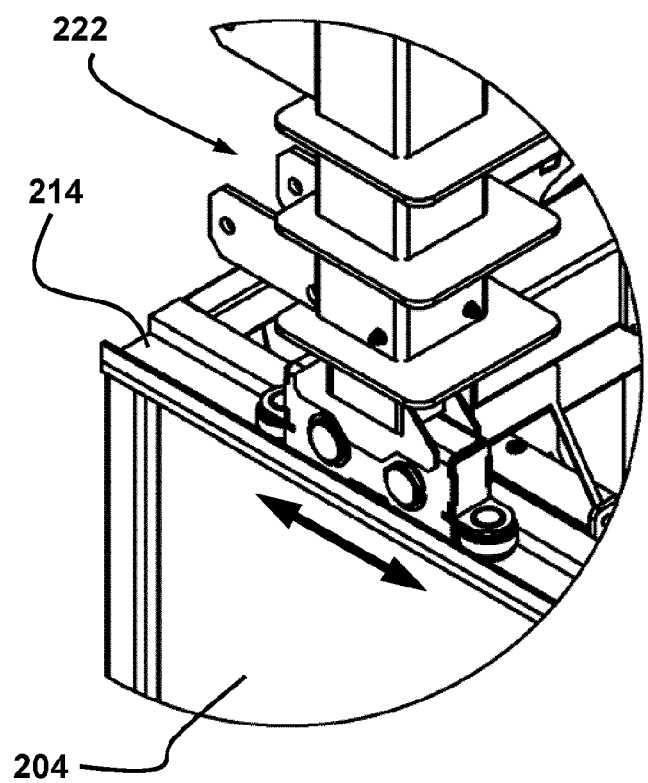
FIG. 29 is an enlarged isometric view of the front carriage assembly of FIG. 26 located over the second semitrailer of FIG. 24.

FIG. 29 is an enlarged isometric view of the front carriage assembly 222 of FIGS. 27 and 28 located over the second semitrailer 202. It shows how the sets of rollers engage the corresponding concave track 214 in the illustrated example. Each set of rollers includes a pair of metallic rollers rotating around corresponding horizontal axes, and a pair of metallic rollers rotating around corresponding vertical axes. Variants are possible.

Figure 30:
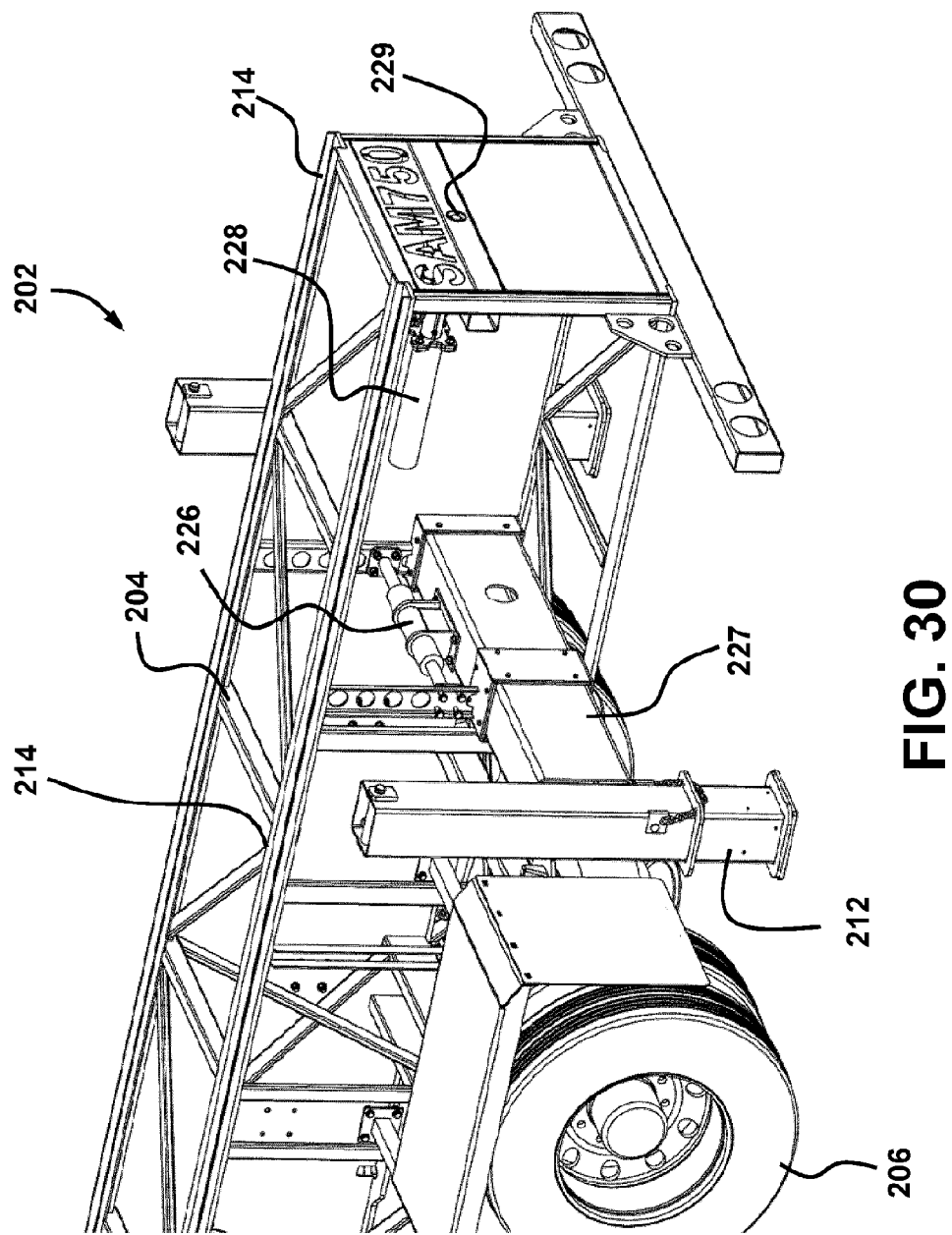
FIG. 30 is an enlarged and partially cutaway isometric view of the rear of the second semitrailer to show the transversal alignment actuators and the rear connection actuator.

FIG. 30 is an enlarged and partially cutaway isometric view of the rear of the second semitrailer 202 to show that it includes transversal alignment actuators 226 and a rear connection actuator 228. The second unit 200 is not shown in FIG. 30.

The transversal alignment actuators 226 of the illustrated example are each mounted between a corresponding one of the axles of the second semitrailer 202 and a top part of the second chassis 204. Variants are possible as well.

Figure 31:
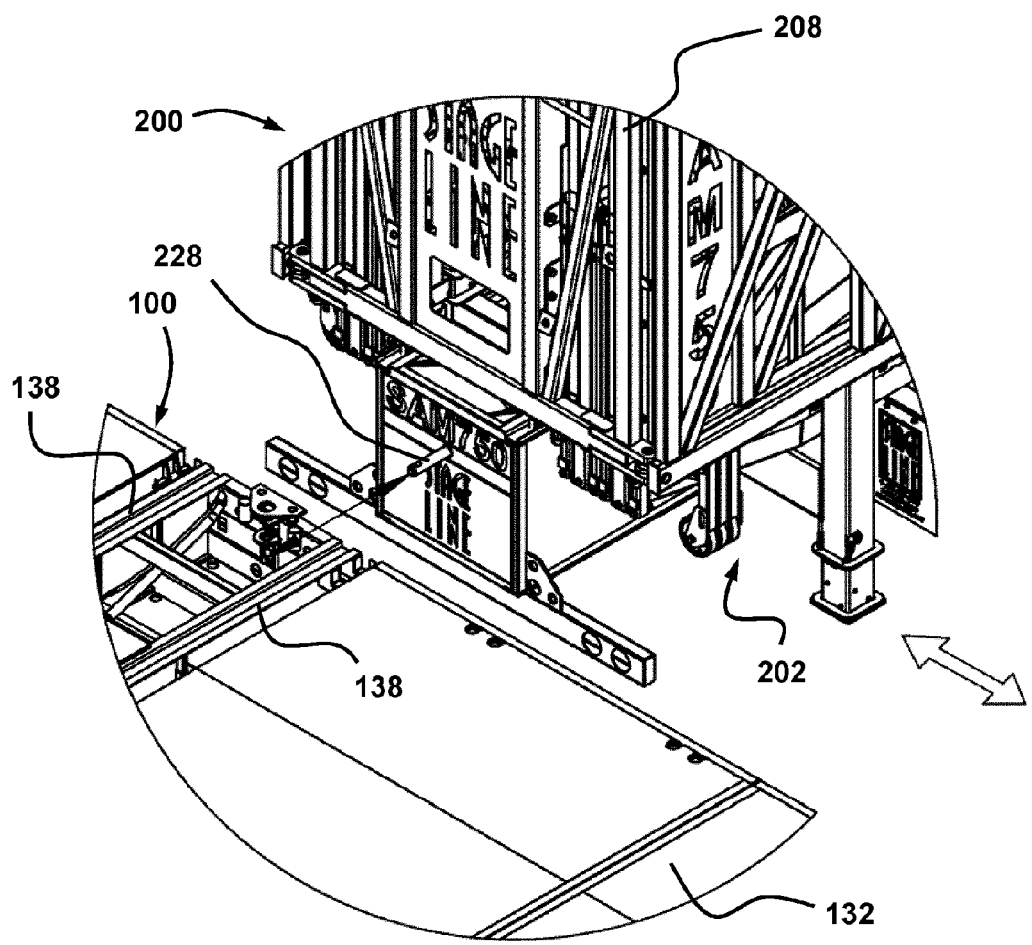
FIG. 31 is an enlarged isometric view showing the alignment of the second unit with reference to the center of the first unit.

FIG. 31 is an enlarged isometric view illustrating the alignment of the second unit 200 with reference to the center of the first unit 100. This is done before the second unit 200 is positioned onto the first unit 100. When moving the rear of the second semitrailer 202 closer to the edge of the first unit 100, the driver of the truck tractor 203 must keep the second semitrailer 202 in alignment with the center of the first unit 100. However, because the alignment is difficult to achieve with a precision to the millimeter, the second semitrailer 202 is designed to be moved sideways using the transversal alignment actuators 226 in order to fine tune the transversal alignment. Variants are possible as well.

Figure 32:
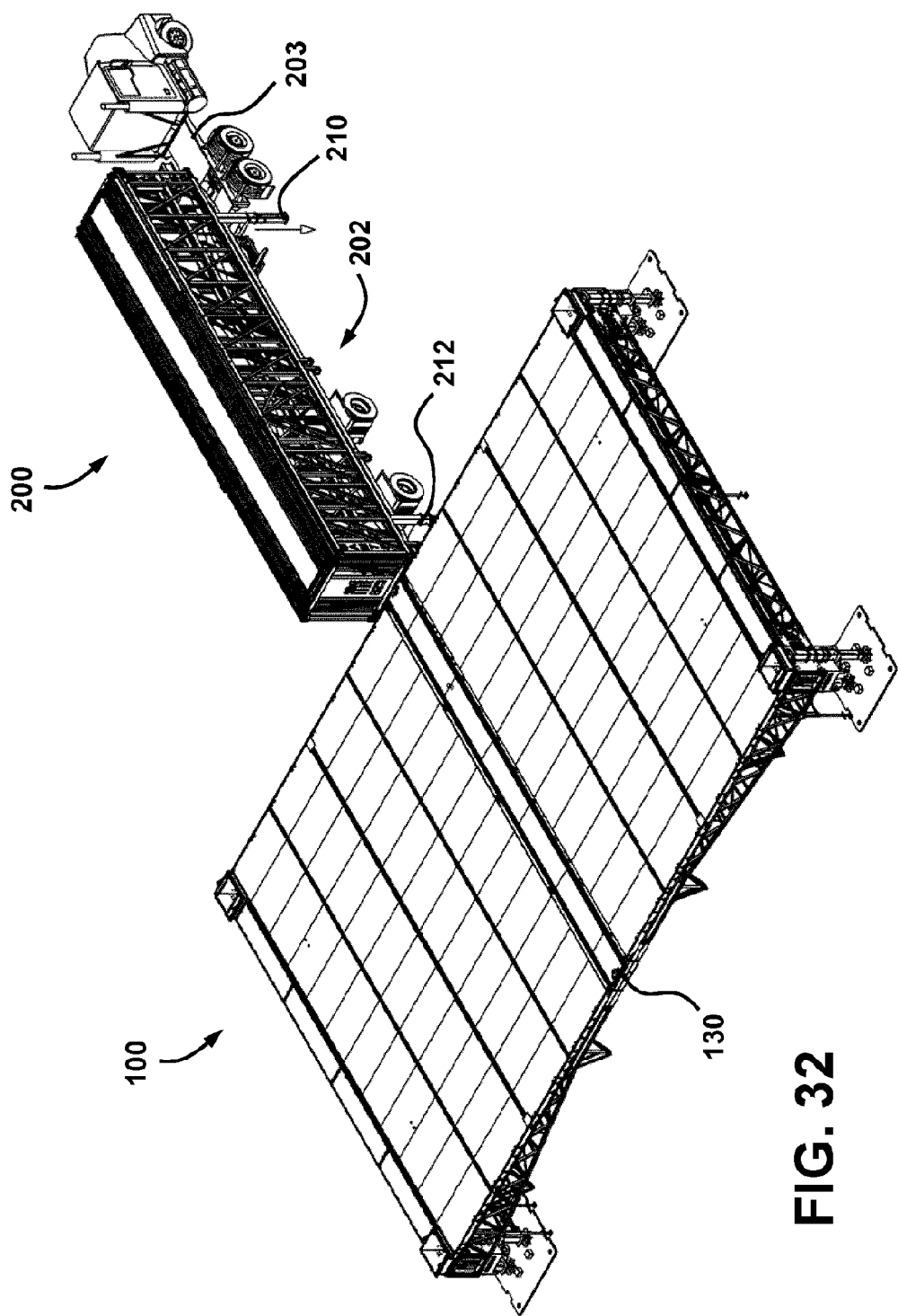
FIG. 32 is an isometric view showing the supporting legs of the second semitrailer being lowered to raise the second semitrailer and the second unit above the ground.

FIG. 32 is an isometric view showing the front vertical supporting legs 210 and the rear vertical supporting legs 212 of the second semitrailer 202 being lowered to raise the second semitrailer 202 and the second unit 200 with reference to the ground. Each vertical supporting leg 210, 212 includes a corresponding hydraulic actuator located inside telescopic support beams. Beforehand, the second semitrailer 202 was firmly attached to the first unit 100 using the rear connection actuator 228 (FIGS. 30 and 31). The end of the rear connection actuator 228 extends out at the rear through a hole 229 until it can be connected to a corresponding anchoring point on the side of the first unit 100. FIG. 31 shows the end of the rear connection actuator 228 being extended. Retracting the end will then bring the second semitrailer 202 and the first unit 100 into a locking engagement. The actuator 228 will be locked into position until the second unit 200 is secured to the rest of the mobile stage framework. Variants are possible as well.

Figure 33:
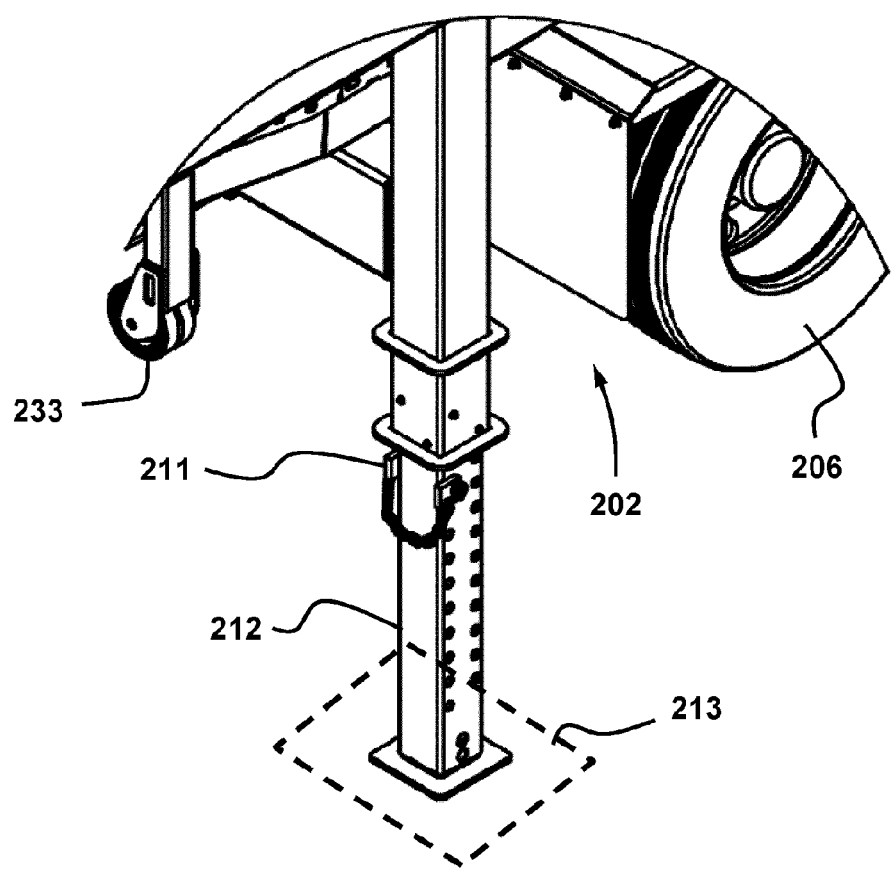
FIG. 33 is an enlarged isometric view showing one of the rear supporting legs of the second semitrailer.

FIG. 33 is an enlarged isometric view showing one of the rear supporting legs 212 of the second semitrailer 202. The bottom of the front vertical supporting legs 210 and the rear vertical supporting legs 212 engage the ground using supporting blocks, for instance wood blocks 213 or the like, as shown semi-schematically in FIG. 33. These blocks 213 increase the surface area. FIG. 33 also shows the pin 211 inserted in one of the various holes so as to prevent the rear supporting legs 212 from retracting when the hydraulic pressure inside the actuator is released.

Figure 34:
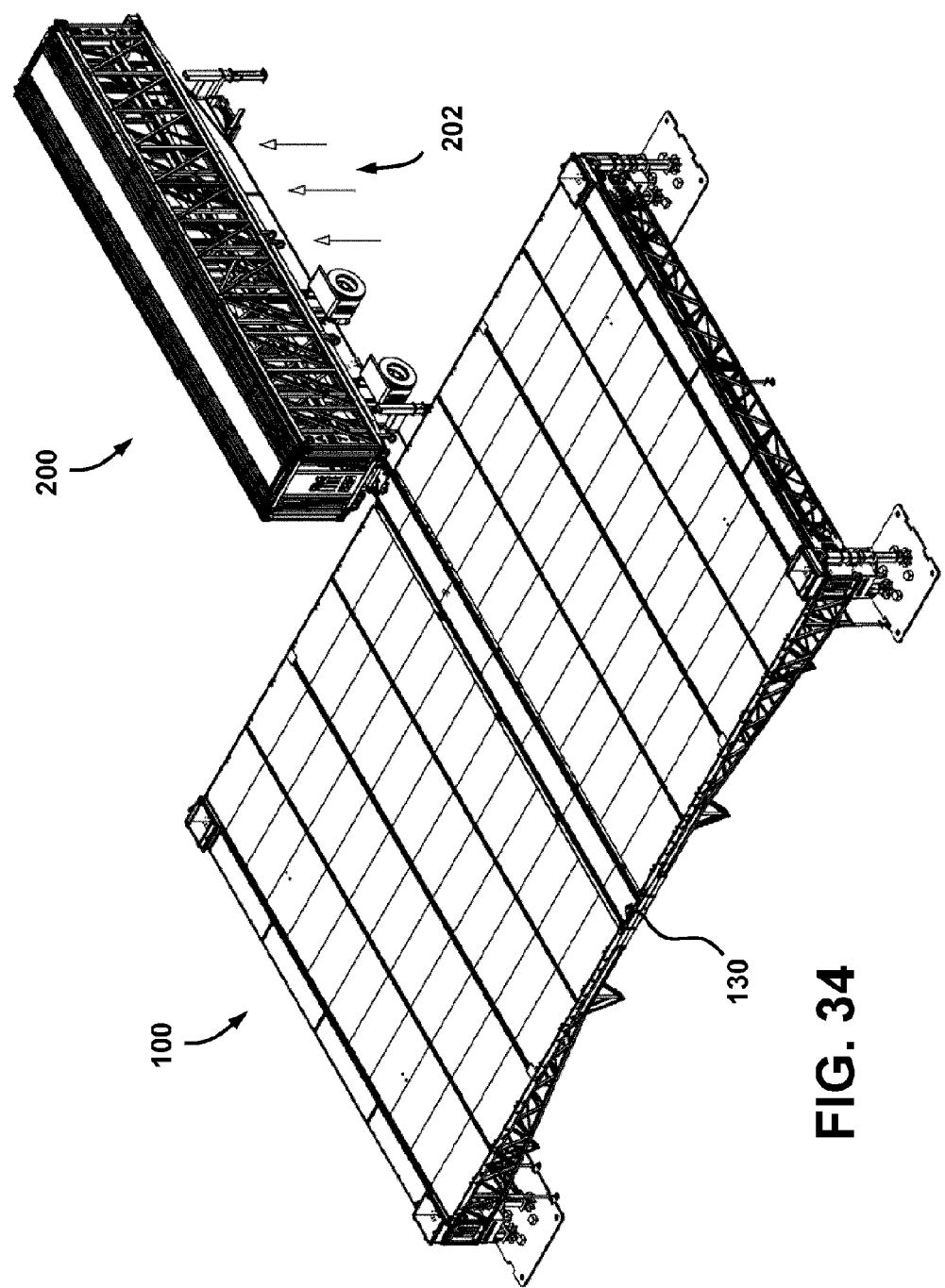
FIG. 34 is an isometric view showing the second unit being raised with reference to the second semitrailer before its transfer onto the first unit.

FIG. 34 is an isometric view showing the second unit 200 being raised with reference to the second semitrailer 202 before its positioning onto the first unit 100.

Figure 35:
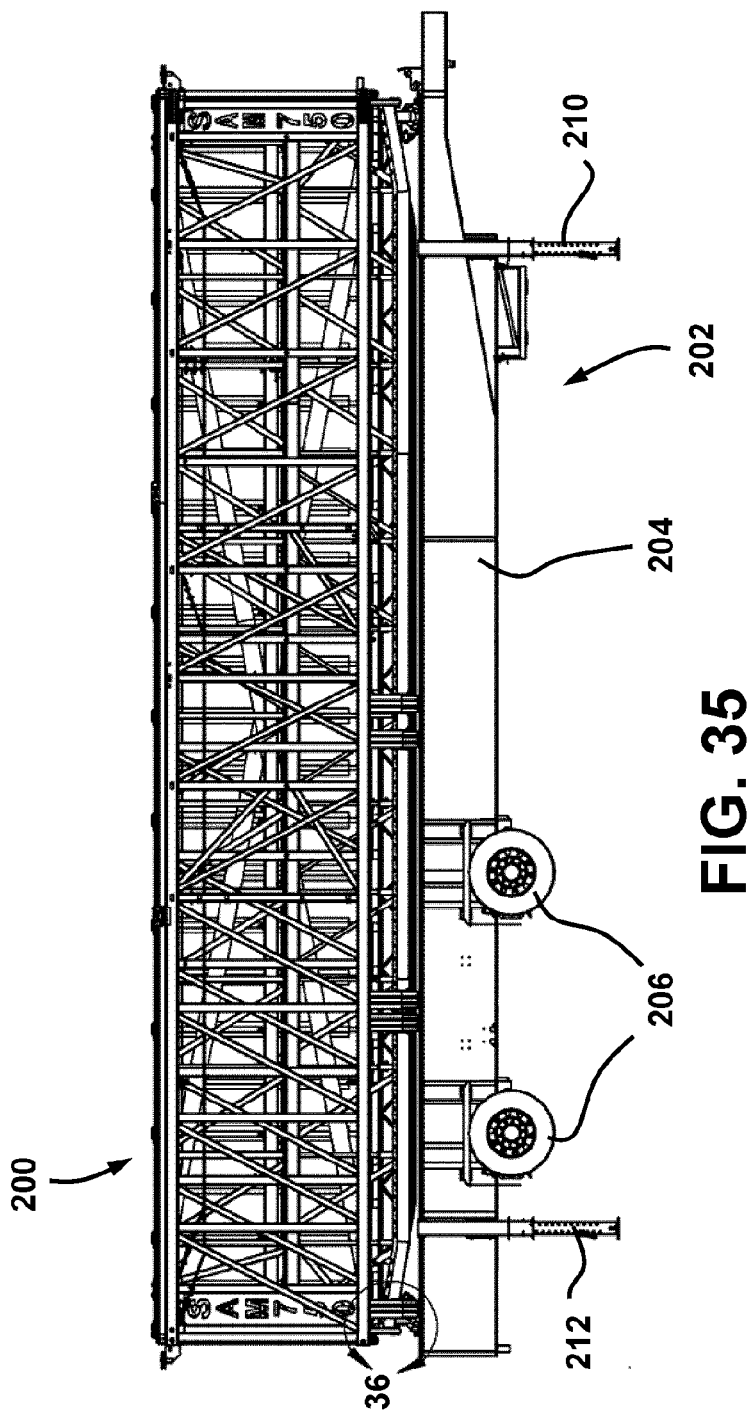
FIG. 35 is a side view of the second unit shown in FIG. 34 before its transfer onto the first unit.

FIG. 35 is a side view of the second unit 200 shown in FIG. 34 before its positioning onto the first unit 100.

Figure 36:
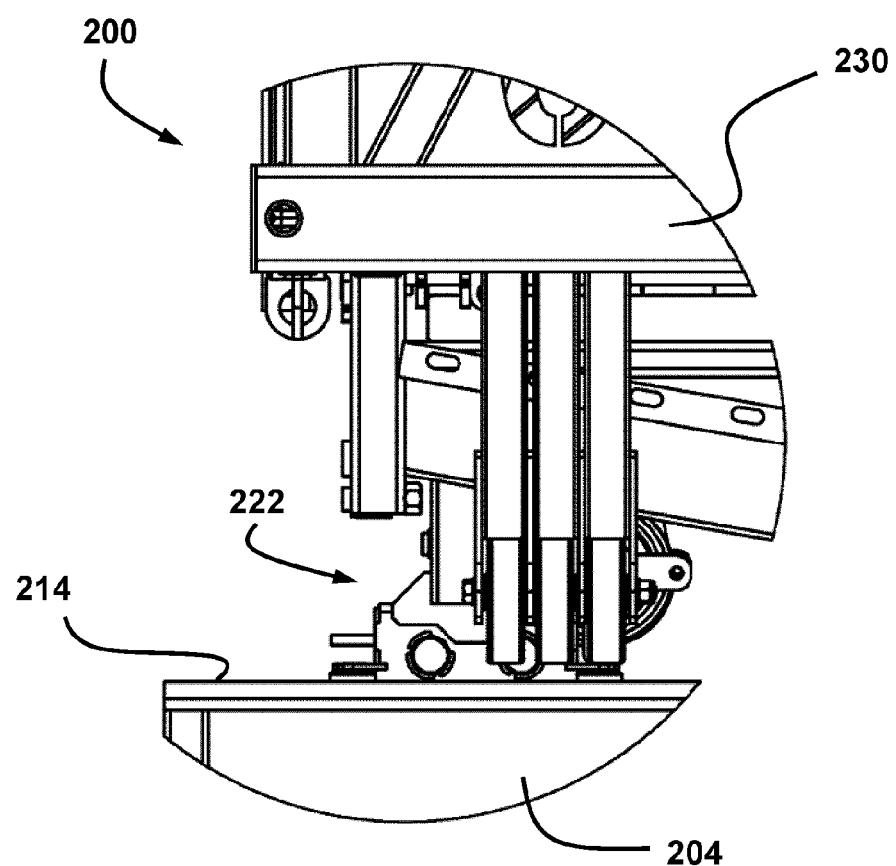
FIG. 36 is an enlarged side view of the front carriage assembly of FIG. 35 after the second unit is raised for its positioning onto the first unit.

FIG. 36 is an enlarged side view of the front carriage assembly in FIG. 35 after the second unit 200 is raised for its positioning on the first unit 100.

FIG. 37 is a longitudinal side view of the first and second units 100, 200 before the positioning of the second unit 200 onto the first unit 100.

FIG. 38 is a longitudinal cross-sectional side view of the first and second units 100, 200 shown in FIG. 37. FIG. 38 shows the interior of the second unit 200.

As can be seen, the positioning of the second unit 200 of the illustrated example is done using two pull cables 215, 217 and corresponding spaced-apart winches 216, 218 located at the center of the second unit 200, more precisely inside the roof base frame 208. The cables 215, 217 run through a corresponding one of the carriage assemblies 222, 224. The free end of the first cable 215 is attached to the end of the first tracks 138 on the first unit 100 and the free end of the second cable 217 is attached to the end of the second tracks 214 on the second semitrailer 202, which free end is thus completely opposite the free end of the first cable 215. When loading the second unit 200 onto the first unit 100, the first winch 216 will pull the first cable 215 and the second winch 218 will yield an equivalent length of the second cable 217 as the second unit 200 moves. The reverse procedure will be done when loading the second unit 200 back over the second semitrailer 202.

Figures 39, 40:
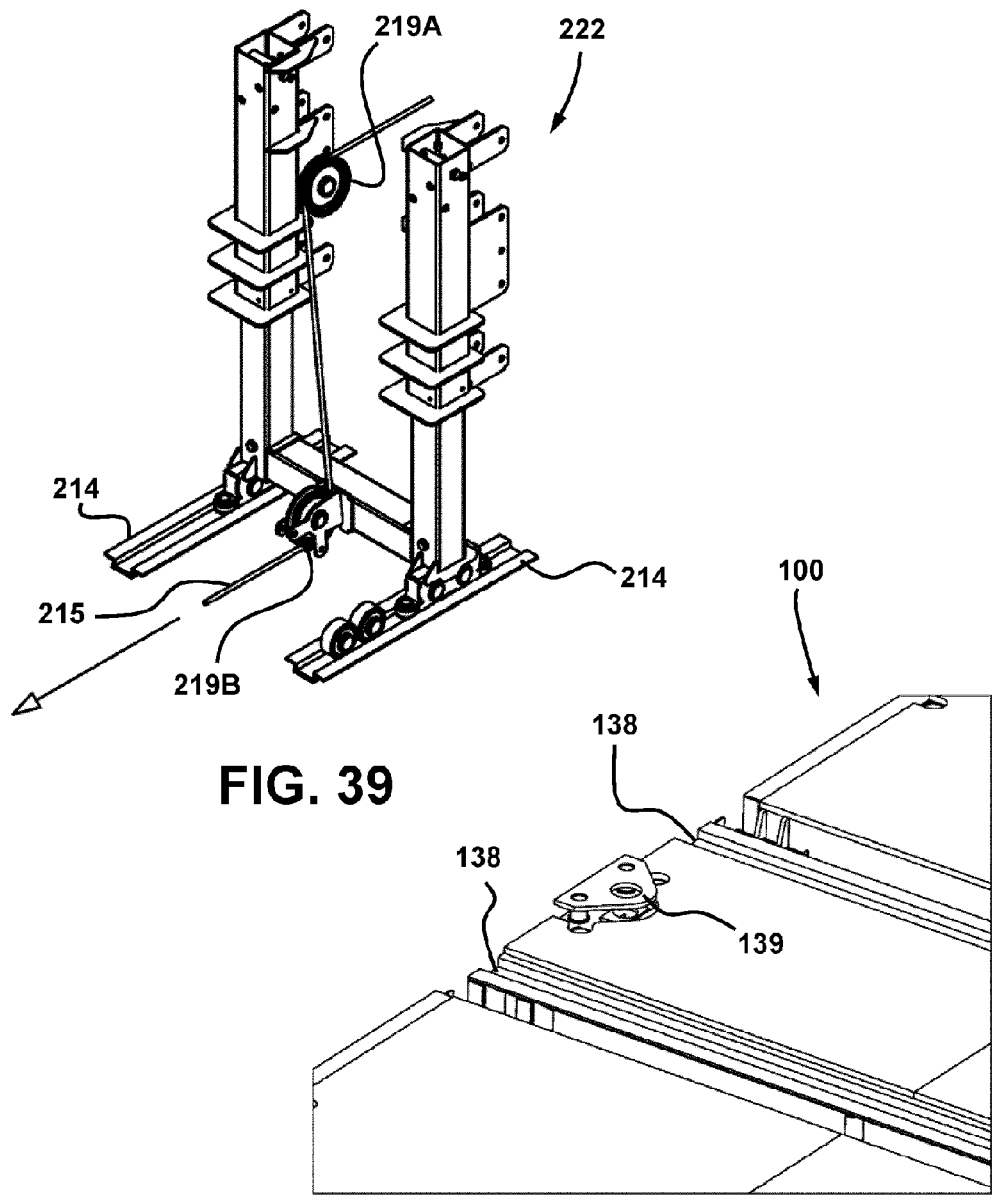
FIG. 39 is a view similar to FIG. 28 and shows the first cable wound around pulleys provided on the front carriage assembly of FIG. 29.
FIG. 40 is an enlarged isometric view showing the attachment point on the first unit for the free end of the first cable.

FIG. 39 is a view similar to FIG. 28 and shows the first cable 215 wound around pulleys 219A, 219B provided on the front carriage assembly 222. The rear carriage assembly 224 (FIG. 26) has similar pulleys.

FIG. 40 is an enlarged isometric view showing the attachment point 139 on the first unit 100 for the free end of the first cable 215.

Figure 41:
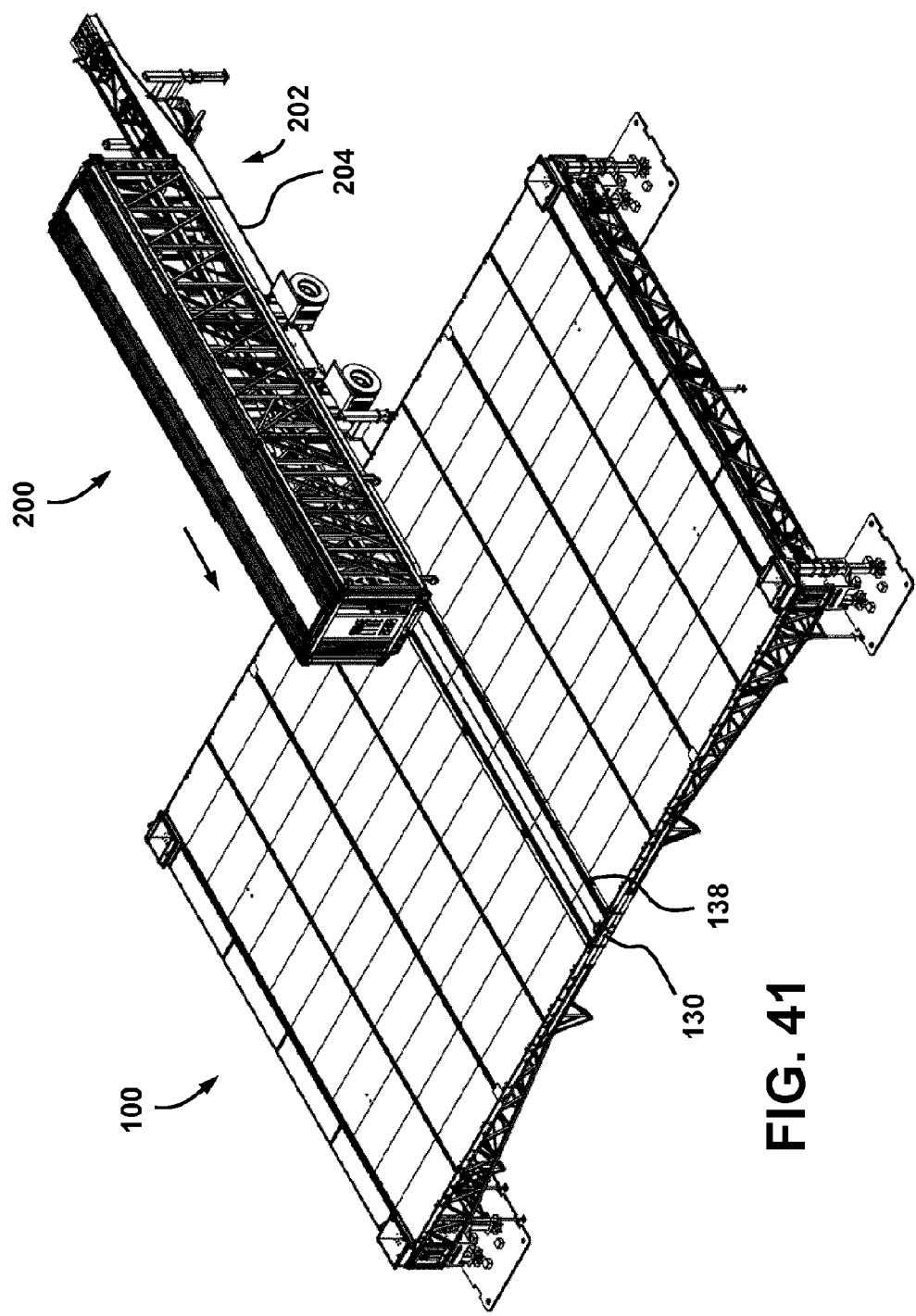
FIG. 41 is an isometric view showing the second unit during its positioning over the first unit.

FIG. 41 is an isometric view showing the second unit 200 during its positioning over the first unit 100.

Figure 42:
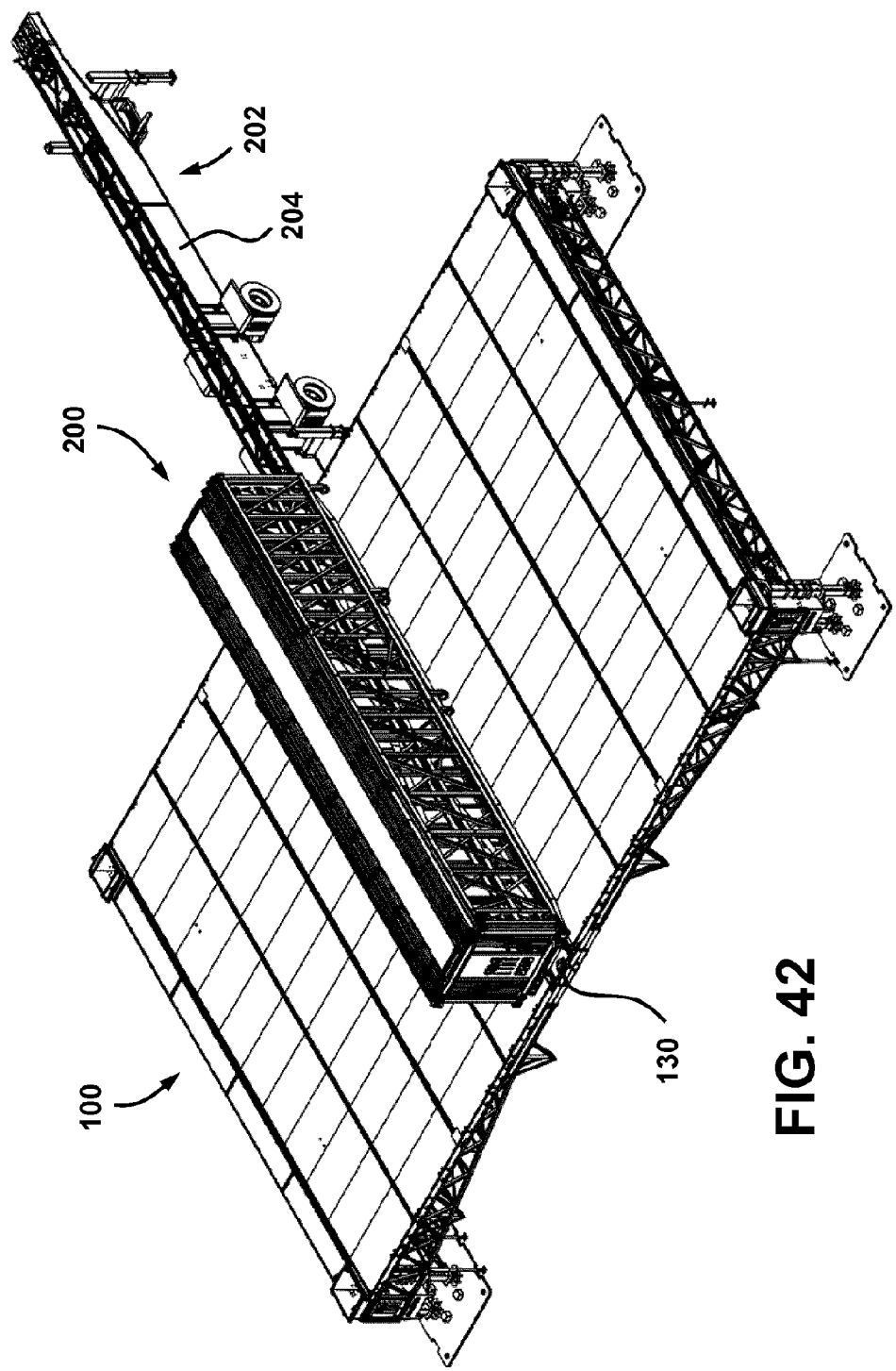
FIG. 42 is an isometric view showing the second unit at the end of its positioning over the first unit.

FIG. 42 is an isometric view showing the second unit 200 at the end of its positioning. The second unit 200 is now in position over the first unit 100. The roof structure 220 is still in its folded transport configuration in the illustrated example.

Figure 43:
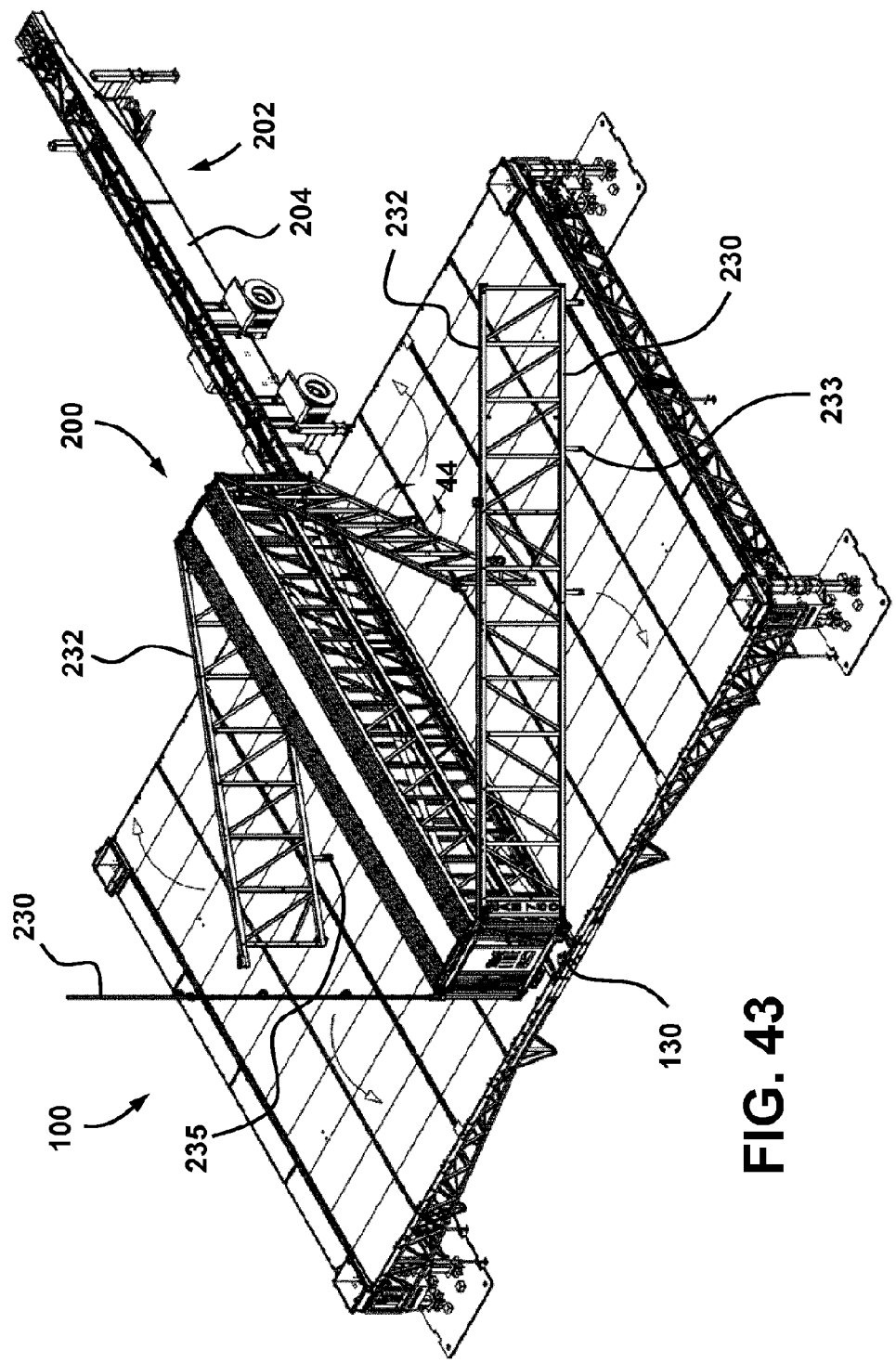
FIG. 43 is an isometric view showing the second unit being unfolded.

FIG. 43 is an isometric view showing the second unit 200 being unfolded. As can be seen, the roof structure 220 of the second unit 200 includes a plurality of trusses on each side of the roof base frame 208. Among these trusses, there are two sets of transversal trusses 230, 232. One set is at the left of the roof base frame 208 and the other set is at the right thereof. Each set includes a front transversal truss 230 and a rear transversal truss 232. Both transversal trusses 230, 232 extend in the widthwise direction when the mobile stage framework will be fully assembled. Each transversal truss 230, 232 has a proximal end that is pivotally connected to a corresponding side of the roof base frame 208. Variants are possible as well.

Caster wheels 233, 235 are provided to assist in pivoting the trusses 230, 232. The caster wheels 233, 235 are engaging the upper stage floor surface to support some of the weight of the trusses 230, 232. The second unit 200 can be slightly lowered to put the caster wheels 233, 235 in engagement with the upper stage floor surface prior to unfolding the second unit 200. The caster wheels 233, 235 of the illustrated example are also positioned along the trusses 230, 232 so that at least one of them is over or very close to a rigid beam that is part of the floor panel frames. This feature lowers the mechanical stresses that the weight of the trusses 230, 232 can apply over unsupported portions of the floor panels 132, for instance at their center, particularly when plywood boards or other similar materials are used. Variants are possible as well.

Figure 44:
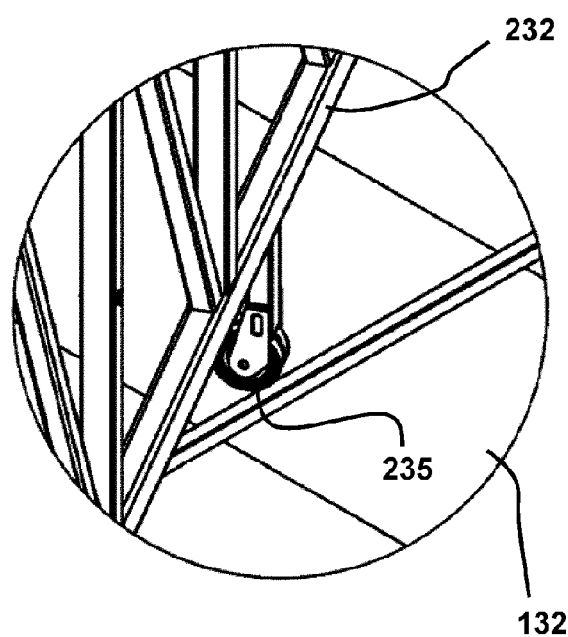
FIG. 44 is an enlarged isometric view showing one of the caster wheels engaging the upper stage floor surface.

FIG. 44 is an enlarged isometric view showing one of the caster wheels 233, 235 engaging the upper stage floor surface.

Figure 45:
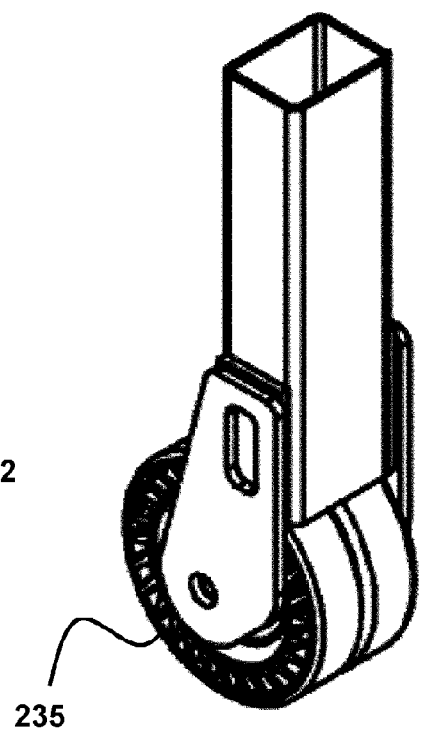
FIG. 45 is an enlarged view of the caster wheel shown in FIG. 44.

FIG. 45 is an enlarged view of the caster wheel 235 shown in FIG. 44.

Figure 46:
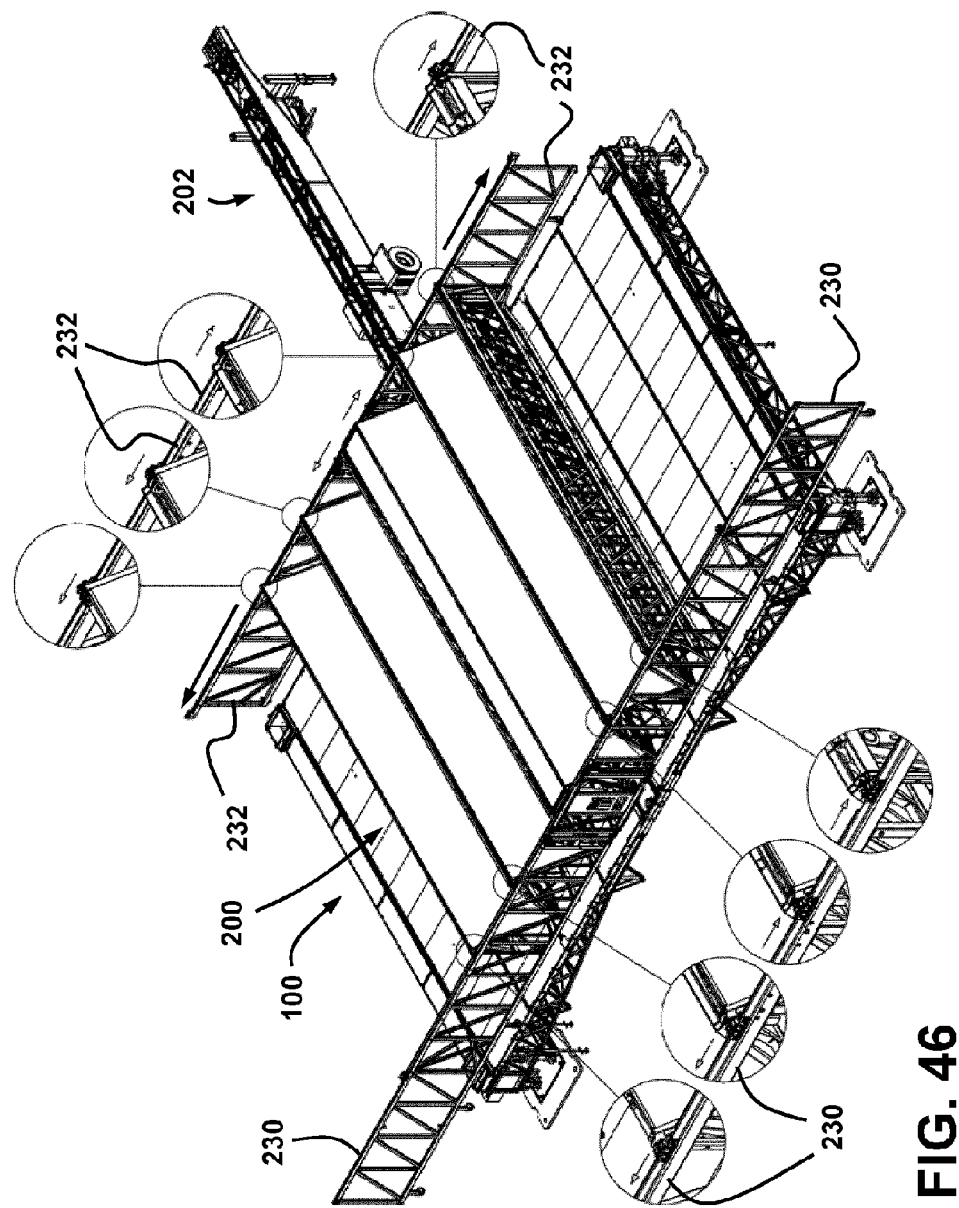
FIG. 46 shows various components of the roof structure being moved in the widthwise direction towards their deployed working position.

FIG. 46 shows various components of the roof structure 220 being moved in the widthwise direction towards their deployed working position. These components unfold on each side of the roof base structure 208 in a sliding movement. The top edge of the front and rear trusses 230, 232 are used as tracks in the illustrated example. Bogies are provided at the ends and they slide on these tracks. Variants are possible as well.

Figure 47:
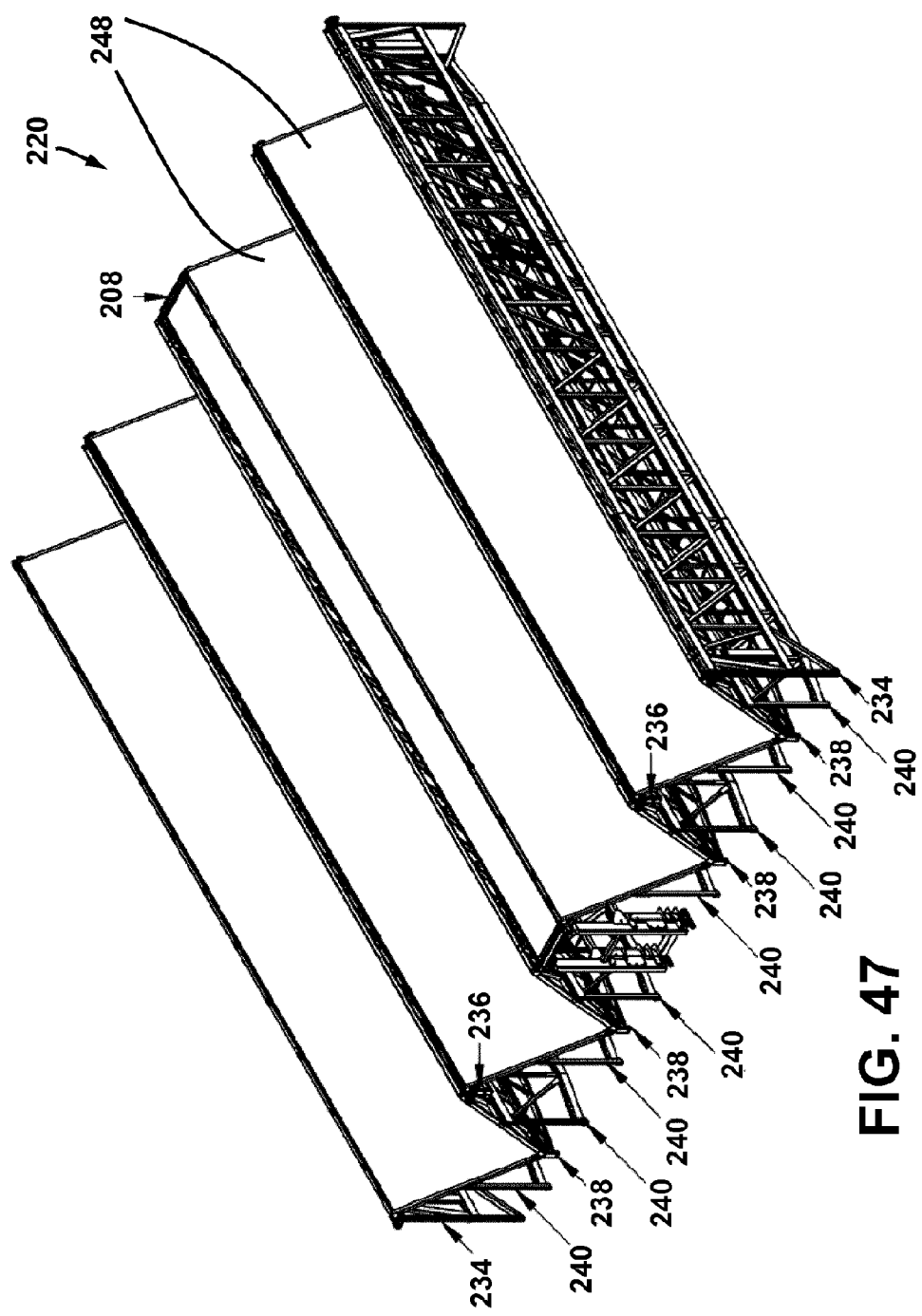
FIG. 47 is an isometric view showing the roof structure without the front and rear transversal trusses, which were omitted for the sake of illustration.

FIG. 47 is an isometric view showing the roof structure 220 without the front and rear transversal trusses 230, 232 which were omitted only for the sake of illustration.

Figure 48:
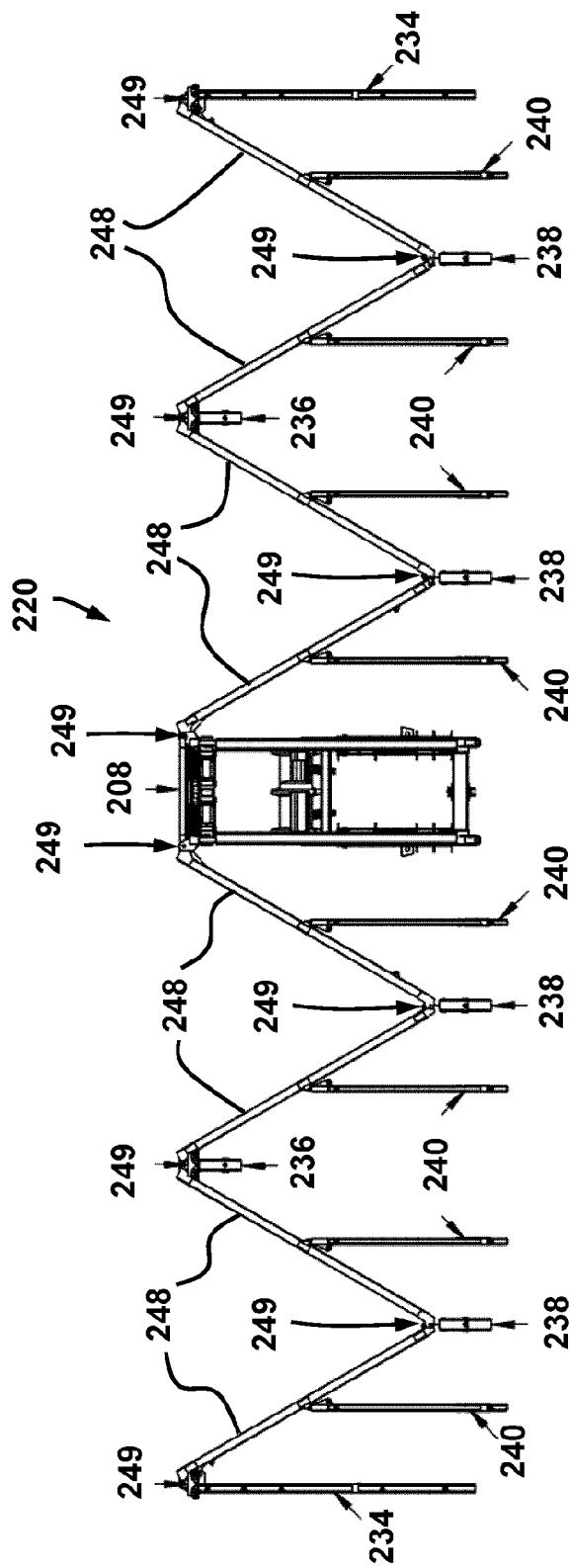
FIG. 48 is a side view of what is shown in FIG. 47.

FIG. 48 is a side view of what is shown in FIG. 47.

FIGS. 47 and 48 show the position of the various longitudinal trusses 234, 236, 238, 240 on each side of the roof base frame 208. These longitudinal trusses 234, 236, 238, 240 are interconnected by rigid roof panels 248. This arrangement is designed to fold in a very compact manner.

Each roof panel 248 can be made of a sheet of fiberglass or the like. It also includes a corresponding underlying frame forming a rigid support under the upper surface thereof and to which trusses can be attached. The roof panels 248 also provide a very good protection against rain and/or sunlight once the mobile stage framework is fully assembled. They perform better than sheets of fabric or the like. The adjacent roof panels 248 used in the illustrated example are pivotally attached two-by-two using corresponding hinges and the second one of each pair is attached to the top end of a corresponding longitudinal truss. With the roof base structure 208 being covered with a fiberglass sheet, the roof panels 248 form altogether a continuous and uninterrupted roof surface once the roof structure 220 is in its deployed working configuration. Variants are possible as well.

In the illustrated example, the last one of the longitudinal trusses on each side is the first longitudinal truss 234. The top end of each first longitudinal truss 234 is in sliding engagement with the top rails of the transversal trusses 230, 232 using bogies. Second longitudinal trusses 236 are also in sliding engagement with the top rails of the transversal trusses 230, 232 using bogies. They are connected in-between two pairs of roof panels 248. The junction between each pair of the roof panels 248 coincides with the location of a corresponding third longitudinal truss 238. Fourth longitudinal trusses 240 are hung under the medial location of each roof panel 248. Variants are possible.

Figure 49:
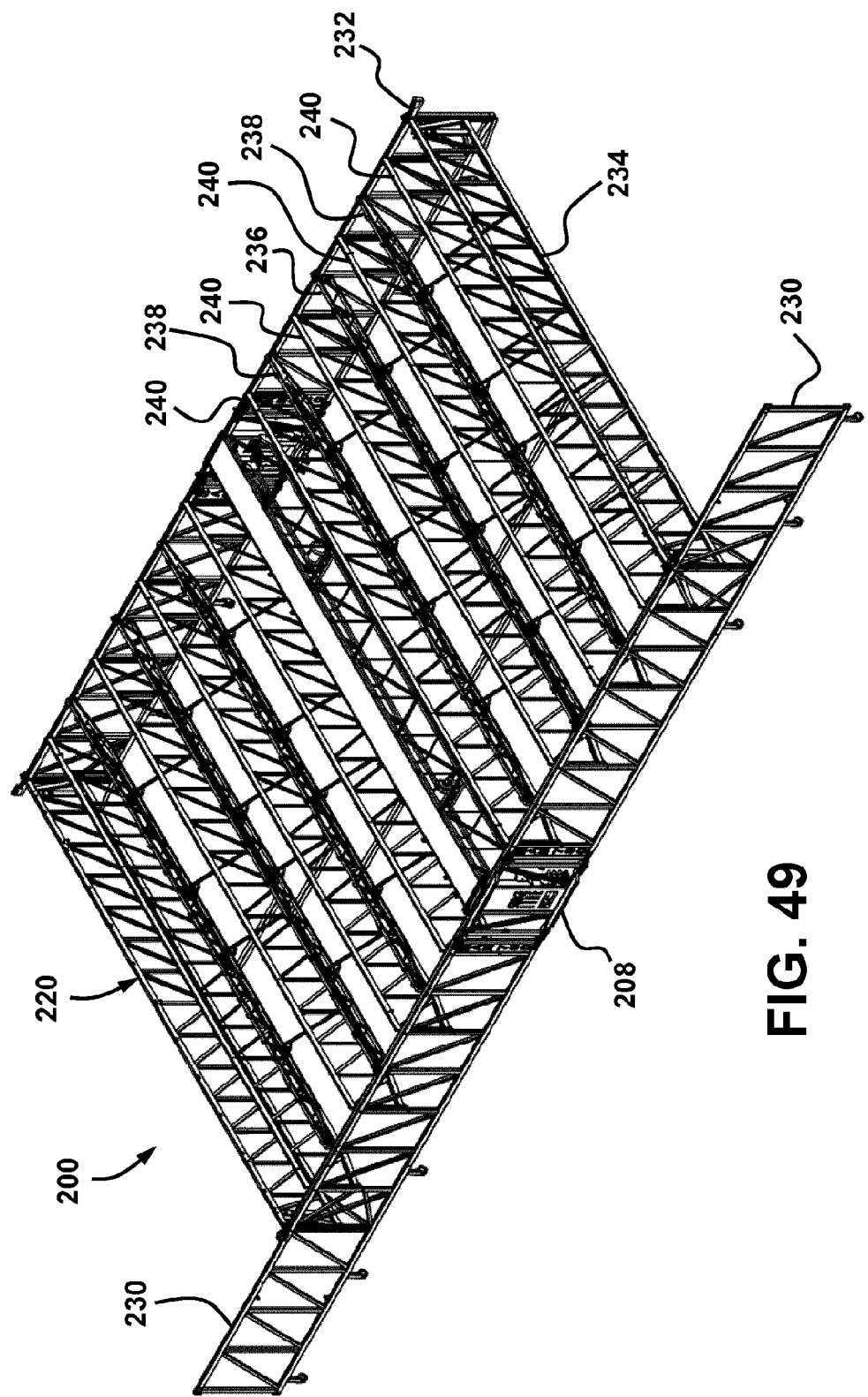
FIG. 49 is an isometric view showing the various components of the roof structure of FIG. 46 when it is in its deployed working configuration.

FIG. 49 is an isometric view showing the various components of the roof structure 220 when the roof structure 220 is in its deployed working configuration. The roof panels 248 were omitted for the sake of illustration.

Figure 50:
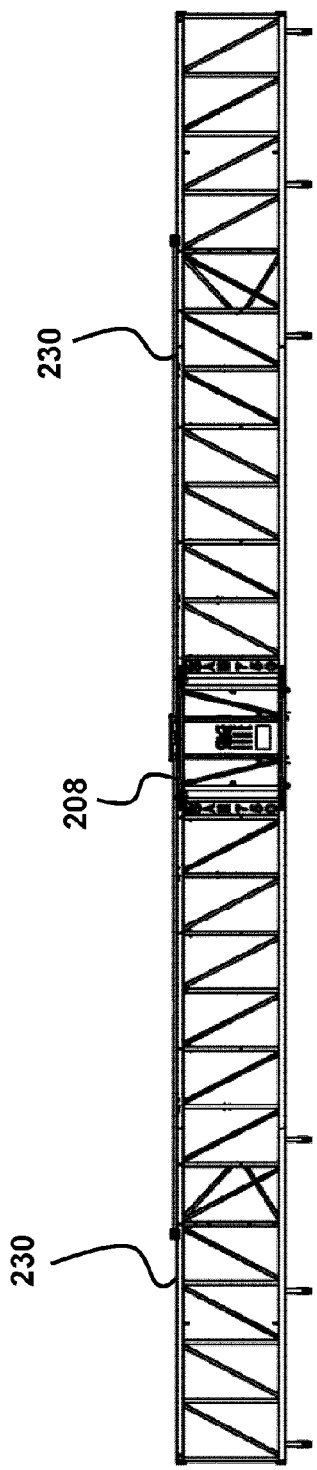
FIG. 50 is a front view of the roof structure of FIG. 49.

FIG. 50 is a front view of the roof structure 220 of FIG. 50. It shows the front transversal trusses 230 on each side of the roof base structure 208.

Figure 51:
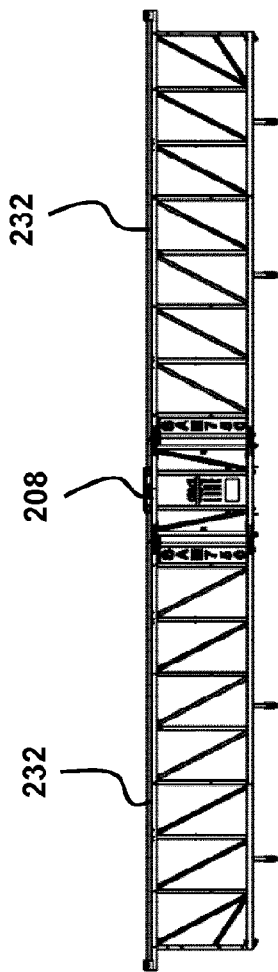
FIG. 51 is a rear view of the roof structure of FIG. 49.

FIG. 51 is a rear view of the roof structure 220 of FIG. 49. It shows the rear transversal trusses 232 on each side of the roof base structure 208.

Figure 52:
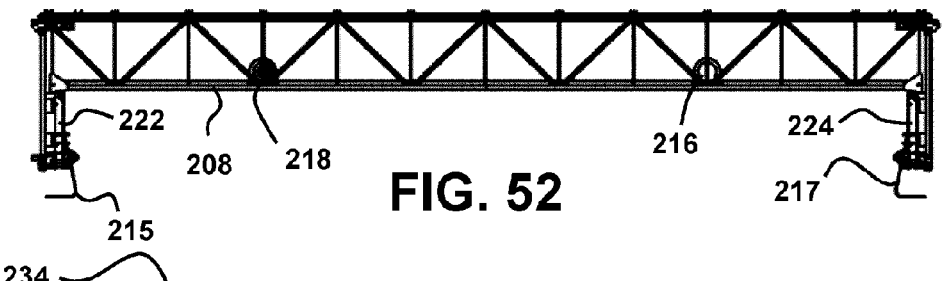
FIG. 52 is a side view of the roof base structure of FIG. 49.

FIG. 52 is a side view of the roof base structure 208 of FIG. 49.

Figure 53:
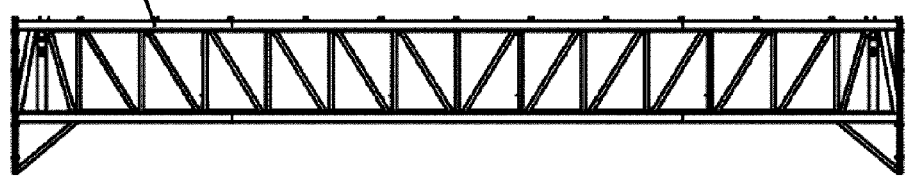
FIG. 53 is a side view of one of the first longitudinal trusses of FIG. 49.

FIG. 53 is a side view of one of the first longitudinal trusses 234 of FIG. 49.

Figure 54:
FIG. 54 is a side view of one of the second longitudinal trusses of FIG. 49.

FIG. 54 is a side view of one of the second longitudinal trusses 236 of FIG. 49.

Figure 55:
FIG. 55 is a side view of one of the third longitudinal trusses of FIG. 49.

FIG. 55 is a side view of one of the third longitudinal trusses 238 of FIG. 49.

Figure 56:
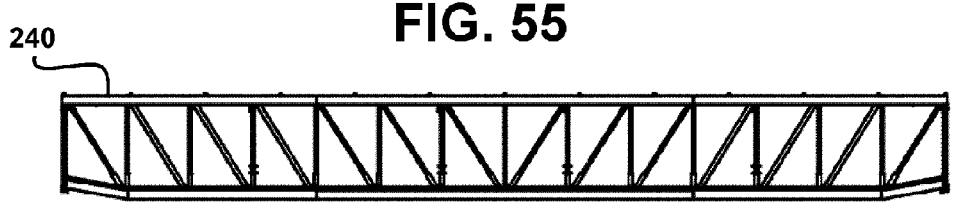
FIG. 56 is a side view of one of the fourth longitudinal trusses of FIG. 49.

FIG. 56 is a side view of one of the fourth longitudinal trusses 240 of FIG. 49.

Figures 57, 58:
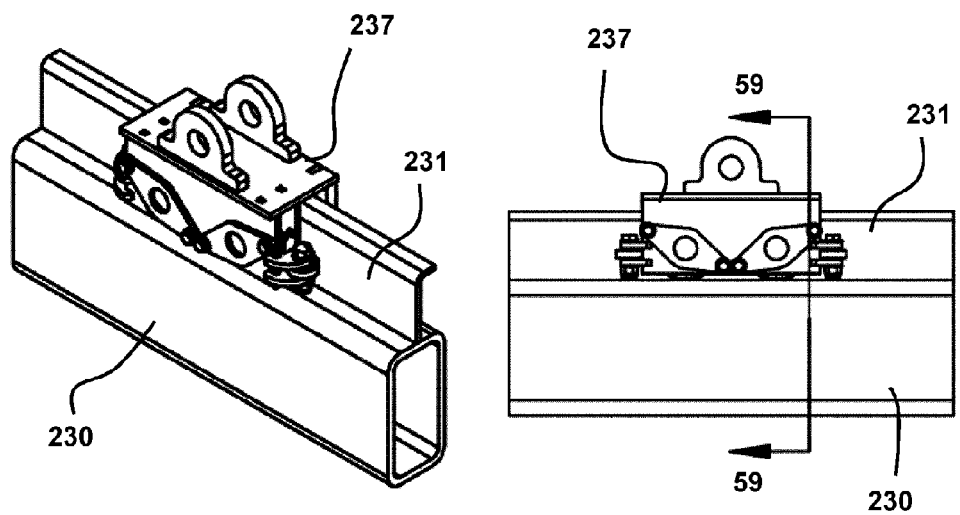
FIG. 57 is an enlarged isometric view showing one of the bogies engaging the top rail over the front transversal truss of FIG. 49.
FIG. 58 is a side view of the bogie of FIG. 57.

FIG. 57 is an enlarged isometric view showing one of the bogies 237 engaging the top rail 231 over the front transversal truss 230 of FIG. 49.

FIG. 58 is a side view of the bogie 237 of FIG. 57.

Figure 59:
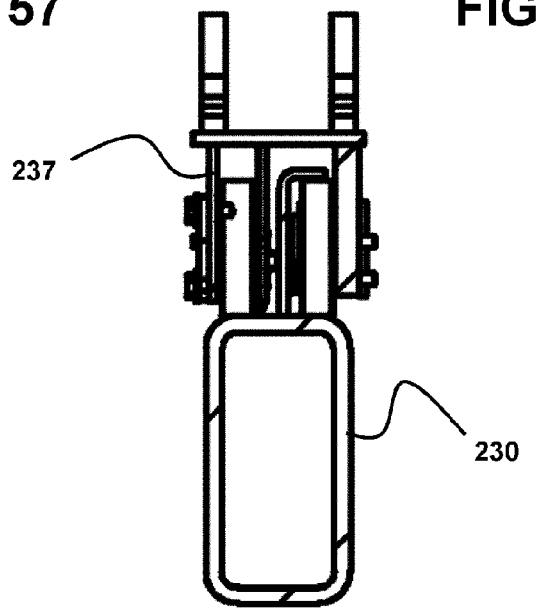
FIG. 59 is a cross-sectional view taken along line 59-59 in FIG. 58.

FIG. 59 is a cross-sectional view taken along line 59-59 in FIG. 58.

Figure 60:
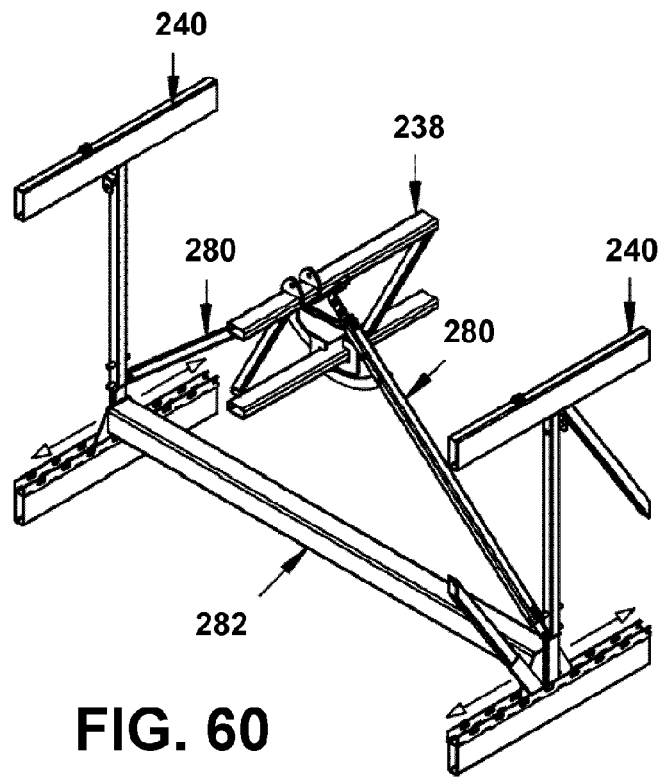
FIG. 60 is an isometric view showing an example of the cross braces and a rigging beam provided between one of the third longitudinal trusses and its two adjacent fourth longitudinal trusses.

FIG. 60 is an isometric view showing an example of the cross braces 280 and a rigging beam 282 provided between one of the third longitudinal trusses 238 and its two adjacent fourth longitudinal trusses 240. The diagonal cross braces 280 are pivotally secured to the third longitudinal truss 238 and their bottom ends are to be bolted or otherwise removably secured to the adjacent fourth longitudinal trusses 240. The horizontal rigging beam 282 extends between the two adjacent fourth longitudinal trusses 240 and the rigging beam 282 is slidable anywhere along the length of the fourth longitudinal trusses 240.

Figure 61:
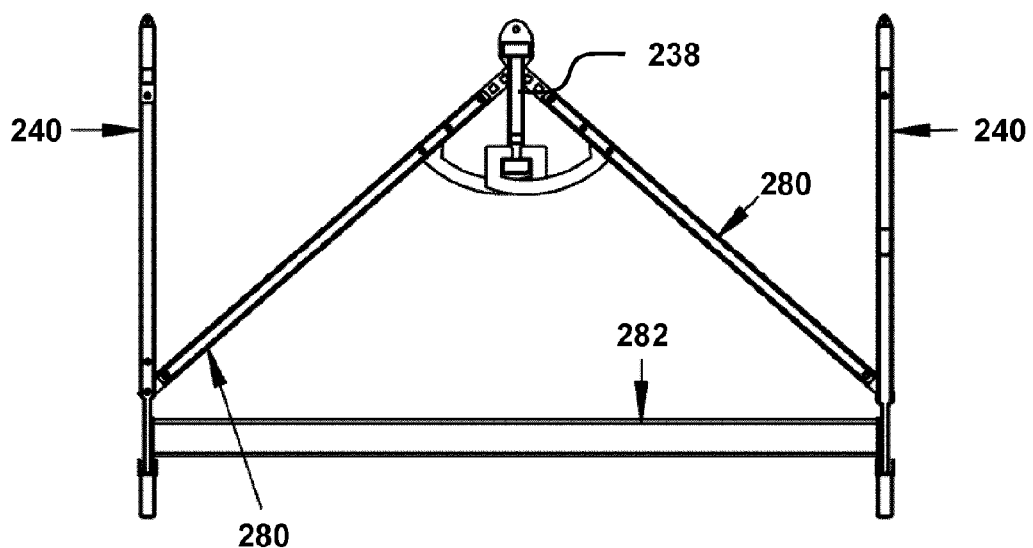
FIG. 61 is a front view of the arrangement shown in FIG. 60.

FIG. 61 is a front view of the arrangement shown in FIG. 60.

Figure 62:
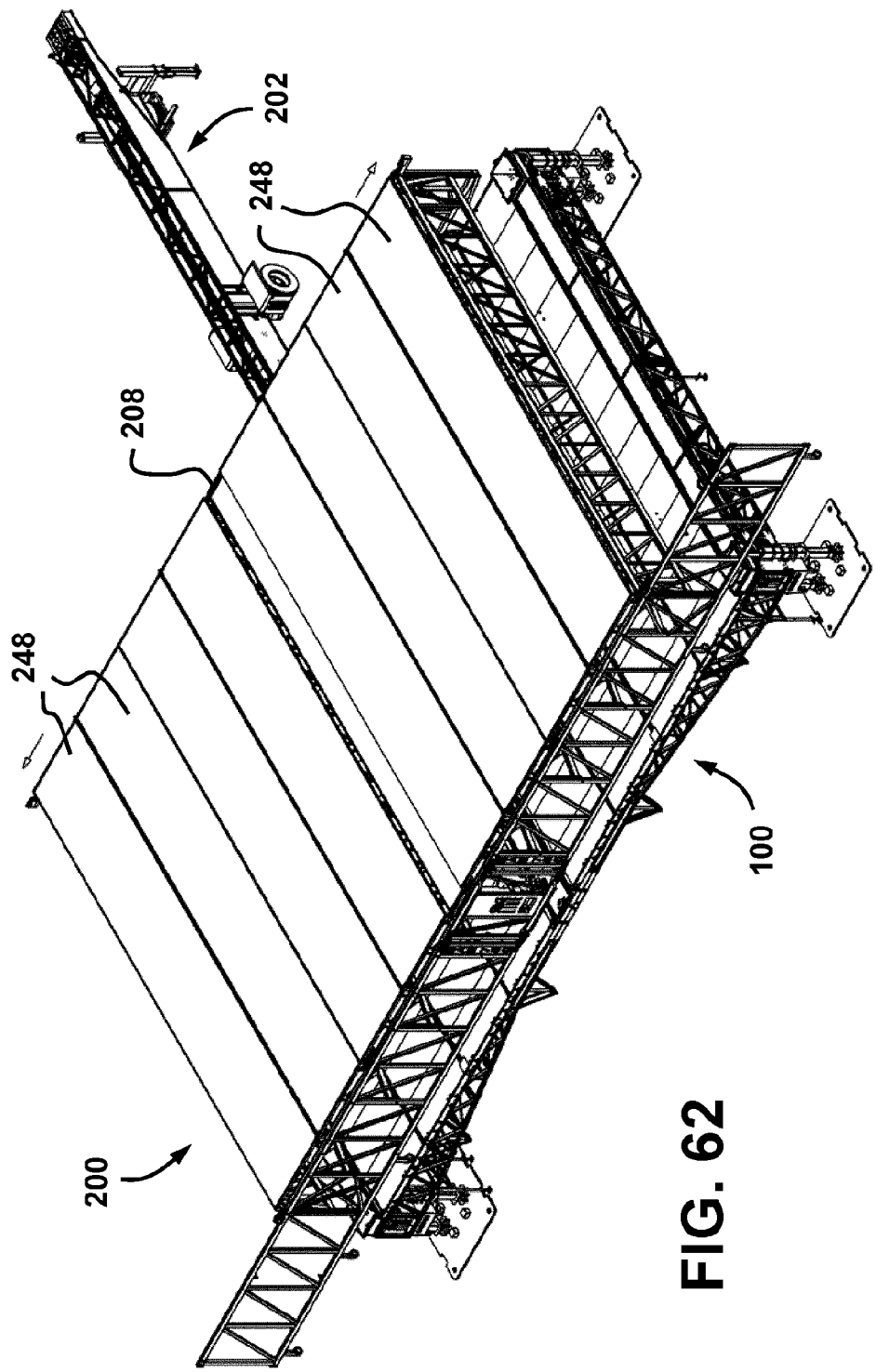
FIG. 62 is an isometric view showing the second unit with the roof structure in its deployed working configuration.

FIG. 62 is an isometric view showing the second unit 200 with the roof structure 220 in its deployed working configuration.

Figures 63, 64:
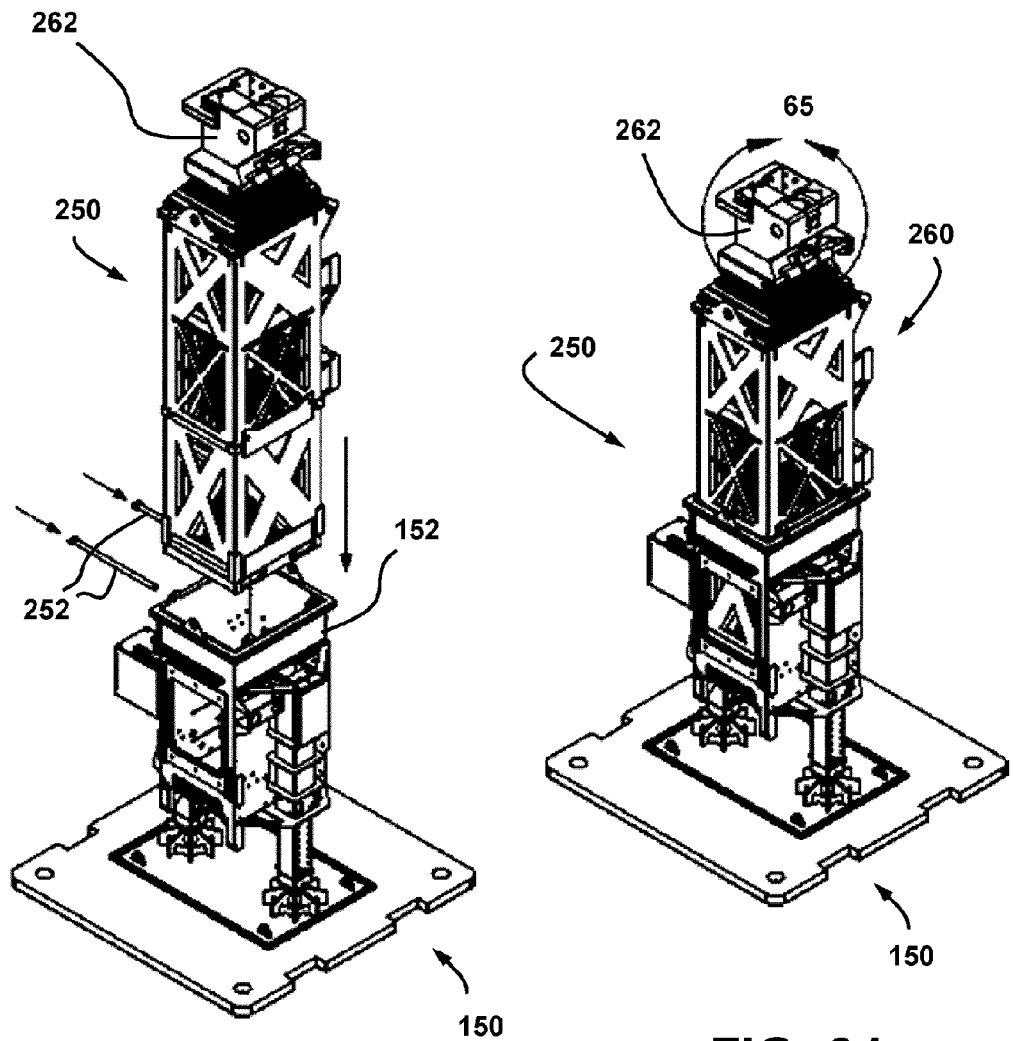
FIG. 63 is an isometric view showing an example of one of the telescopic columns and its corresponding column base being secured together to form a column structure.
FIG. 64 is an isometric view showing the column structure of FIG. 63 once assembled.

FIG. 63 is an isometric view showing an example of one of the telescopic columns 250 and its corresponding column base 150 being secured together to form a column structure 260. In the illustrated example, the bottom of the column 250 fits over the top of the frame 152 of the column base 150. Transversal pins or bolts 252 are provided to secure them together. Variants are possible as well.

Each column 250 of the illustrated example includes a plurality of interconnected segments forming a telescopic arrangement.

FIG. 64 is an isometric view showing the column structure 260 of FIG. 63 once assembled.

As can be seen in the example shown in FIGS. 63 and 64, the top end of the telescopic column 250 includes a locking device 262.

FIGS. 65 to 75 show an example of how the column structures 260 can be secured at opposite ends of one of the first longitudinal trusses 234 of the roof structure 220. The roof structure 220 can be secured (or unconnected) to the top end of the columns 250 when the columns 250 are in a retracted (compact) position or in another position that is close to the retracted position, thus when the roof structure 220 is close to the ground. This is an interesting feature of the proposed concept since the operators can work near the ground level.

Figure 70:
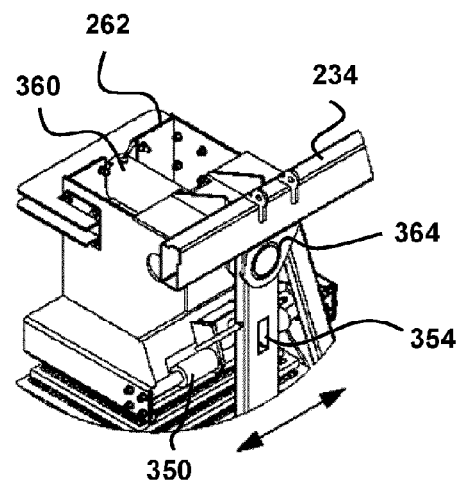

FIG. 65 is an enlarged isometric view showing the locking device 262 at the top end of the column 250 of FIG. 64. The illustrated locking device 262 includes a hydraulic centering pin actuator 350. This centering pin actuator 350 drives a centering pin 352 in a direction that will be substantially parallel to the corresponding first longitudinal truss 234 (right or left) and also pivotally to move the centering pin 352 between a retracted upward position and a locking downward position. The centering pin 252 is designed to selectively enter through a corresponding slot 354 at the top of the first longitudinal truss 234 (FIG. 70). The centering pin 352 is pivoted into the corresponding slot 354 once the top end of the column 250 is lined up with the slot 354. The alignment can be done by moving the centering pin actuator 350 left and/or right until the position is right.

FIG. 66 is a side view of the locking device 262 in FIG. 65. FIG. 67 is an isometric view of the centering pin actuator 350 of the locking device 262 in FIG. 65 alone.

The locking device 262 also includes a hydraulic actuator 360 having a locking pin 362 at the free end thereof. The locking pin 362 can move in and out of a corresponding eyelet 364 provided at the top of the first longitudinal truss 234 to secure it.

FIG. 68 is an isometric view showing the locking pin actuator 360 and the locking pin 362 of the locking device 262 in FIG. 65.

Figure 69:
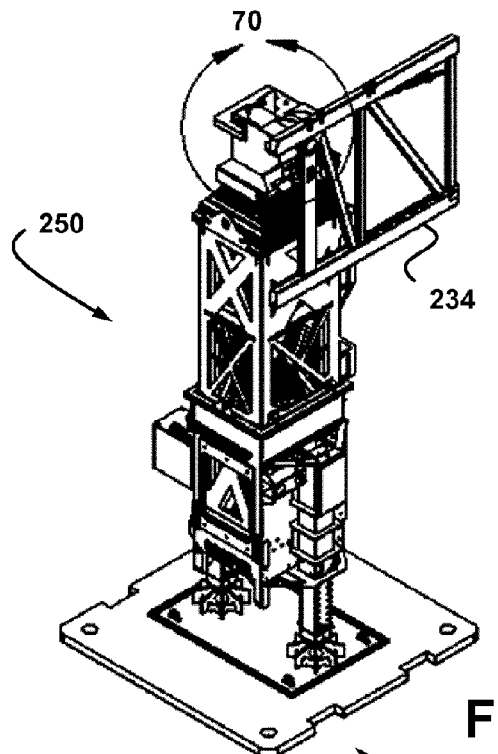
Figure 71:
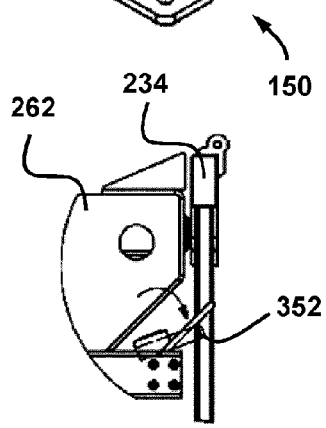
Figure 72:
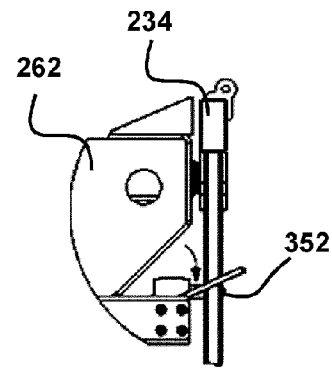

FIG. 69 is a view similar to FIG. 64 but where one of the first longitudinal truss 234 is brought next to the locking device 262. FIG. 70 is an enlarged view depicting the centering pin actuator 350 being operated to line up the centering pin 352. FIGS. 71 and 72 are side views showing the centering pin 352 being pivoted downward into the slot 354 by the centering pin actuator 350.

Figure 73:
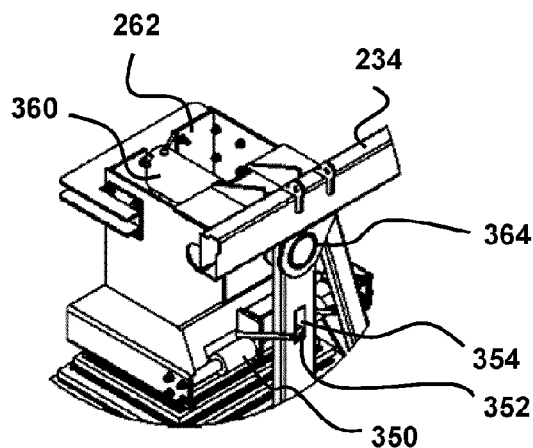
Figures 74, 75:
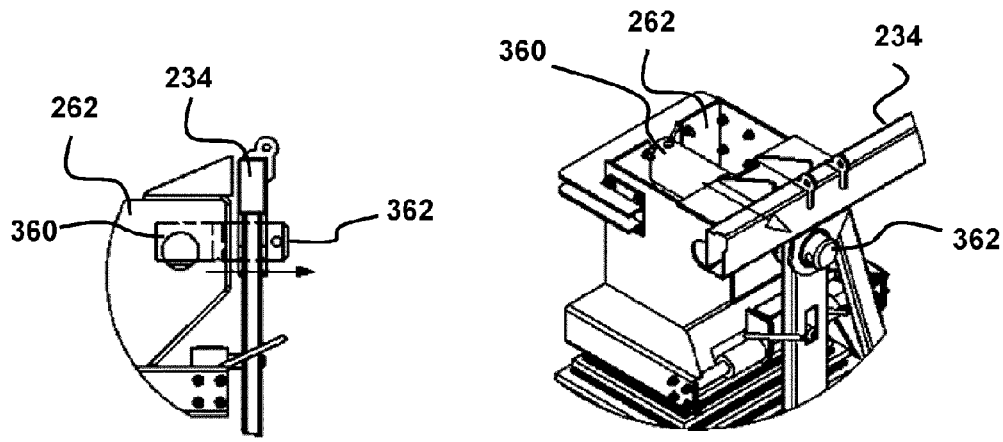

FIG. 73 is a view similar to FIG. 70 but shows the locking device 262 once the centering pin 352 is in a locking position into the slot 354. If the eyelet 364 and the locking pin 362 are not yet lined up with one another, the operator can use the centering pin actuator 350 to move the parts very slightly right and/or left so as to make the fine adjustments. The locking pin 362 can thus be moved from its retracted position to its extended position thereafter, as shown in FIG. 74. FIG. 74 is a side view depicting the extension of the locking pin 362 into the eyelet 364. FIG. 75 is an isometric view showing the locking device 262 afterwards. A cutter pin (not shown) will complete the assembly in this example. Variants are possible as well. For instance, one or more of the actuators 350, 360 can be designed differently. The shape and/or the relative position of the parts can also be different. Many other changes can be made as well from the illustrated example.

It should be noted that the locking device 262 could be omitted in some implementations and be replaced by another arrangement.

Figure 76:
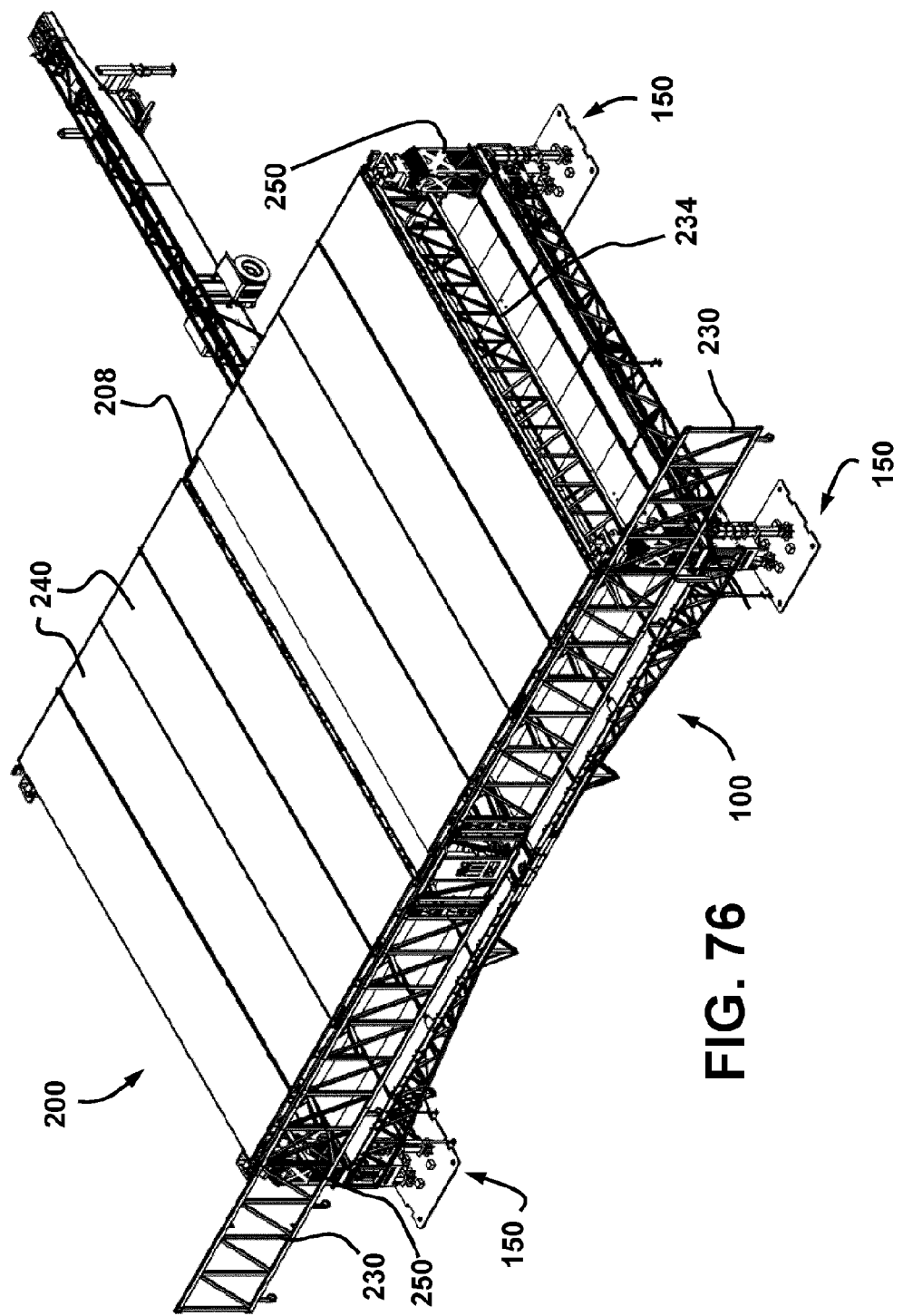
FIG. 76 is an isometric view showing the first and second units once the column structures and the roof structure are secured together.

FIG. 76 is an isometric view showing the first and second units 100, 200 once the column structures and the roof structure 220 are secured together.

Figure 77:
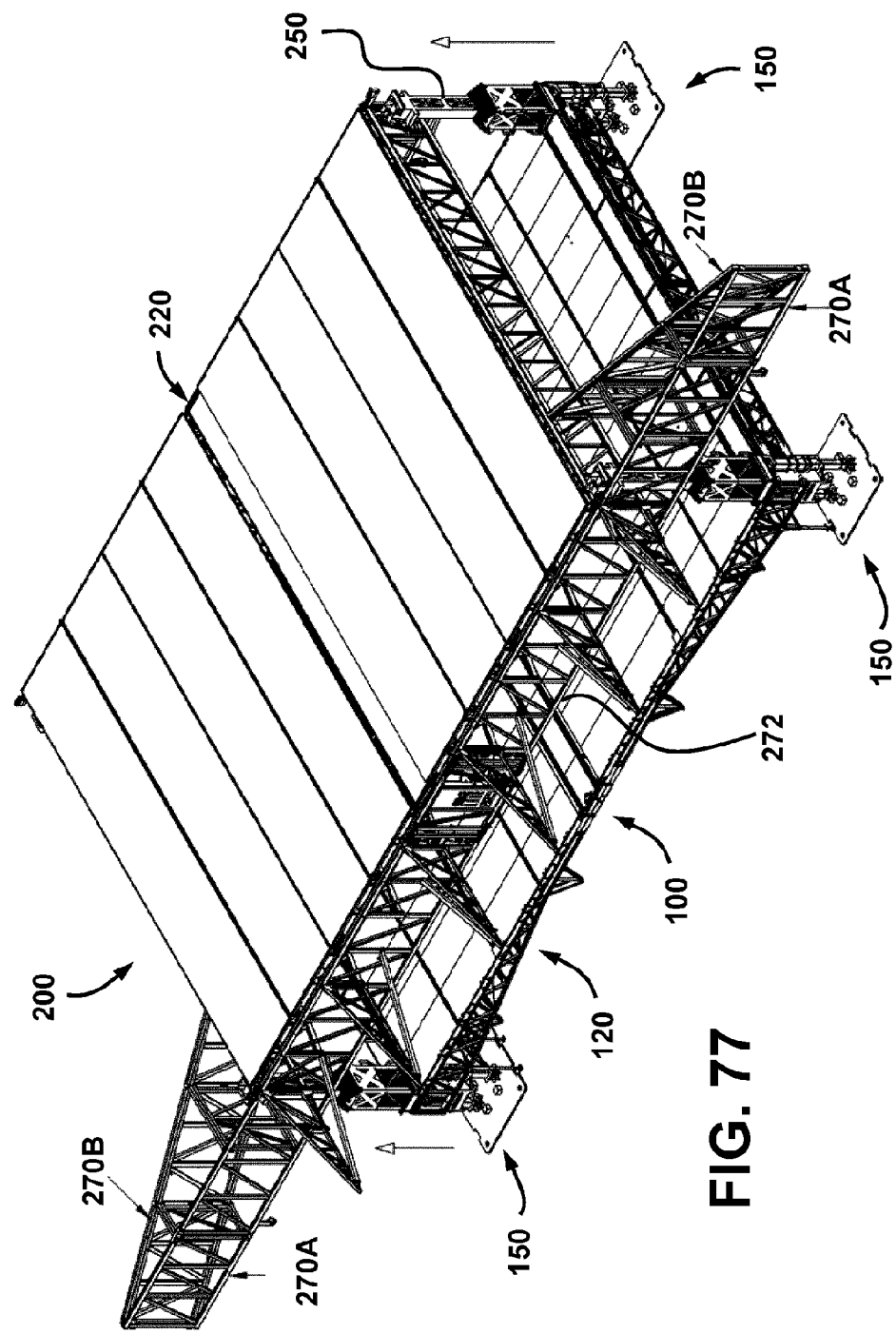
FIG. 77 is an isometric view showing the roof structure being slightly lifted above the floor structure.

FIG. 77 is an isometric view showing the roof structure 220 after being slightly lifted above the floor structure 120 and once the additional components were installed. This low-level vertical position facilitates the installation of additional components, for instance side wings 270 and spaced-apart front supports 272 to which scenic equipment or other elements can be secured. Variants are possible as well.

The roof structure 220 can be lifted using actuators, for instance hydraulic actuators integrated to the column structures 260. Variants are also possible.

Figure 78:
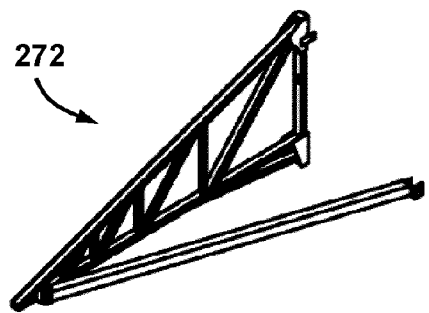
FIG. 78 is an isometric view of one of the front supports that was added in FIG. 77.

FIG. 78 is an isometric view of one of the front supports 272 that was added in FIG. 77.

Figure 79:
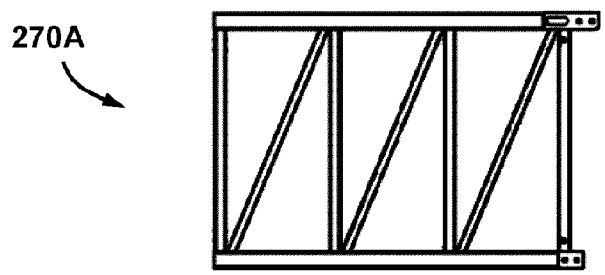
FIG. 79 is an isometric view of the front member of one of the side wings that was added in FIG. 77.

FIG. 79 is an isometric view of the front member 270A of one of the side wings 270 that was added in FIG. 77.

Figure 80:
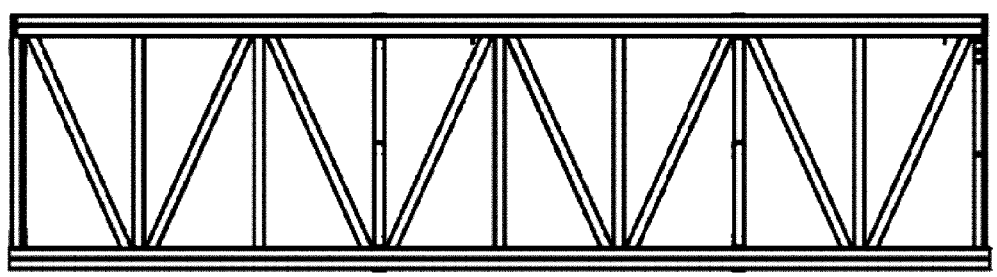
FIG. 80 is an isometric view of the rear member of one of the side wings that was added in FIG. 77.

FIG. 80 is an isometric view of the rear member 270B of one of the side wings 270 that was added in FIG. 77.

FIG. 81 is an isometric view showing the mobile stage framework 400 once the floor structure 120 and the roof structure 220 are in their deployed working configurations and the columns 250 of the column structures 260 are were extended to raise the roof structure 120 from a low-level vertical position to a high-level vertical position. The mobile stage framework 400 is then in its final working configuration and constitutes a solid self-supported construction.

It should be noted that FIG. 81 only illustrates the main structural components of the mobile stage framework 400. Other components can be added by technicians before the event can begin. As aforesaid, this includes sound equipment, lights, power outlets, handrails, stairs, back and side covers, screen, motor hoist, etc.

To disassemble the mobile stage framework 400, one can simply follow the steps in the reverse order. Variants are also possible.

The present detailed description and the appended figures are meant to be exemplary only. A skilled person will recognize that variants can be made in light of a review of the present disclosure without departing from the proposed concept. For instance, although the main example used in the present description has a configuration where the second unit 200 is moved into and out of position over the first unit 100 by sliding on it, other configurations and arrangements are possible as well. For instance, the second unit 200 can be brought into position without having it making contact with the first unit 100. One possible implementation is to open the roof structure 220 next to the first unit 100 and then lift the whole second unit 200 using cranes or the like. The second unit 200 will then be moved into position above the upper stage floor surface before being secured to the column structures 260. Other possible scenarios include lifting the folded second unit 200 using one or more cranes or the like and positioning it directly over the floor structure 120 of the first unit 100. Thus, no sliding movement of the second unit 200 directly over the first unit 100 will occur in this case.

Another possible variant is to have the first unit 100 not being completely unfolded before the second unit 200 is brought thereon. However, at least the joists 140, 142 of the first unit 100 are secured to the column structures 260 before the roof structure 220 is itself secured to the column structures 260. This provides structural stability without having to install external cables or other additional elements to stabilize them.

The number of column structures 260 can be different than four and the position thereof can be different in some implementations. Also, the columns 250 can be designed without being telescopic and/or other configurations can be used for lifting the roof structure 220 from a low-level bottom position to a high-level vertical position. However, the roof structure 220 needs to be either slidably connected or be otherwise secured to the columns 250, for instance using bolts or the like, before the roof structure 220 is lifted to a high-level vertical position.

Some implementations may require using vehicles that are not truck trailers to transport the first and/or the second unit 100, 200. For instance, the proposed concept could be implemented using railroad cars, boats, etc. Yet, one could divide the first unit 100 and/or the second unit 200 each in two or more independent sections assembled together, for instance, end-to-end prior to use so as to form the first unit 100 and/or the second unit 200. However, each independent section would only be part of either the floor structure 120 of the first unit 100 or the roof structure 220 of the second unit 200.

Other variants and changes are possible as well.

LIST OF REFERENCE NUMERALS 100 first unit
102 first semitrailer
104 first chassis
106 rear wheels (first semitrailer)
108 front end panel
109 rear end panel
110 arrow (lengthwise direction)
112 arrow (widthwise direction)
114 front supporting leg 116 rear supporting leg
118 supporting block
120 floor structure
122 storage bay
124 strap
126 additional supporting leg
130 base platform
132 floor panel
134 upper panel hinge
136 bottom panel hinge
136A inboard flat portion
136B outboard flat portion
136C inboard T-shaped bracket
136D outboard T-shaped bracket
136E inboard rectilinear slot
136F outboard rectilinear slot
136G inboard lever arm
136H outboard lever arm
136I medial axle
136J follower
136K follower
136L axle
136M axle
138 first track
139 attachment point
140 first joist
142 second joist
144 bracket
146 leg
150 column base
152 vertically-extending frame
154 plate
156 telescopic support
158 actuator
180 floor panel actuator
181 side tab
182 first linking arm
184 second linking arm
188 pivot
189 space
190 follower
192 additional joist
193 treaded hole
194 side floor section
196 supporting leg
198 additional joist
199 additional joist
200 second unit
202 second semitrailer
203 truck tractor
204 second chassis
206 rear wheels (second semitrailer)
208 roof base frame
210 front supporting leg
211 pin
212 rear supporting leg
213 supporting block
214 second track
215 first cable
216 first winch
217 second cable
218 second winch
219A pulley
219B pulley
220 roof structure
222 front carriage assembly
224 rear carriage assembly
226 transversal actuator
227 axle
228 rear actuator
229 hole
230 front transversal trusses
231 rails
232 rear transversal truss
233 caster wheel
234 first longitudinal truss
235 caster wheel
236 second longitudinal truss
237 bogie
238 third longitudinal truss
240 fourth longitudinal truss
248 roof panel
249 hinge
250 column
252 pin
260 column structure
262 locking device
270 side wing
270A front member
270B rear member
272 front support
280 diagonal cross brace
282 horizontal cross braces
350 hydraulic centering pin actuator
352 centering pin
354 slot
360 hydraulic locking pin actuator
362 locking pin
364 eyelet
400 assembled mobile stage framework

The invention claimed is:

1. A mobile stage framework having a lengthwise direction and a widthwise direction, the mobile stage framework including:
a plurality of spaced-apart column structures; and
a first and a second self-contained unit, the first and second units being separated from one another and being mounted on a first road vehicle chassis and a second road vehicle chassis, respectively, when the mobile stage framework is fully disassembled for road transportation, the first unit including an articulated floor structure having a folded transport configuration and a deployed working configuration, the second unit being complementary to the first unit and including an articulated roof structure having a folded transport configuration and a deployed working configuration, the floor structure and the roof structure each being in their deployed working configuration when the mobile stage framework is fully assembled and being in their folded transport configuration when the mobile stage framework is fully disassembled for transportation, the floor structure being removably secured to the column structures at first locations and the roof structure being removably secured to the column structures at second locations as well as being positioned directly above the floor structure when the mobile stage framework is fully assembled, the second locations being vertically above the first locations and being vertically movable with reference to the first locations when the mobile stage framework is being assembled and disassembled, the second unit being also laterally movable into and out of position above the first unit when the roof structure is unattached to the column structures and the mobile stage framework is being assembled and disassembled, respectively.

2. The mobile stage framework as defined in claim 1, wherein the mobile stage framework includes at least one among the following features (A) and (B):
(A) the second unit is slidable onto the first unit over a pair of lengthwise-disposed tracks provided on an upper stage floor surface of the first unit to receive a corresponding bottom portion of the second unit, the second unit being loaded over and unloaded from the first unit at one side of the first unit;
(B) the second unit is loaded on the first unit in the lengthwise direction.

3. The mobile stage framework as defined in claim 1, wherein the floor structure includes an elongated base platform extending in the lengthwise direction and substantially defining a center portion of the mobile stage framework, the base platform having a right side and a left side with reference to the lengthwise direction, both sides being substantially symmetrical.

4. The mobile stage framework as defined in claim 3, wherein the floor structure further includes:
two sets of joists; and
two sets of floor panels extending in the lengthwise direction, each set of floor panels including a first floor panel pivotally connected to a corresponding one of the sides of the base platform, the floor panels of each set being pivotally connected to one another in juxtaposition and being movable between a vertical transport position and a horizontal working position, the floor panels having top surfaces that are horizontally disposed and coplanar when being supported by the joists in the horizontal working position.

5. The mobile stage framework as defined in claim 4, wherein the floor structure includes a plurality of vertically-disposed floor panel actuators, each actuator having an upper end pivotally connected to a corresponding upper panel hinge between two adjacent ones of the floor panels and also having a bottom end pivotally connected to an intermediary hinge interconnecting a bottom end of two corresponding linking arms, the corresponding linking arms having upper ends pivotally connected to a respective one of the adjacent floor panels.

6. The mobile stage framework as defined in claim 5, wherein each pair of two adjacent floor panels that are connected using a corresponding one of the upper panel hinges includes at least two of the floor panel actuators, the two floor panel actuators being spaced apart in the lengthwise direction and cooperating with their corresponding linking arms.

7. The mobile stage framework as defined in claim 4, wherein the mobile stage framework includes at least one among the following features (A) and (B):
(A) each set of floor panels includes bottom panel hinges between two adjacent ones of the floor panels, the bottom panel hinges being articulated to prevent a portion of the bottom panel hinges from protruding over the floor surface;
(B) the floor panels are slidably supported over a top edge surface of the corresponding joists using followers.

8. The mobile stage framework as defined in claim 4, wherein the innermost floor panels are spaced apart from one another in their vertical transport position to create a storage bay inside an intervening space, the storage bay preferably extending substantially along an entire length of the base platform.

9. The mobile stage framework as defined in claim 8, wherein the storage bay has a width at least equal to a width of column bases, the storage bay receiving the column bases for transportation.

10. The mobile stage framework as defined in claim 4, wherein the mobile stage framework includes at least one among the following features (A) and (B):
(A) the floor panels have a lengthwise dimension that is substantially similar to that of the base platform;
(B) at least some of the joists have an innermost end that is pivotally connected to the base platform.

11. The mobile stage framework as defined in claim 1, wherein the roof structure includes an elongated roof base frame extending in the lengthwise direction.

12. The mobile stage framework as defined in claim 11, wherein the roof structure includes:
two sets of transversal trusses, each transversal truss having a proximal end and a distal end, the proximal end of the transversal trusses being pivotally connected to a corresponding side of the roof base frame;
two sets of longitudinal trusses, the longitudinal trusses being slidably movable along corresponding ones of the transversal trusses between a transport position and a working position; and
two sets of rigid roof panels cooperating with the longitudinal trusses, the roof panels of each set being interconnected edge-to-edge with ones another, each set of roof panels being movable between a transport position and a working position.

13. The mobile stage framework as defined in claim 1, wherein the mobile stage framework includes at least one among the following features (A) and (B):
(A) each column structure includes a telescopic column having a plurality of interconnected segments forming a telescopic arrangement;
(B) the column structures are four in number.

14. The mobile stage framework as defined in claim 13, wherein the column structures are each positioned at a respective corner of the mobile stage framework when the floor structure and the roof structure are both in their deployed working configuration.

15. The mobile stage framework as defined in claim 1, wherein the first road vehicle chassis is part of a first semitrailer and the second road vehicle chassis is part of a second semitrailer.

16. A method of handling a mobile stage framework during assembly, the method including:
positioning a first transportable unit at a location, the first unit being mounted on a first road vehicle chassis and including an articulated floor structure that is in a folded transport configuration when the first unit is positioned at the location;
securing the floor structure of the first unit to a plurality of spaced-apart column structures;
positioning a second transportable unit over the first unit, the second unit being complementary to the first unit and including a roof structure, the second unit being initially physically separated from the first unit and mounted on a second road vehicle chassis with the roof structure being in a folded transport configuration, the positioning of the second unit over the first unit including moving the second unit next to one side of the first unit, lifting the second unit higher above the ground, and then sliding the second unit over the first unit;
securing the second unit to the plurality of column structures when the roof structure is in a deployed working configuration and at a first vertical position above the floor structure of the first unit, the floor structure being already secured to the column structures; and moving the roof structure to a second vertical position above the floor structure, the second vertical position being higher above the floor structure than the first vertical position.

17. The method as defined in claim 16, wherein the positioning of the second unit over the first unit occurs while the roof structure is still in a folded transport configuration.

18. The method as defined in claim 16, wherein the positioning of the second unit over the first unit occurs while the floor structure is already in a deployed working configuration.

19. The method as defined in claim 16, wherein the first road vehicle chassis is part of a first semitrailer and the second road vehicle chassis is part of a second semitrailer, the positioning of the second unit over the first unit includes sliding the second unit away from the second road vehicle chassis over which the second unit was transported towards the location.

20. The method as defined in claim 19, wherein the positioning of the first unit at the location includes hauling the first unit on a road using the first semitrailer, and wherein the positioning of the second unit over the first unit includes hauling the second unit on the road using the second semitrailer.

* * * * *